(12) United States Patent
Fu et al.

(10) Patent No.: US 12,452,571 B2
(45) Date of Patent: Oct. 21, 2025

(54) WEARABLE DEVICES

(71) Applicant: SHENZHEN SHOKZ CO., LTD., Guangdong (CN)

(72) Inventors: Xin Fu, Shenzhen (CN); Yueqiang Wang, Shenzhen (CN); Chong Wang, Shenzhen (CN); Sunjie Huang, Shenzhen (CN); Liwei Wang, Shenzhen (CN); Haofeng Zhang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 287 days.

(21) Appl. No.: 18/155,778

(22) Filed: Jan. 18, 2023

(65) Prior Publication Data

US 2023/0188880 A1  Jun. 15, 2023

Related U.S. Application Data

(63) Continuation of application No. PCT/CN2021/116273, filed on Sep. 2, 2021.

(30) Foreign Application Priority Data

| Nov. 26, 2020 | (CN) | 202011350077.3 |
| Nov. 26, 2020 | (CN) | 202022811724.8 |
| Feb. 1, 2021 | (CN) | 202120288727.X |
| Mar. 26, 2021 | (CN) | 202120623637.1 |

(Continued)

(51) Int. Cl.
*H04R 25/00* (2006.01)
*H04R 1/10* (2006.01)

(52) U.S. Cl.
CPC ........ *H04R 1/1008* (2013.01); *H04R 1/105* (2013.01); *H04R 1/1066* (2013.01); *H04R 2460/13* (2013.01)

(58) Field of Classification Search
CPC .... H04R 1/1008; H04R 1/105; H04R 1/1066; H04R 2460/13; H04R 5/033; H04R 5/0335; G02C 11/06; G02C 2200/26; G02C 5/14; G02C 5/22; G02C 5/2209; G02C 5/2281;

(Continued)

(56) References Cited

U.S. PATENT DOCUMENTS

| 5,414,769 A | 5/1995 | Gattey et al. |
| 10,012,847 B1 | 7/2018 | Huang |
| 2003/0067585 A1 | 4/2003 | Miller et al. |

(Continued)

FOREIGN PATENT DOCUMENTS

| CN | 203720476 U | 7/2014 |
| CN | 104049376 A | 9/2014 |

(Continued)

OTHER PUBLICATIONS

The Notice of Rejection in Japanese Application No. 2023-517366 mailed on Apr. 30, 2024, 11 pages.

(Continued)

*Primary Examiner* — Phylesha Dabney
(74) *Attorney, Agent, or Firm* — METIS IP LLC

(57) ABSTRACT

The embodiment of the present disclosure discloses a wearable device, including: a wearing part including: a connection section and a concave section, the concave section being connected to the connection section. The concave section causes an upper edge of the wearing part to have a downward depression on the wearing part; the concave section is provided with an acoustic output end inside.

19 Claims, 20 Drawing Sheets

(30) Foreign Application Priority Data

May 19, 2021 (CN) .......................... 202110545559.2
May 19, 2021 (CN) .......................... 202121079519.5

(58) Field of Classification Search
CPC ........ G02C 11/10; G02C 5/143; G02C 5/146; G02C 5/16
USPC .......................................................... 381/381
See application file for complete search history.

(56) References Cited

U.S. PATENT DOCUMENTS

| | | |
|---|---|---|
| 2005/0206837 A1 | 9/2005 | Toulch |
| 2011/0197400 A1 | 8/2011 | Chevrolet |
| 2013/0077041 A1 | 3/2013 | Chih |
| 2016/0054585 A1 | 2/2016 | Alcini |
| 2019/0137783 A1 | 5/2019 | Huang |
| 2020/0089008 A1 | 3/2020 | Silfvast et al. |
| 2020/0329305 A1 | 10/2020 | Rusconi Clerici Beltrami et al. |
| 2020/0405017 A1 | 12/2020 | Hu et al. |
| 2021/0015220 A1 | 1/2021 | Xue et al. |
| 2021/0072559 A1 | 3/2021 | Wang et al. |

FOREIGN PATENT DOCUMENTS

| | | |
|---|---|---|
| CN | 106226920 A | 12/2016 |
| CN | 106291986 A | 1/2017 |
| CN | 207529052 U | 6/2018 |
| CN | 108509048 A | 9/2018 |
| CN | 208780924 U | 4/2019 |
| CN | 209674123 U | 11/2019 |
| CN | 210427982 U | 4/2020 |
| CN | 210427991 U | 4/2020 |
| CN | 111562676 A | 8/2020 |
| CN | 211741760 U | 10/2020 |
| CN | 215642098 U | 1/2022 |
| DE | 202014010238 U1 | 4/2015 |
| EP | 3754417 A1 | 12/2020 |
| GB | 2336692 A | 10/1999 |
| JP | 2007139933 A | 6/2007 |
| JP | 2018189779 A | 11/2018 |
| JP | 2020057977 A | 4/2020 |
| JP | 2020140196 A | 9/2020 |
| WO | 2006079254 A1 | 8/2006 |
| WO | 2015109002 A2 | 7/2015 |
| WO | 2020221254 A1 | 11/2020 |
| WO | 2021012809 A1 | 1/2021 |

OTHER PUBLICATIONS

International Search Report in PCT/CN2021/116273 mailed on Dec. 2, 2021, 8 pages.
Written Opinion in PCT/CN2021/116273 mailed on Dec. 2, 2021, 8 pages.
The Partial Supplementary European Search Report in European Application No. 21896461.7 mailed on Dec. 6, 2023, 14 pages.
Office Action in Russian Application No. 2023102670 mailed on Jul. 19, 2023, 14 pages.
Office Action Report in Brazilian Application No. 112023002543-5 mailed on Aug. 28, 2025, 8 pages.

WEARABLE DEVICES

CROSS-REFERENCE TO RELATED APPLICATION

This application is a Continuation of International Application No. PCT/CN2021/116273, filed on Sep. 2, 2021, which claims priority of Chinese Patent Application No. 202022811724.8, filed on Nov. 26, 2020, Chinese Patent Application No. 202011350077.3, filed on Nov. 26, 2020, Chinese Patent Application No. 202121079519.5, filed on May 19, 2021, Chinese Patent Application No. 202110545559.2, filed on May 19, 2021, Chinese Patent Application No. 202120623637.1 filled on Mar. 26, 2021, and Chinese Patent Application No. 202120288727.X filled on Feb. 1, 2021, the contents of each of which are entirely incorporated herein by reference.

TECHNICAL FIELD

The present disclosure relates to the field of acoustics, in particular to wearable devices.

BACKGROUND

With the development of science and technology, wearable mobile devices are easy to carry around, and are welcomed by many users. In particular, the wearable devices may have an audio function, and an audio output may be realized through a speaker assembly disposed on the wearable devices, thereby improving a quality of output sound signals and further improving users' experience.

The present disclosure provides wearable devices that may transmit sound signals to the users conveniently.

SUMMARY

The embodiments of the present disclosure provide a wearable device, including: a wearing part, the wearing part including: a connection section and a concave section, the concave section being connected to the connection section; and the concave section is configured that the wearing part includes a downward depression on an upper edge of the wearing part; and the concave section is provided with an acoustic output end inside.

In some embodiments, the concave section is configured to be close to a user's ear when the user wears the wearing part, and the concave section is configured that the acoustic output end locates in front of or near the user's ear.

In some embodiments, the concave section includes a mounting part and a transition part connected to the mounting part, an angle is formed between the mounting part and the transition part, the acoustic output end is disposed on the mounting part or the transition part, and at least one of the mounting part and the transition part is in a bent connection with the connection section and the extends downwards.

In some embodiments, the angle formed between the transition part and the mounting part is within a range of 30°-90°.

In some embodiments, the connection section includes a first connection section, the transition part is connected between the mounting part and the first connection section, and the transition part is in a bent connection with the first connection section and extends downwards.

In some embodiments, the wearable device further includes a visible part, and the connection section further includes a second connection section, the second connection section is connected to one end of the mounting part, and one end of the second connection section away from the mounting part is connected to the visible part.

In some embodiments, the second connection section includes a first leg, a second leg, and an adjustment part, the first leg and the second leg are adjusted through the adjustment part, and the first leg and the second leg perform operations including a relative stretching and/or a rotation through the adjustment part, and the second leg is connected to the mounting part.

In some embodiments, a functional element disposed on the first connection section, the concave section, and/or the second connection section.

In some embodiments, the functional element includes an acoustic element, the acoustic element sounding through the acoustic output end.

In some embodiments, the acoustic output end includes a sound hole, the sound hole being disposed at least one of the following: an inner side of the concave section facing a user's head, an edge of the concave section facing the user's tragus, or a side of the concave section facing the user's tragus.

In some embodiments, the acoustic output end includes a vibration surface on the inner side of the concave section facing the user's head.

In some embodiments, the wearing part includes a left ear wearing part and a right ear wearing part, and the left ear wearing part and the right ear wearing part are respectively in a stable contact with the user's left and right ears; both the left ear wearing part and the right ear wearing part include a communication assembly, and the communication assemblies are configured to transmit a signal between the left ear wearing part and the right ear wearing part.

In some embodiments, the communication assemblies include a wireless communication assembly.

In some embodiments, a communication mode of the wireless communication assembly includes at least one of: a Bluetooth, an infrared, an ultra-wide band (UWB), or a near field magnetic induction.

In some embodiments, the wearable device further includes a visible part physically connected to the wearing part, and the wearing part is able to rotate relative to the visible part along a connection point with the visible part.

In some embodiments, the wearable device further includes a relative position detection device, the relative position detection device being configured to detect a position of the wearing part relative to the visible part; when the wearing part is in a first position relative to the visible part, the wearable device is in a folded state; when the wearing part is in a second position relative to the visible part, the wearable device is in an unfolded state; when the wearing part is in a transitional position relative to the visible part, the wearable device is in a transitional state. a transitional state.

In some embodiments, the relative position detection device includes a spring probe and a conductive metal part disposed at a connection between the wearing part and the visible part; when the spring probe is disconnected from the conductive metal part, the wearing part is in the first position or the transition position relative to the visible part; when the spring probe is electrically connected to the conductive metal part, the wearing part is in the second position relative to the visible part.

In some embodiments, the relative position detection device includes a switch structure; when the switch structure is in an open circuit, the wearing part is in the first position or the transition position relative to the visible part; when the switch structure is in a conducting state, the wearing part is in the second position relative to the visible part.

In some embodiments, the relative position detection device includes a magnet, a magnetic conductor, and a magnetic field detector, the magnet being coupled with the magnetic conductor, and the magnetic field detector being configured to detect a magnetic field strength between the magnet and the magnetic conductor; when the magnetic field strength between the magnet and the magnetic conductor exceeds a predetermined magnetic field strength threshold, the wearing part is in the second position relative to the visible part; when the magnetic field strength between the magnet and the magnetic conductor does not exceed the predetermined magnetic field strength threshold, the wearing part is in the first position or the transitional position relative to the visible part.

In some embodiments, the relative position detection device further includes a time detection assembly, time detection assembly being configured to detect a duration of the wearing part in the second position relative to the visible part.

In some embodiments, the wearable device further includes a visible part and a quick-release assembly, and the quick-release assembly includes a mounting base and a first lock, one end of the mounting base is provided with an insertion cavity, the mounting base is connected to one of the wearing part and the visible part, the first lock is disposed on the mounting base passing through the insertion cavity, the first lock includes a first locking part and a first unlocking part disposed coaxially, and an axial projection of the first unlocking part is located within an axial projection range of the first locking part along the axial direction; the other of the wearing part and the visible part includes a locking hole, the locking hole being inserted into the insertion cavity; when the first locking part is located in the locking hole, the other of the wearing part and the visible part is relatively fixed to the insertion cavity; when the first unlocking part, instead of the first locking part, is located in the locking hole, the first unlocking part is disengaged from the locking hole.

In some embodiments, the quick-release assembly further includes a first elastic part, the first elastic part being disposed on the mounting base and elastically abuts against the first locking part, the first elastic part is configured to provide an elastic force to make the first locking part move into the insertion cavity.

In some embodiments, the first elastic part is disposed within the mounting base and elastically abuts against an end of the first locking part away from the first unlocking part; when the first lock is pressed, the first lock compresses the first elastic part, so that the first unlocking part replaces the first locking part and is located in the insertion cavity; when the first lock is released, the first lock pushes the first lock back, so that the first locking part moves into the insertion cavity.

In some embodiments, the quick-release assembly further includes a first positioning cover, the first positioning cover is disposed on the mounting base, and the first elastic part is elastically compressed and disposed between the first positioning cover and the first locking part.

In some embodiments, the first positioning cover includes a cylinder body, a bottom wall at one end of the cylinder body, and a retaining ring at the other end of the cylinder body, the end of the first locking part departs from the first unlocking part includes an undercut, the first elastic part is disposed between the bottom wall of one end of the cylinder body and the first locking part, and the first locking part is slidably disposed with the cylinder body, and the undercut cooperates with the retaining ring to restrict the first lock from disengaging from the first positioning cover.

In some embodiments, the other end of the mounting base includes an insertion slot, and one end of one of the wearing part and the visible part includes an insertion part, and the insertion part is detachably connected to the insertion slot.

In some embodiments, the quick-release assembly further includes a second lock, a second elastic part, and a second positioning cover; the second lock includes a second locking part disposed and a second unlocking part disposed coaxially, the second positioning cover is disposed on the mounting base, the second locking part is slidably disposed with the second positioning cover, and the second locking part passes through the insertion slot, the second elastic part is elastically compressed and disposed between the second positioning cover and the second locking part; the insertion part includes a rotation hole and a channel communicating with the rotation hole, the insertion part is inserted into the insertion slot, the second locking part is located in the rotation hole, and the second locking part rotately cooperates with the rotating hole; one end of the second locking part is pressed, so that the second unlocking part, instead of the second locking part, is located in the rotation hole, and separates the second locking part and the rotation hole through the channel.

In some embodiments, the wearable device further includes a separator connected to the concave section and/or the connection section, when the user wears the wearable device, the separator wraps at least a part of the user's ear.

In some embodiments, the wearable device further includes a connection part on the concave section and/or the connection section, and the separator is connected to the concave section and/or the connection section through the connection part.

In some embodiments, the connection part is detachably connected to the wearing part.

In some embodiments, the wearable device further includes a visible part, which is physically connected to the wearing part, and the wearing part includes a left ear wearing part and a right ear wearing part, and the left ear wearing part The ear wearing part and the right ear wearing part are in stable contact with the user's left and right ears respectively; The ends of the left ear-mounting part and the right ear-mounting part away from the visible part are connected through the separator.

In some embodiments, the wearable device further includes an adjustment part; the wearing part includes a connection end and an erection end opposite to the connection end, the erection end is in the stable contact with the user's ear, and the adjustment part is alternatively connected to the connection end, so that by replacing the adjustment parts with different lengths, a length of the wearing part is adjusted.

In some embodiments, a first buckle is disposed on the connection end of the wearing part, the end of the adjustment part connecting the wearing part includes a second buckle that is compatible with the first buckle; the adjustment part and the wearing part are connected through a matching between the first buckle and the second buckle.

In some embodiments, the wearable device further includes a visible part, the visible part includes a positioning end; one end of the adjustment part is detachably connected to the wearing part, and the other end is connected to the positioning end of the visible part.

In some embodiments, the positioning end of the visible part includes a buckle part, and the end of the adjustment part connected to the visible part includes a fitting part that fits the buckle part; the adjustment part is connected to the visible part through the fitting of the fitting part and the buckle part.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
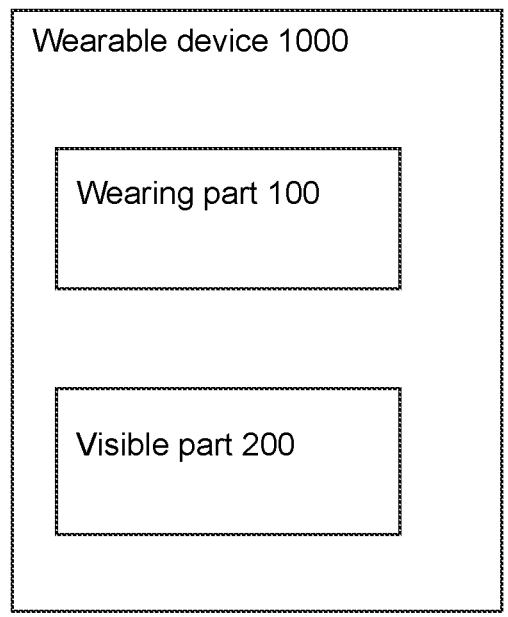
FIG. 1 is a schematic diagram illustrating a wearable device according to some embodiments of the present disclosure.

In order to more clearly explain the technical scheme of the embodiment of this description, a brief description of the accompanying drawings required for the embodiment description is given below. Obviously, the accompanying drawings below are only some examples or embodiments of this description, and it is possible for ordinary technicians skilled in the art to apply this description to other similar scenarios according to these accompanying drawings without creative effort. Unless obviously obtained from the context or the context illustrates otherwise, the same numeral in the drawings refers to the same structure or operation.

It will be understood that the term "system," "engine," "unit," "module," and/or "block" used herein are one method to distinguish different components, elements, parts, sections, or assembly of different levels in ascending order. However, the terms may be displaced by another expression if they achieve the same purpose.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, operations, operations, elements, and/or components, but do not preclude the presence or addition of one or more other features, integers, operations, operations, elements, components, and/or groups thereof.

FIG. 1 is a schematic diagram illustrating a wearable device according to some embodiments of the present disclosure. In some embodiments, a type of a wearable device 1000 may include glasses, a smart bracelet, an earphone, a hearing aid, a smart helmet, a smart watch, a smart clothing, a smart backpack, a smart accessory, etc., or any combination thereof. For example, the wearable device 1000 may be functional myopia glasses, presbyopia glasses, cycling glasses, sunglasses, intelligent glasses (e.g., audio glasses with an earphone function), etc. The wearable device 1000 may further be a helmet, a head-mounted device such as an augmented reality (AR) or a virtual reality (VR) device. In some embodiments, the augmented reality device or the virtual reality device may include a virtual reality helmet, virtual reality glasses, an augmented reality helmet, augmented reality glasses, etc., or any combination thereof. For example, the virtual reality device and/or the augmented reality device may include Google Glass, Oculus Rift, Hololens, Gear VR, etc.

In some embodiments, the wearable device 1000 may include a wearing part 100 and a visible part 200. The visible part 200 is configured to be erected on a certain part of a user's body, such as eyes, hands and other positions. The wearing part 100 may be connected to one end or both ends of the visible part 200 for keeping the wearable device 1000 in a stable contact with the user.

Figure 2:
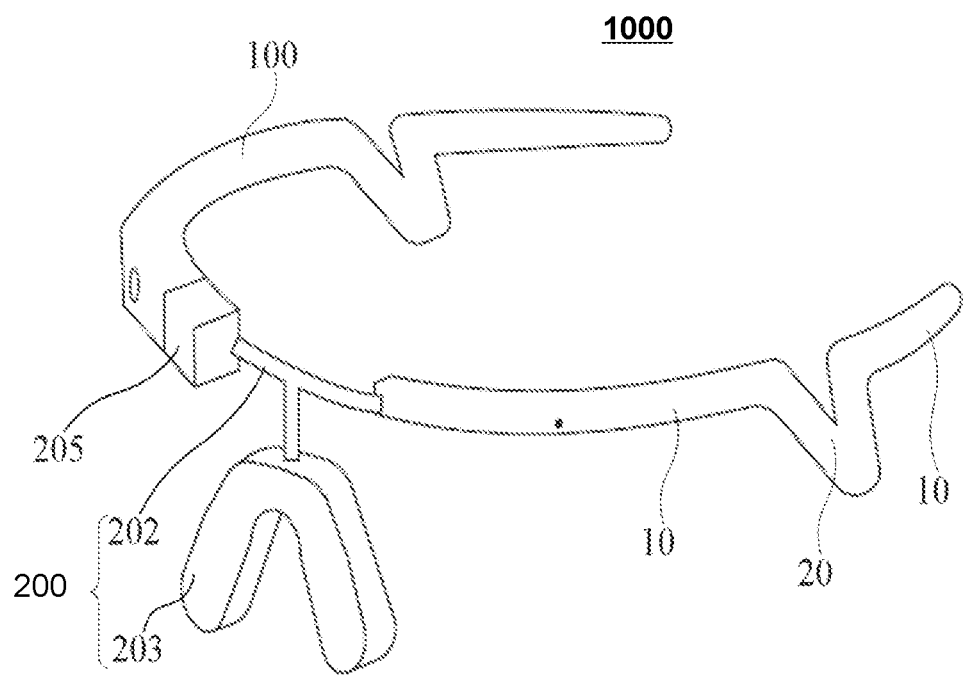
FIG. 2 is a schematic diagram illustrating a wearable device according to some embodiments of the present disclosure.
Figure 3:
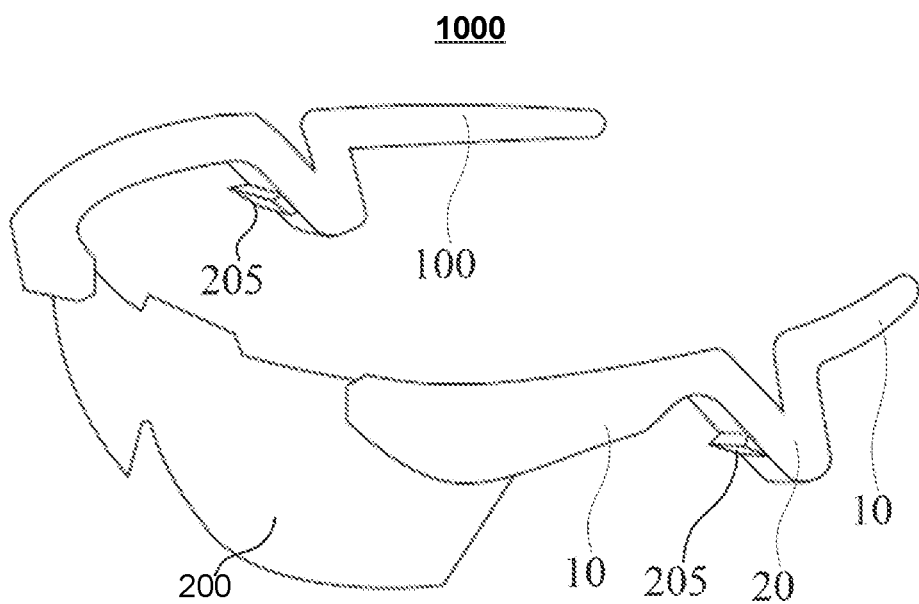
FIG. 3 is a schematic diagram illustrating a wearable device according to some other embodiments of the present disclosure.
Figure 4:
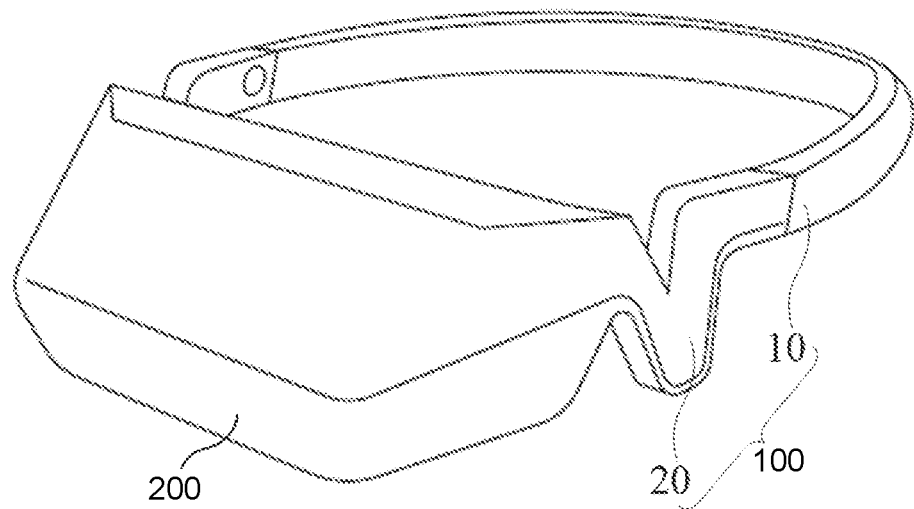
FIG. 4 is a schematic diagram illustrating a wearable device according to some other embodiments of the present disclosure.
Figure 5:
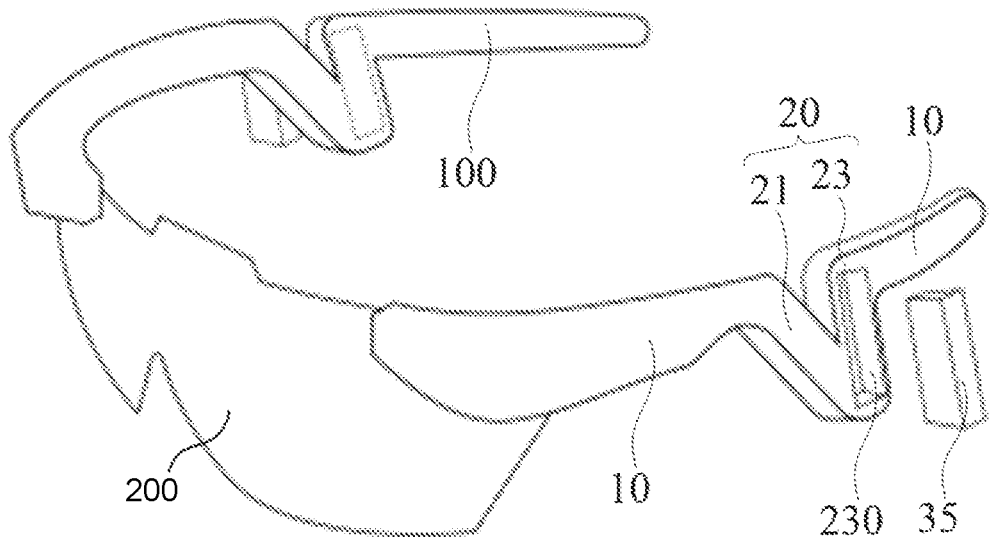
FIG. 5 is a schematic diagram illustrating a wearable device according to some other embodiments of the present disclosure.

FIG. 2 is a schematic diagram illustrating a wearable device according to some embodiments of the present disclosure; FIG. 3 is a schematic diagram illustrating a wearable device according to some other embodiments of the present disclosure; FIG. 4 is a schematic diagram illustrating a wearable device according to some other embodiments of the present disclosure; and FIG. 5 is a schematic diagram illustrating a wearable device according to some other embodiments of the present disclosure. FIG. 2 to FIG. 5 respectively illustrates an exemplary structure of several wearable devices.

In some embodiments, the visible part 200 may be a lens, a display, or a lens with a function of the display. In some embodiments, the visible part 200 may further be a lens and auxiliary parts thereof or a display and auxiliary parts thereof. The auxiliary parts may be assemblies such as a glasses frame or a bracket. In some embodiments, the visible part 200 may further be an auxiliary assembly that does not include any lenses or displays.

In some embodiments, the wearing part 100 may be parts like a temple or a headband, etc. For example, the wearing part 100 may be a temple, and the wearable device 1000 may include a visible part 200 and two wearing parts 100. The two wearing parts 100 may be respectively connected to the two ends of the visible part 200, and may be configured to respectively disposed up on the corresponding left and right ears. For example, the wearing part 100 may be a headband part, and the headband part may be adjusted to adapt to the user's head shape, and various functional parts may further be disposed thereon. The wearable device 1000 may include a visible part 200 and a wearing part 100, and two ends of the wearing part 100 may be respectively connected to the two ends of the visible part 200.

In the embodiment according to FIG. 2, the visible part 200 is an auxiliary assembly, which includes a bracket part 202 and a nose bridge 203. The nose bridge 203 may be connected to the bracket part 202, and the nose bridge 203 may be configured to support on the user's bridge of nose. The two wearing parts 100 may be temples and may be respectively connected to two ends of the bracket part 202. No lens or display may be disposed on the bracket part 202 to form the wearable device 1000 without lens or display. In some embodiments, the bracket part 202 may further be provided with a lens or a display.

In the embodiment shown in FIG. 4, the visible part 200 may be an assembly with a display. The wearing part 100 may be a headband part. The two ends of the wearing part 100 may be respectively connected to the two ends of the visible part 200 to form a head-mounted device (e.g., a head-mounted AR device or a head-mounted VR device) that may be framed on the head of a human body.

In the embodiment according to FIG. 3 and FIG. 5, the visible part 200 may be the lens, and the two wearing parts 100 may be temples respectively connected to two ends of the visible part 200.

In some embodiments, the wearable device 1000 may further include an optical module 205. The optical module 205 may be disposed on the visible part 200 or the wearing part 100, and the optical module 205 may be configured to display image information to realize a display function of the wearable device 1000. As shown in FIG. 2, the optical module 205 may be disposed on the visible part 200. In some embodiments, the optical module 205 may be disposed on the bracket part 202, and the optical module 205 may be a screen assembly for displaying an image. As shown in FIG. 3, the optical module 205 may be disposed on the wearing part 100. In some embodiments, the optical module 205 may include a holographic collimator lens for projecting a holographic image. The optical module 205 may be disposed on the wearing part 100 (e.g., on a mounting part 21 of a concave section 20) to project the holographic image before user's eyes.

In some embodiments, the wearing part 100 and the visible part 200 may be connected in a rotational or a telescopic connection, or may be connected in a relatively fixed manner such as a clamping connection, a screw connection or an integral molding connection.

It should be noted that the above descriptions about the wearable device 1000 are only for illustration purpose, and do not limit the scope of the present disclosure. For those skilled in the art, various modifications and changes may be made to the wearable device 1000 under the guidance of the present disclosure. However, such modifications and changes are still within the scope of the present disclosure. For example, the optical module 205 and the bracket part 202 may be combined into one unit, so that the bracket part 202 has the function of displaying an image.

In some embodiments, the wearable device 1000 may be a device capable of playing an audio. For example, the wearable device may include at least one set of speaker assemblies The speaker assemblies may generate sound and transmit the sound to the user through air conduction or bone conduction.

A speaker assembly may be configured to convert a signal containing audio information into an audio signal. For example, the speaker assembly may generate a mechanical vibration to transmit a sound wave (i.e., the sound signal) in response to receiving the signal containing sound information. In some embodiments, the speaker assembly may include a vibration element and/or a vibration conduction element (e.g., at least a part of a shell of the wearable device 1000) connected to the vibration element. When the speaker assembly produces a mechanical vibration, an energy conversion is accompanied, and the speaker assembly may realize the conversion of the signal containing sound information into the mechanical vibration. The process of conversion may include a coexistence and a conversion of many different types of energy. For example, an electrical signal (a signal containing the sound information) may be directly converted into the mechanical vibration through a transducer (not shown in the FIGS.) in the vibration element (not shown in the FIGS.) of the speaker assembly, and the sound wave may be transmitted through conducting the mechanical vibration through the vibration conduction element of the speaker assembly. As another example, the sound information may be contained in an optical signal and a specific transducer may realize a process of converting the optical signal into a vibration signal. Other types of energy that may coexist and convert during the working process of the transducer may include thermal energy, magnetic field energy, etc. An energy conversion mode of the transducer may include a moving coil type, an electrostatic type, a piezoelectric type, a moving iron type, a pneumatic type, an electromagnetic type, etc.

In some embodiments, the speaker assembly may include one or more bone conduction speakers. In some embodiments, the speaker assembly may include one or more air conduction speakers. In some embodiments, the speaker assembly may include a combination of one or more bone conduction speakers and one or more air conduction speakers.

In some embodiments, the speaker assembly may be provided on the wearing part 100 and/or the visible part 200. In some embodiments, the speaker assembly may be provided at the wearing part 100 to facilitate a transmission of the emitted sound to the user. In some embodiments, the speaker assembly may be disposed at a tail (an end away from the visible part 200), a head (an end close to the visible part 200), or any position between the tail and the head of the wearing part 100. For example, the speaker assembly may be disposed at the tail of the wearing part 100, while no speaker assembly is provided at other positions of the wearing part 100. In some embodiments, a plurality of speaker assemblies may be located at a plurality of locations on the wearing part 100. For example, at least one speaker assembly may be provided at the tail, the head, or any position between the tail and the head of the wearing part 100.

In some embodiments, the speaker assembly may be disposed on an outer surface of the wearing part 100 or an inside of the wearing part 100. For example, the speaker assembly may be located near a location (e.g., on the wearing part 100 near the temple to the ear) where the wearing part 100 contacts the user. For another example, the wearing part 100 may include a cavity for accommodating the speaker assembly, and at least a part of the speaker assembly may be accommodated in the cavity.

In some embodiments, the wearable device 1000 may have at least one acoustic output end. The at least one acoustic output end may be connected to the at least one speaker assembly for transmitting the sound signal generated by the at least one speaker assembly to the user.

The acoustic output end may be understood as a structure suitable for transmitting the sound signal generated by the speaker assembly to the user. For example, when the speaker assembly is a bone conduction speaker, the mechanical vibration signal may be transmitted to the user's skull through a part in contact with the user (e.g., the vibration surface 33), so that the user can hear the sound. Therefore, the part that is in contact with the user and transmits the mechanical vibration to the user may be understood as the acoustic output end. For another example, if the speaker assembly is an air conduction speaker, when the speaker assembly works, a vibration film in the speaker assembly may vibrate and cause air in the speaker assembly to generate the vibration (that is, the sound wave), and the sound wave may be transmitted through the parts on the wearable device 1000 (e.g., a sound hole 31) to the outside of the wearable device 1000 and further transmitted to the user's ear for the user to hear the sound, so the structure provided on the wearable device 1000 for deriving the sound wave may be understood as the acoustic output end. In some embodiments, the acoustic output end and the speaker assembly may be connected through a sound conduction element (e.g., a sound conduction tube, an acoustic cavity). For example, the acoustic output end may be far away from the speaker assembly, and the acoustic output end and the speaker assembly may be connected through the sound conduction tube. For another example, the air conduction speaker and the wearing part 100 may each have a shell, and the shell of the air conduction speaker and the shell of the wearing part 100 may be both provided with a hole structure and may be communicated through the sound tube. The sound wave generated by the air conduction speaker may be transmitted to the outside of the wearing part 100 through the sound tube and the hole structure of the shell structure of the wearing part 100. In some embodiments, the acoustic output end may be a part of the speaker assembly, and the sound generated by the speaker assembly may be directly transmitted to the acoustic output end and then transmitted to the outside of the wearable device 1000 through the acoustic output end. For example, the air conduction speaker may be disposed inside the wearing part 100, the shell of the air conduction speaker may be the shell of the wearing part 100, and the shell of the air conduction speaker may be provided with the hole structure. When the vibration film of the air conduction speaker vibrates, the vibration film may cause the air inside the shell to vibrate and generate the sound wave, and the sound wave may be transmitted to the outside of the shell through the hole structure on the shell. The hole structure may be understood as the acoustic output end.

In some embodiments, the acoustic output end may be disposed at any position of the wearable device 1000. For example, when the wearable device 1000 is the glasses shown in FIG. 3, the acoustic output end may be disposed on a lens, a frame and/or a temple of the glasses.

In some embodiments, the closer the position of the acoustic output end is to the user's ear, the greater a strength of the sound signal that the user's ear receives is. Therefore, in some embodiments, the acoustic output end may be disposed on the wearing part 100 of the wearable device 1000 near the user's ear, so as to shorten a distance between the acoustic output end and the user's ear. However, in some embodiments, the wearing part 100 may be a bar or a strip. For example, when the wearable device 1000 is the glasses, the wearing part 100 may be a straight bar structure which only has a slight curvature at one end (away from one end of the visible part 200). When the user wears the wearable device 1000, a contact surface or a contact point between the wearing part 100 and the user's ear may be usually located above the ear, resulting in a relatively long distance between the acoustic output end and the user's ear channel, which affects the strength of the sound signal received by the user.

Based on the above reasons, some embodiments of the present disclosure provide a wearing part 100 including at least one concave section. The at least one concave section may depress downward relative to other parts of the wearing part 100 (that is, the direction facing a direction of the user's neck when the user wears the wearable device 1000), thereby forming a depression on the wearing part 100, so as to be closer to the user's tragus. When the acoustic output end is located in the concave section, it may be closer to the user's ear channel, which is more convenient for the sound transmission. In addition, compared with the situation without the concave section, the wearing part 100 may have a greater extension length due to an existence of the concave section. The wearing part 100 may have a better flexibility and be more suitable for an adaptive deformation according to the shape of the user's head. The wearing part 100 may be easier for the user to wear. The concave section of the wearing part 100 may be described in detail below with reference to FIGS. 2 to 17.

As shown in FIGS. 2 to 5, in some embodiments, the wearable device 1000 may include at least one wearing part 100 and the visible part 200 connected to the at least one wearing part 100. The wearing part 100 may be provided with at least one concave section 20 and at least one connection section 10 connected to the at least one concave section 20. The at least one concave section makes an upper edge of the at least one wearing part depress downward. In this embodiment, as a concave section 20 is folded, a flexibility of the concave section 20 may be increased. Due to an existence of the concave section 20, the wearing part 100 may be suitable for the adaptive deformation according to the shape of the user's head, which makes it easy for the user to wear.

FIG. 6 to FIG. 12 are schematic diagrams illustrating exemplary wearing parts according to some embodiments of the present disclosure. As shown in FIGS. 6 to 12, in some embodiments, the at least one concave section 20 may include at least one acoustic output end 30 therein. A concave section 20 of the at least one concave section 20 may be configured to mount the acoustic output end 30 and make the acoustic output end 30 close to the user's ear. The connection section 10 may be erected on the user's auricle and configured to connect the concave section 20 and the visible part 200.

In some embodiments, the wearing part 100 may include at least one connection section 10 and at least one concave section 20, and the at least one concave section 20 may be physically connected (e.g., through bonding, inlaying, welding, riveting, screwing, snapping, etc.) to the connection section 10. The concave section 20 makes the upper edge of the wearing part 100 have a downward depression 22 on the wearing part 100, and there may be at least one acoustic output end 30 on the concave section 20.

In some embodiments, the wearable device 1000 may be a head-mounted device. When the user wears the wearable device 1000, the wearing part 100 may be in contact with the user's ear, for example, the wearing part may be in contact with the user's auricle to keep stable. When the at least one connection section 10 is configured for the stable contact with the user's auricle, the acoustic output end 30 may extend to the tragus along with the concave section 20 to be close to the user's external ear channel, so that the sound transmitted from the acoustic output end 30 may be transmitted to the user.

In some embodiments, the speaker assembly may be disposed in the concave section 20 and connected to the acoustic output end 30, and may extend toward the tragus along with the concave section 20, so as to transmit the sound to the user.

It should be noted that the disposing the speaker assembly on the concave section 20 is only an example, and those skilled in the art may easily know that the simple change of disposing the speaker assembly at any position of the wearable device 1000 and guiding the speaker assembly using the sound conduction element like a sound conduction tube to the acoustic output end 30 in the concave section 20 is within the scope of the present disclosure. For example, the speaker assembly may be disposed at the connection section 10. For another example, the speaker assembly may be disposed at the end of the connection section 10 close to the visible part 200. For another example, the speaker assembly may be disposed at the end of the connection section 10 away from the visible part 200.

For the convenience of understanding, an upward direction described in the present disclosure may be a direction facing a top of the user's head when the user wears the wearable device 1000. A downward direction described in the present disclosure may be a direction facing the user's neck. A side of the wearing part 100 facing the user's head may be an inner side of the wearing part 100 (i.e., an inner wall of the wearing part 100), and a side opposite to the inner side may be an outer side (i.e., an outer wall of the wearing part 100).

As shown in FIGS. 6-12, in some embodiments, the at least one concave section 20 may make the at least one acoustic output end 30 near the user's ear. After the wearing part 100 is disposed with the concave section 20, the concave section 20 may be depressed downward relative to the connection section 10, so as to shorten the distance from the user's ear. The acoustic output end 30 disposed in the concave section 20 may be therefore closer to the user's ear.

In some embodiments, the at least one concave section 20 may make the acoustic output end 30 located in front of the user's ear. As used herein, "in front of the user's ear" may be understood as on the side of the user's ear facing the user's face. For example, in the embodiment shown in FIGS. 6 to 12, when the user wears the wearable device 1000, the concave section 20 may be located on the side of the ear facing the user's eyes, so that the acoustic output end 30 disposed on the concave section 20 may be close to the user's tragus, the sound signal from the acoustic output end 30 may be easily transmitted to the user's ear.

In some embodiments, the concave section 20 may be located on the side of the auricle away from the user's eyes. In some embodiments, the concave section 20 may make the at least one acoustic output end 30 behind the ear. For example, a count of the at least one acoustic output end 30 may be multiple, and the multiple acoustic output ends 30 may all be located behind the ear. In some embodiments, when the user wears the wearable device 1000, at least one acoustic output end 30 may be disposed both in front of and behind the user's ear. For example, a count of at least one acoustic output end 30 may be multiple, and at least one of the acoustic output ends 30 may be disposed on the concave section 20 and located in front of the user's ear along with the lower concave section 20, and the at least one of the acoustic output ends 30 may be disposed on the connection section 10 and located behind the user's ear. A disposing form and the count of the at least one acoustic output end 30 may be adjusted according to the actual condition.

In some embodiments, the concave section 20 may be disposed in any feasible shape. The shape of the concave section 20 may be understood as the shape of the structure of the concave section 20 or the shape of a depression 22 of the concave section 20. Exemplary shapes of the concave section 20 may include, but not limited to, a Y shape, a V shape, and a folded shape, and several exemplary concave sections are described below.

As shown in FIGS. 6-12, at least one concave section 20 may include a mounting part 21 and a transition part 23. An angle is formed between the mounting part 21 and the transition part 23. The acoustic output end 30 may be disposed in the mounting part 21 and/or in the transition part 23. At least one of the mounting part 21 and the transition part 23 may be in a bent connection with the connection section 10 and the extend downwards, so as to extend toward the tragus of the user when worn by the user, and shorten the distance between the acoustic output end 30 disposed therein and the external ear channel. The mounting part 21 may refer to a part of the concave section 20 that is close to the visible part 200. The transition part 23 may refer to a part of the concave section 20 that is close to the user's ear. In some embodiments, the mounting part 21 and the transition part 23 may have different shapes or the same shape, and the mounting part 21 and the transition part 23 of the concave section 20 may be connected at any angle, thereby forming the concave section 20 of different shapes. Here, the mounting part 21 and the transition part 23 of the concave section 20 being connected at any angle may mean that the angle formed after the connection of the mounting part 21 and the transition part 23 may be of any degree. In some embodiments, the angle formed between the mounting part 21 and the transition part 23 may be in a range between 5°-150°. In some embodiments, the angle formed between the mounting part 21 and the transition part 23 may be in a range between 10°-150°. In some embodiments, the angle formed between the mounting part 21 and the transition part 23 may be in a range between 15°-135°. In some embodiments, the angle formed between the mounting part 21 and the transition part 23 may be in a range between 20°-120°. In some embodiments, the angle formed between the mounting part 21 and the transition part 23 may be in a range between 30°-90°. For example, the angle formed between the mounting part 21 and the transition part 23 may be 30°, 60°, 90°, 120°, etc.

In some embodiments, the mounting part 21 and the transition part 23 may be connected in a detachable manner, such as a screw connection or a plug-in connection. In some embodiments, the connection section 10 and the concave section 20 may be fixedly connected. For example, the connection section 10 and the concave section 20 may be connected by means of welding, riveting, bonding, etc. In some embodiments, the mounting part 21 and the transition part 23 may further be directly connected, or connected through an adjustment structure. The adjustment structure may be a hinge, a spherical hinge, or a telescopic rod, etc. The adjustment structure may make the transition part 23 rotate or translate relative to the mounting part 21.

Figure 6:
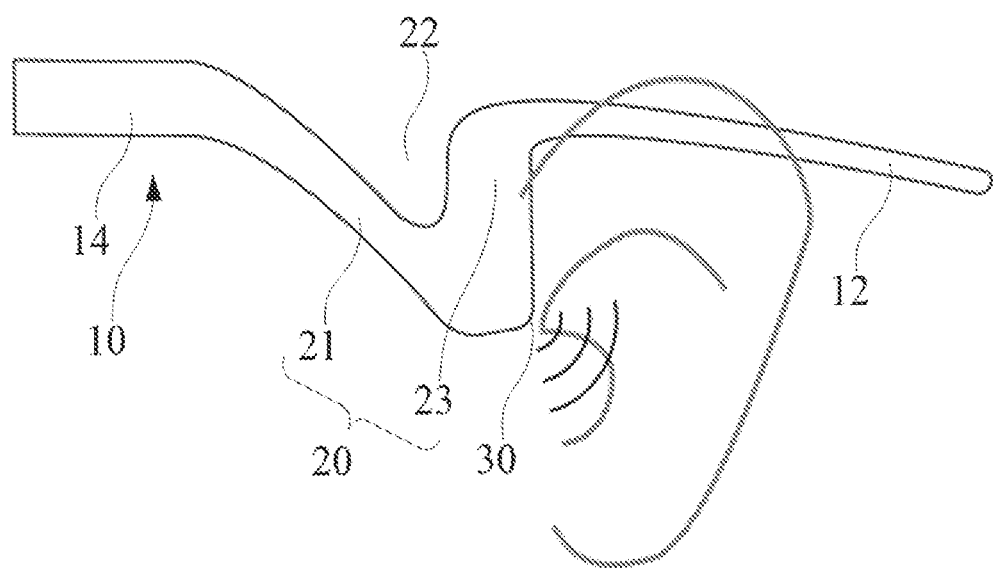
FIG. 6 is a schematic diagram illustrating a wearing part according to some embodiments of the present disclosure.

FIG. 6 illustrates an exemplary implement manner of the concave section 20. As shown in FIG. 6, the concave section 20 may be V-shaped, that is, the shape of the depression formed by the mounting part 21 and the transition part 23 is V-shaped. One end of the transition part 23 may be connected to a part of the connection section 10 away from the visible part 200 (e.g., the first connection section 12), and the other end extends downward, and the angle formed between the transition part 23 and the connection section 10 is approximately 90°. One end of the mounting part 21 is connected to a part of the connection section 10 close to the visible part 200 (e.g., the second connection section 14), and the other end extends toward the user's tragus and is inclined at a certain angle relative to the connection section 10. The mounting part 21 may be connected to the transition part 23 and form the downward V-shaped depression 22. In some embodiments, a length of the transition part 23 may be less than a length of the mounting part 21. The length here may refer to an end-to-end distance of the parts, for example, the distance from the end of the transition part 23 connecting the first connection section 12 to the end connecting the mounting part 21 is the length of the transition part 23. In some embodiments, a cross-sectional size of the transition part 23 may be greater than that of the mounting part 21. The cross-sectional size of a part may intuitively represent a thickness of the part. For example, the cross-sectional size of the transition part 23 in FIG. 6 being greater than that of the mounting part 21 may refer to that the transition part 23 is thicker than the mounting part 21. In other embodiments of the present disclosure, the cross-sectional size of the transition part 23 may be smaller than or equal to the cross-sectional dimension of the mounting part 21. In some embodiments, to make the acoustic output end 30 disposed in the concave section closer to the ear when the user wears the wearable device, the angle between the transition part 23 and the first connection section 12 may be disposed within a certain range. In some embodiments, the angle between the transition part 23 and the first connection section 12 may be within a range of 20°-120°. In some embodiments, the angle between the transition part 23 and the first connection section 12 may be within a range of 25°-110°. In some embodiments, the angle between the transition part 23 and the first connection section 12 may be within a range of 30°-100°. In some embodiments, the angle between the transition part 23 and the first connection section 12 may be within a range of 30°-90°.

Figure 7:
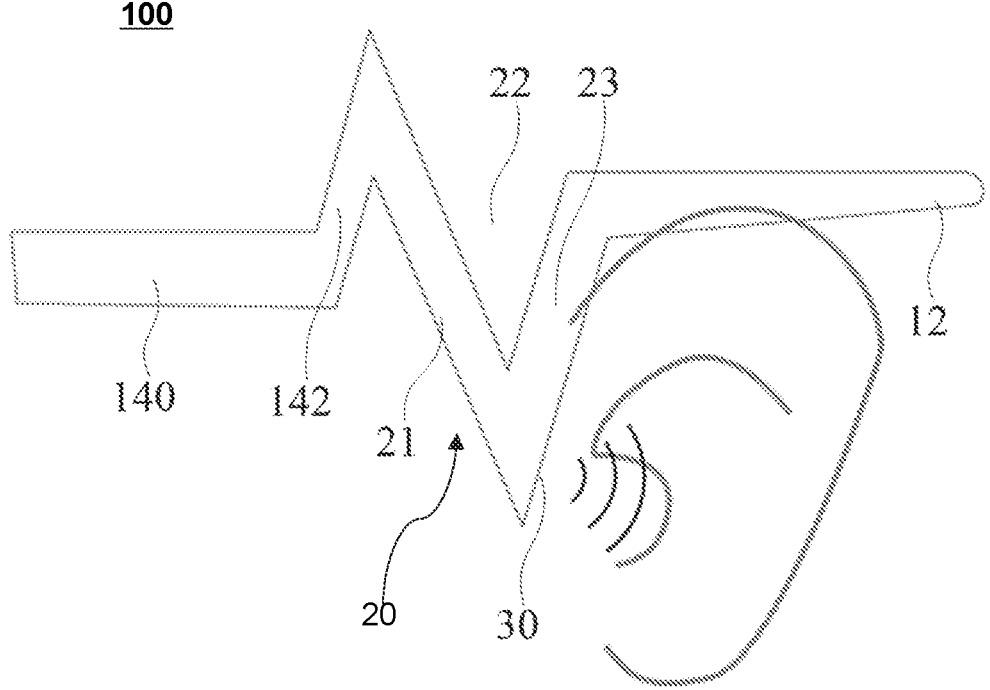
FIG. 7 is a schematic diagram illustrating a wearing part according to some embodiments of the present disclosure.

FIG. 7 illustrates another exemplary embodiment of a concave section. Similar to FIG. 6, as shown in FIG. 7, the concave section 20 may be V-shaped. Different from FIG. 6, in FIG. 7, the connection section 10 (e.g., a bent part 142) may be connected to the end of the mounting part 21 away from the transition part 23 and form an upwardly bent structure. The upwardly bent structure may further increase an extension length of the wearing part 100. The wearing part 100 may be relatively flexible, and may adaptively deform to the shape of the user's head.

Figure 8:
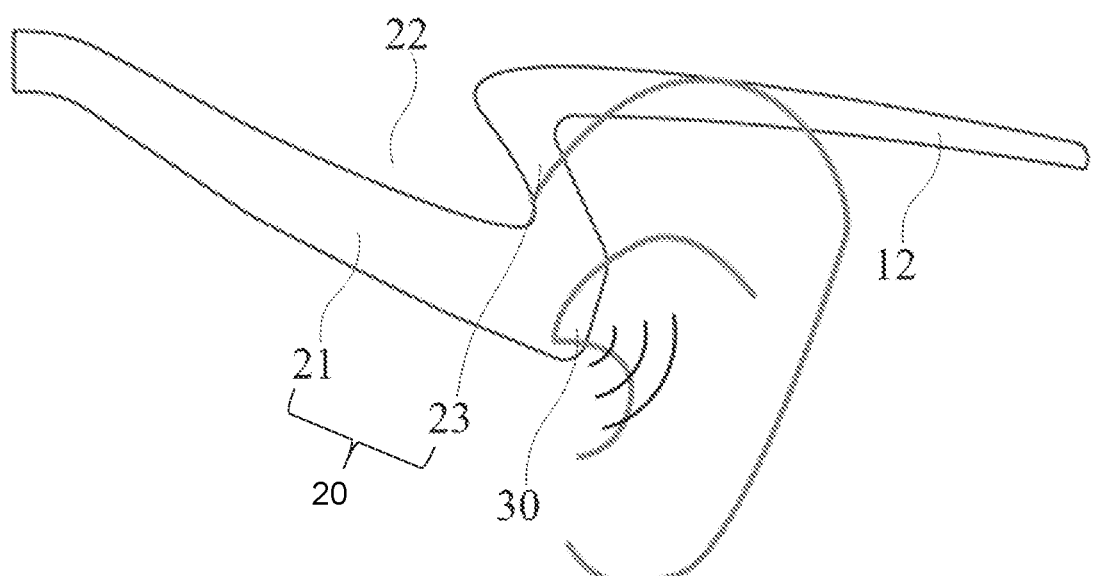
FIG. 8 is a schematic diagram illustrating a wearing part according to some embodiments of the present disclosure.

FIG. 8 illustrates another exemplary embodiment of a concave section. As shown in FIG. 8, the transition part 23 and the mounting part 21 may also form a V-shaped concave section 20. One end of the transition part 23 is connected to the connection section 10 to form an arc surface, and the angle of the arc surface may be an acute angle. The other end of the transition part 23 may extend toward the user's tragus. One end of the mounting part 21 may be connected to the end of the transition part 23 away from the connection section 10, and the end of the mounting part 21 away from the transition part 23 may be located on an extension line of the connection section 10 (e.g., the first connection section 12), and finally form a V-shape structured connection section 12. In some embodiments, the angle of the depression 22 of the V-shape structured connection section 12 (that is, the angle formed between the mounting part 21 and the transition part 23) may be less than 75°. In some embodiments, the angle of the depression 22 of the V-shape structured connection section 12 may be less than 60°. In some embodiments, the angle of the depression 22 of the V-shape structured connection section 12 may be less than 45°. In some embodiments, the angle of the depression 22 of the V-shape structured connection section 12 may be less than 30°. In the embodiment shown in FIG. 8, the length of the transition part 23 is smaller than the length of the mounting part 21. The cross-sectional size of the transition part 23 may be smaller than the cross-sectional size of the mounting part 21. In some embodiments, the end of the mounting part 21 away from the transition part 23 may be located on the extension line of the connection section 10, which may facilitate a direct connection with the visible part 200, thereby making the wearing part 100 suitable for the user to wear. In some embodiments, the end of the mounting part 21 away from the transition part 23 may further be located near the extension line of the connection section 10. For example, the end of the mounting part 21 away from the transition part 23 may be located above (the side away from the user's neck) or below (the side close to the user's neck) the extension line of the connection section 10.

Figure 9:
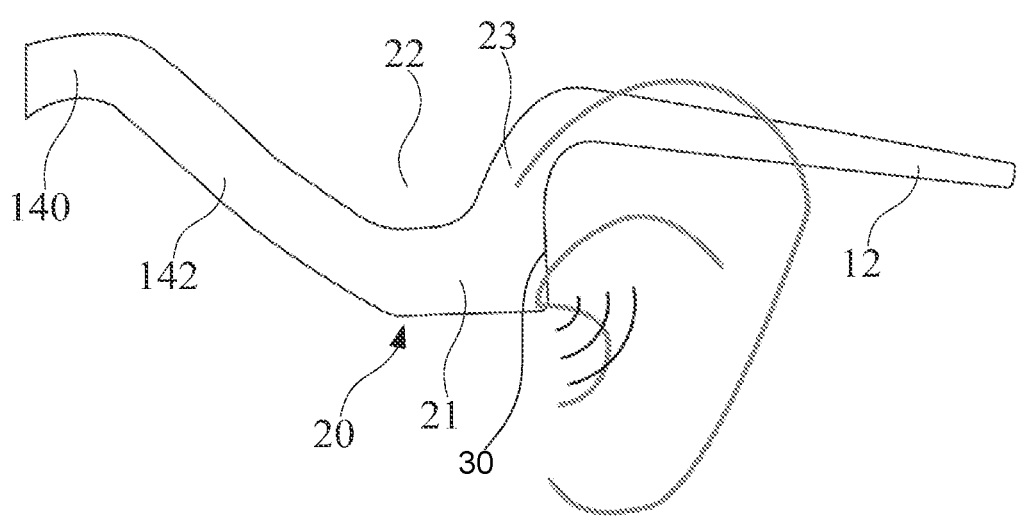
FIG. 9 is a schematic diagram illustrating a wearing part according to some embodiments of the present disclosure.

FIG. 9 illustrates another embodiment of the concave section 20. As shown in FIG. 9, the mounting part 21 and the transition part 23 may be connected to form an L-shaped concave section 20. One end of the mounting part 21 may be connected to the connection section 10 (e.g., the bent part 142), and the other end extends toward the user's tragus side along a horizontal direction. One end of the transition part 23 may be connected to the connection section 10 (e.g., the first connection section 12) and forms an arc angle with the connection section 10. The other end of the transition part 23 may extend vertically and connects with the other end of the mounting part 21, thereby forming an L-shaped concave section 20. In some embodiments, the angle of the depression 22 of the L-shaped concave section 20 (that is, the angle formed between the transition part 23 and the mounting part 21) may be greater than 90°. In some embodiments, the angle of the depression 22 of the L-shaped concave section 20 may be greater than 100°. In some embodiments, the angle of the depression 22 of the L-shaped concave section 20 may be greater than 110°.

Figure 10:
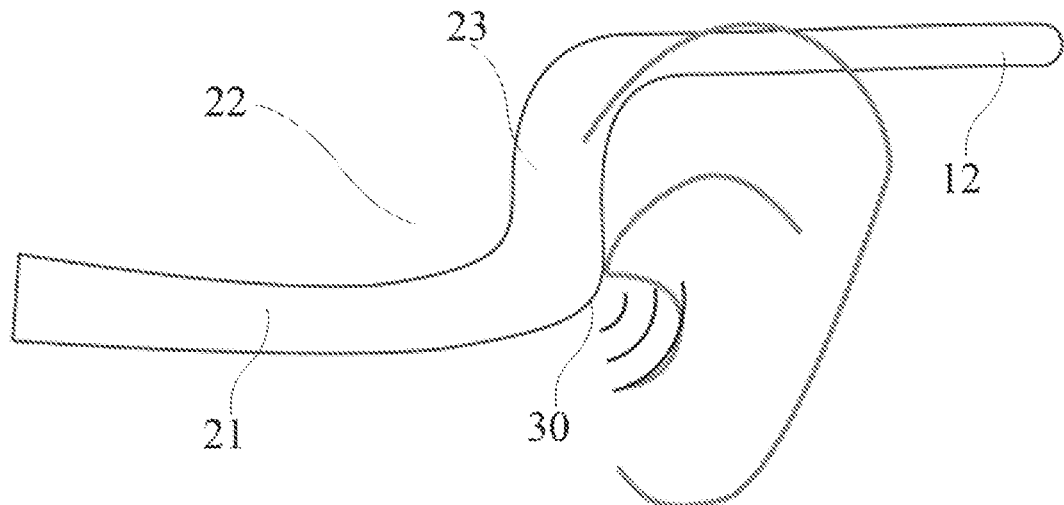
FIG. 10 is a schematic diagram illustrating a wearing part according to some embodiments of the present disclosure.

In addition, FIG. 10 illustrates another exemplary embodiment of the concave section 20. In the embodiment shown in FIG. 10, the mounting part 21 and the transition part 23 may further form an L-shaped concave section 20. The length of the transition part 23 may be smaller than the length of the mounting part 21. Different from FIG. 9, the angle formed between the mounting part 21 and the transition part 23 may be approximately a right angle, and the end of the mounting part 21 away from the transition part 23 may be not located on the extension line of the connection section 10. Similar to FIG. 9, in the embodiment shown in FIG. 10, the end of the mounting part 21 away from the transition part 23 may be directly connected to the visible part 200. In some embodiments, the end of the mounting part 21 away from the transition part 23 may be indirectly connected to the visible part. For example, the end of the mounting part 21 away from the transition part 23 may be connected to the connection section 10 (e.g., the second connection section 14), and then connected to the visible part 200 through the connection section 10.

Figure 11:
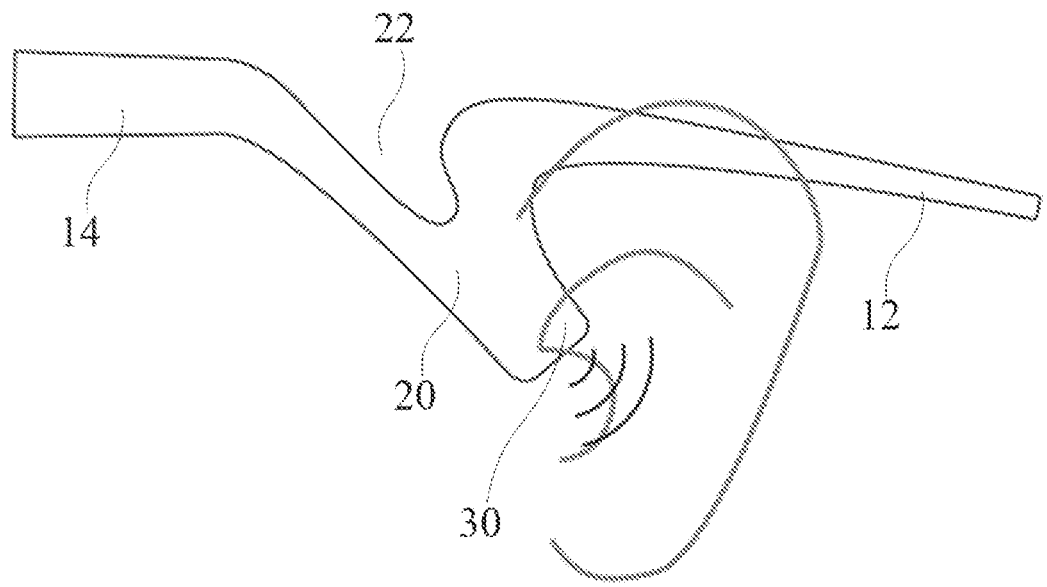
FIG. 11 is a schematic diagram illustrating a wearing part according to some embodiments of the present disclosure.

FIG. 11 illustrates another exemplary embodiment of the concave section 20. As shown in FIG. 11, the mounting part 21 and the transition part 23 may be connected to form a Y-shaped concave section 20. In some embodiments, the cross-sectional size of the mounting part 21 may be smaller than the cross-sectional size of the transition part 23. The length of the mounting part 21 may be greater than the length of the transition part 23. The transition part 23 has a certain radian, so that the end of the transition part 23 away from the connection section 10 (e.g., the first connection section 12) extends toward the user's tragus. The mounting part 21 may be connected to the transition part 23 away from the connection section 10 (e.g., the second connection section 14) to form the Y-shaped concave section 20. A bottom of the Y-shaped concave section 20 faces the user's tragus. Two branches at a top of the Y-shaped concave section 20 are connected to the connection section 10 (e.g., the transition part 23 is connected to the first connection section 12, and the mounting part 21 is connected to the second connection section 14). In some embodiments, the acoustic output end 30 may be disposed at the top (e.g., at the two branches) of the Y-shaped concave section 20. In some embodiments, the acoustic output end 30 may be disposed at the bottom of the Y-shaped concave section 20, so as to shorten the distance from the tragus of the user's ear.

Figure 12:
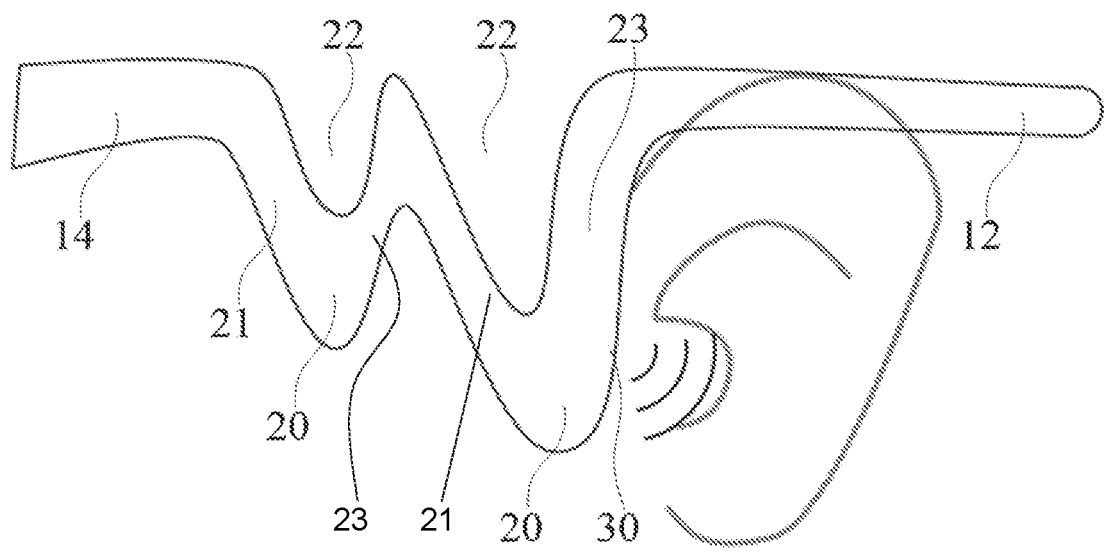
FIG. 12 is a schematic diagram illustrating a wearing part according to some embodiments of the present disclosure.

In some embodiments, the at least one concave section 20 may include a plurality of concave sections 20. As shown in FIG. 12, a count of the at least one concave section 20 may be two. The transition part 23 of the concave section 20 on the right (referred to as a first concave section) may be connected to the connection section 10 (e.g., the first connection section 12) and the mounting part 21 to form the V-shaped depression 22. The transition part 23 of the concave section 20 on the left (referred to as a second concave section) is connected to the mounting part 21 of the first concave section and the connection section (e.g., the second connection section 14), to form the V-shaped depression 22. The angles of the two V-shaped depressions 22 may be the same or different.

It should be noted that the foregoing one or more embodiments are for illustration purposes only, and are not intended to limit the shape or count of the concave sections 20. After fully understanding the principle of the concave section 20, the concave section 20 may be deformed to obtain the concave section 20 different from the embodiment of the present disclosure. For example, the shapes of the mounting part 21 and the transition part 23 may be adjusted, so that the shape of the concave section 20 formed by the mounting part 21 and the transition part 23 may be U-shaped. In some embodiments, the wearing part 100 may include a plurality of concave sections 20, and each concave section 20 may have a different shape. For example, the wearing part 100 may include two concave sections 20, one of which is a V-shaped structure as shown in FIG. 6, and the other concave section 20 is a Y-shaped structure as shown in FIG. 11.

As shown in FIGS. 6-12, in some embodiments, at least one connection section 10 may include the first connecting section 12. The transition part 23 may be connected between the mounting part 21 and the first connection section 12, and the transition part 23 may be bent and connected to the first connection section 12 and extend downward. The first connection section 12 may be connected to the transition part 23 of the concave section 20 for erecting the wearing part 100 on the auricle of the user. The transition part 23 may extend downward relative to the first connection section 12 to form a depression 22, and then form the concave section 20.

In some embodiments, the concave section 20 may be directly connected to the visible part 200. For example, in the embodiment shown in FIG. 8, the end of the mounting part 21 away from the transition part 23 may be located on the extension line of the connection section 10 (e.g., the first connection section 12), thereby being connected to the visible part 200. In some embodiments, the concave section 20 and the visible part 200 may be connected by clamping, riveting, nailing, bonding, etc. In some embodiments, the concave section 20 and the visible part 200 may be integrally formed.

In some embodiments, the concave section 20 may be connected to the visible part 200 through an additional connection structure. Referring to FIGS. 7 and 9, the at least one connection section 10 may further include the second connection section 14. The second connection section 14 may be connected to one end of the mounting part 21, and the end of the second connection section 14 away from the mounting part 21 may be configured for connecting the visible part 200.

In some embodiments, the at least one connection section 10 may include the first connection section 12 and the second connection section 14. The at least one concave section 20 may include one concave section 20. The concave section 20 is connected between the first connection section 12 and the second connection section 14. The first connection section 12 may be configured for erecting on the auricle. The second connection section 14 may be configured for connecting the visible part 200. In some embodiments, the second connection section 14 may be a bar (as shown in FIG. 6) connected to one end of the mounting part 21 and extend away from the first connection section 12. The concave section 20 may extend downward relative to the first connection section 12 and the second connection section 14, and form a convex shape relative to the first connection section 12 and the second connection section 14, and form the depression 22.

In some application scenarios, when the wearing part 100 is erected on the user's auricle, the concave section 20 may be located on the side of the auricle facing the user's eyes, so that when the user wears the wearable device 1000, the concave section 20 extends toward the tragus, so that the acoustic output end 30 located in the concave section 20 is close to the tragus, so as to be close to the user's external ear channel, shorten the distance between the acoustic output end 30 and the user's ear. As a result, the sound may be easily transmitted to the user, and an interference of an environmental noise on the sound output by the acoustic output end may be reduced. The depression 22 may be formed on the concave section 20, so that the concave section 20 is in a folded state, thereby increasing the flexibility of the concave section 20. Due to an existence of the concave section 20, the wearing part 100 may be suitable for the adaptive deformation according to the shape of the user's head, which makes it easy for the user to wear.

In some embodiments, the wearing part 100 may be an integrated structure. For example, the first connection section 12, the second connection section 14, and the concave section 20 may be integrally formed. In some embodiments, the wearing part 100 may further be a split structure, that is, the wearing part 100 may be composed of multiple parts. For example, the first connection section 12, the second connection section 14, and the concave section 20 may be independent parts, which are assembled after molding respectively. In some embodiments, the first connection section 12 and the concave section 20 may be integrated, while the second connection section 14 may be an independent part. In some embodiments, the second connection section 14 and the concave section 20 may be integrated, while the first connection section 12 may be an independent part.

In some embodiments, the connection section 10 (e.g., the first connection section 12 and the second connection section 14) and the concave section 20 may be connected in a detachable manner, such as a screw connection or a plug-in connection. In some embodiments, the connection section 10 and the concave section 20 may be fixedly connected. For example, the connection section 10 and the concave section 20 may be connected by means of welding, riveting, bonding, etc. In some embodiments, the connection section 10 and the concave section 20 may further be rigidly connected, or may be connected by an adjustment structure. The adjustment structure may be a hinge, a screw nut, a lead screw nut, etc., and the adjustment structure may make the concave segment 20 rotate or translate relative to connecting section 10.

In some embodiments, the second connection section 14 may include a connection part 140 and a bent part 142. The connection part 140 may be configured to connect the visible part 200 and the bent part 142. The bent part 142 may be bent relative to the connection part 140, and an end of the bent part 142 away from the connection part 140 may be connected to the mounting part 21 of the concave section 20. By disposing the bent part 142, an extension length of the wearing part 100 may be increased, a flexibility of the wearing part 100 may be improved, and the user's comfort when wearing the wearable device 1000 may be improved.

As shown in FIG. 9, in some embodiments, the second connection section 14 may include the connection part 140 and the bent part 142 connected with each other. The bent part 142 may be bent downward relative to the connection part 140, and the end of the bent part 142 away from the connection part 140 may be connected to the mounting part 21 of the concave section 20. The end of the connection part 140 away from the bent part 142 may be configured for connecting the visible part 200 (not shown in the figure). The connection part 140 extends along the side departing the first connection section 12.

As shown in FIG. 7, in some embodiments, the bent part 142 may be bent upward relative to the connection part 140, and the bent part 142 may be connected to the mounting part 21. Compared with the bent part 142 in FIG. 9, the end of the bent part 142 in FIG. 7 away from the connection part 140 may firm a bent angle with the mounting part 21, which may further improve the extension length of the wearing part 100, making the wearing part 100 relatively flexible, thereby adaptively deforming to the shape of the user's head.

It should be noted that the contents about the connection part 140 and the bent part 142 are not limited to the second connection section 14. Similarly, in some embodiments, the first connection section 12 may also have a connection part 140 and a bent part 142. For example, the connection part 140 of the first connection section 12 may be configured to connect the transition part 23, and the bent part 142 may be connected to the end of the connection part 140 away from the transition part 23. The bent part 142 may be bent downward relative to the connection part 140 and abut against a back of the user's ear, which may prevent the wearing part 100 from being detached from the ear.

Figure 13:
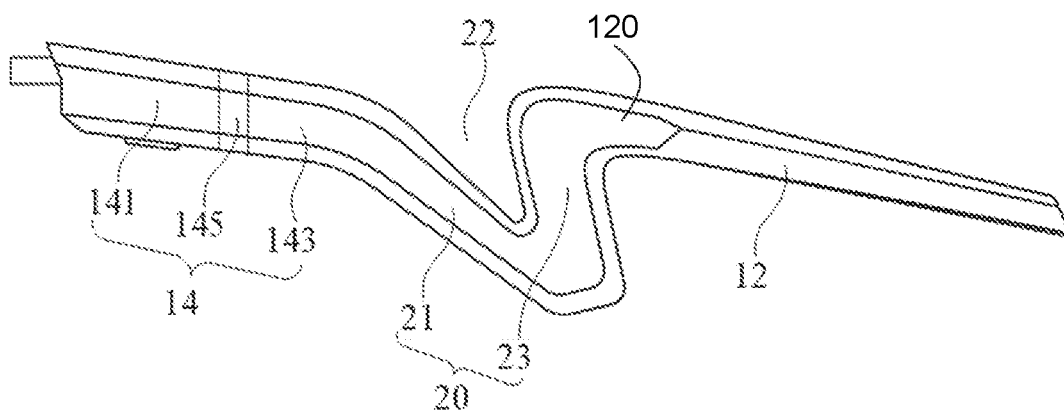
FIG. 13 is a schematic diagram illustrating a wearing part according to some embodiments of the present disclosure.

FIG. 13 is a schematic diagram illustrating the structure of the wearing part according to some embodiments of the present disclosure. As shown in FIG. 13, the second connection section 14 may include a first leg 141 and a second leg 143 connected to each other. The first leg 141 may be configured to connect the visible part 200, and the second leg 143 may be configured to connect the mounting part 21.

In some embodiments, the first leg 141 and the second leg 143 may be fixedly connected, that is, after the first leg 141 is connected to the second leg 143, the first leg 141 cannot move relative to the second leg 143.

In some embodiments, the first leg 141 may be movable relative to the second leg 143. As shown in FIG. 13, the second connection section 14 may include the first leg 141, the second leg 143, and an adjustment part 145. The first leg 141 and the second leg 143 may be connected through the adjustment part 145, and the first leg 141 and the second leg 143 may perform operations including a relative stretching and/or a rotation through the adjustment part 145.

In some embodiments, the adjustment part 145 may be a telescopic assembly, such as a telescopic rod, etc., and the first leg 141 and the second leg 143 may be stretched through the adjustment part 145 to adapt to different users, thereby facilitating wearing.

In some embodiments, the adjustment part 145 may be a rotation assembly, for example, a hinge structure such as a spherical hinge, and the first leg 141 and the second leg 143 may be adjusted vertically through the adjustment part 145, so that an adaptive adjustment may be made according to biometric features of different users, thereby making the device suitable for the user.

In some embodiments, the adjustment part 145 may be a combination of a telescopic assembly and a rotation assembly, so that the first leg 141 and the second leg 143 may be relatively stretched and rotated through the adjustment part 145.

In some embodiments, the first leg and the second leg may further be detachably connected, so as to facilitate replacement and maintenance of the first leg and/or the second leg separately. In some embodiments, the adjustment part may be a buckle assembly, and the relative fixing and removal of the first leg and the second leg may be realized through the buckle assembly. In some embodiments, in addition to the buckle assembly, the adjustment part may further include a screw connection assembly, a thread connection assembly, a hinge assembly, etc.

In some embodiments, the first leg 141 and the second leg 143 may be combined with the connection part 140 and the bent part 142 in the foregoing embodiments. In some embodiments, the first leg 141 may be equivalent to the connection part 140 in the foregoing embodiments, and the second leg 143 may be equivalent to the bent part 142 connected to the connection part 140. In some embodiments, the connection part 140 and the bent part 142 may be connected through the adjustment part 145, so that the connection part 140 and the bent part 142 may realize a relative rotation, a detachment, or a relative stretching and other operations. In some embodiments, the connection part 140 in the foregoing embodiments may include a first part and a second part. The first leg 141 may correspond to the first part of the connection part 140, and the second leg 143 may include the bent part 142 and the second part of the connection part 140. The connection part 140 and the bent part 142 may be formed after the first leg 141 and the second leg 143 are connected.

In some embodiments, the second connection section 14 may include the first leg 141 and the second leg 143 as well as the connection part 140 and the bent part 142. For example, the first leg 141 and the second leg 143 may be sub-parts of the connection part 140, that is, the connection part 140 may be assembled by the first leg 141 and the second leg 143. In some embodiments, the connection part 140 may be assembled from the first leg 141, the second leg 143, and the adjustment part 145. The relative stretching and rotation of the first leg 141 and the second leg 143 may be realized through the adjustment part 145, thereby changing the structure of the connection part 140. For another example, the first leg 141 and the second leg 143 may be two sub-parts of an independent part of the second connection section 14 apart from the connection part 140 and the bent part 142. The first leg 141 and the second leg 143 may form the independent part and then be connected to the connection part 140 or the bent part 142. In some embodiments, the connection part 140 and the visible part 200 may be connected through the first leg 141 and the second leg 143. The first leg 141 may be configured to connect the second leg 143 and the visible part 200. The second leg 143 may be configured to connect the first leg 141 and the connection part 140. The first leg 141 and the second leg 143 may be connected by the adjustment part 145.

In some embodiments, when the wearable device 1000 is an intelligent device, including but not limited to music glasses, cycling glasses, an AR device, and an VR device, the wearable device 1000 may be also provided with at least one functional element for implementing different functions. The functional element may include a power supply, an acoustic element (e.g., a speaker assembly), a control part (e.g., a chip (or referred to as a movement)), or other electrical elements. For more details about the functional element, please refer to the description of FIG. 24, which is be repeated here.

In some embodiments, at least one functional element may be provided on the wearing part 100. For example, the at least one functional element may be disposed on the first connection section 12, the concave section 20, and/or the second connection section 14 of the wearing part 100. In some embodiments, a count of the at least one functional element may be one, and the functional element may be disposed on the first connection section 12, the concave section 20 and/or the second connection section 14 of the wearing part 100. In some embodiments, the count of at least one functional element may be more than one. The plurality of functional elements may be disposed at the same position of the wearing part 100. For example, the plurality of functional elements may be all disposed on the first connection section 12, the concave section 20 and/or the second connection section 14. In some embodiments, the plurality of functional elements may be disposed at different positions of the wearing part 100. For example, the plurality of functional elements may be dispersedly disposed on the first connecting section 12, the concave section 20, and the second connecting section 14.

In some embodiments, the at least one functional element may include a first functional element and a second functional element, and the first functional element and the second functional element are electrically connected. The first functional element and the second functional element may be respectively located on the connection section 10 (e.g., the first connection section 12) and the concave section 20, which may balance a weight on the wearing part 100 to reduce a pressure of the wearing part 100 on a bridge of a nose, so that most of the weight of the wearing part 100 is borne by the auricle, thereby reducing the pressure of the visible part 200 on the bridge of the nose.

In some embodiments, the first functional element and the second functional element may be respectively disposed on the wearing part 100 corresponding to the user's left and right ears. For example, the wearable device 1000 is the glasses, and the wearing parts 100 are two temples corresponding to the user's left and right ears respectively. The first functional element and the second functional element may be respectively disposed on the two temples. In some embodiments, the first functional element and the second functional element may be symmetrically arranged near the left and right ears of the user. For example, the wearable device 1000 is the glasses, and the wearing parts 100 may be two temples corresponding to the left and right ears of the user respectively. However, both the first functional element and the second functional element may be disposed on the temple corresponding to the user's left ear or on the temple corresponding to the user's left ear.

In some embodiments, the first functional element and the second functional element may be the same electrical part or different electrical parts. For example, the first functional element may be the power supply, the second functional element may be the chip, and a speaker element (e.g., a speaker assembly) may be integrated on the chip. For another example, the first functional element may be the chip, and the second functional element may be the power supply.

In some embodiments, an acoustic element 35 may be detachably or fixedly connected relative to the wearing part 100. For example, the acoustic element 35 may be detachably connected to the concave section 20 and/or the connection section 10. For example, the acoustic element 35 may be disposed on the first connection section 12 or the second connection section 14. For another example, the acoustic element 35 may be directly fixedly connected to the wearing part 100 by bonding, so that the acoustic element 35 cannot be detached from the wearing part 100.

In some embodiments, the at least one functional element may be installed inside the wearing part 100. For example, an accommodation cavity 120 may be opened inside the wearing part 100, and the functional elements (e.g., a first functional element and a second functional element) may both be accommodated in the accommodating cavity 120. In some embodiments, the functional elements (e.g., the first functional element and the second functional element) may further both be mounted on the outside of the wearing part 100. In some embodiments, some of the plurality of functional elements (e.g., the first functional element) may be mounted inside the wearing part 100 and others (e.g., the second functional element) may be mounted on the outside of the wearing part 100.

FIG. 5 illustrates an exemplary embodiment of a functional element connecting to the wearing part 100. As shown in FIG. 5, the functional element may include at least one acoustic element 35, and the acoustic element 35 may be detachably connected to the first connection section 12, the concave section 20, and/or the second connection section 14. The acoustic element 35 may sound through the acoustic output end 30. In the embodiment shown in FIG. 5, the outer side of the transition part 23 of the concave section 20 (that is, the side of the transition part 23 away from the user's head when the user wears the wearable device 1000) may be provided with a slot 230 for accommodating the acoustic element 35. The acoustic element 35 may be at least partially embedded in the slot 230 and connected to the transition part 23 of the lower concave section 20. In some embodiments, the acoustic element 35 may further be electrically connected to other functional elements (e.g., parts such as the chip and the power supply) in the wearing part 100. In some embodiments, the functional elements such as the acoustic element 35, the power supply and the chip (also referred to as the movement) may be integrated, and when the integrated functional elements are disposed in the concave section 20, the wearing part 100 may be endowed with an audio function.

It should be noted that FIG. 5 is only for illustration purposes, and is not intended to limit the dispose way of the acoustic element 35. After those skilled in the art fully understand the principles of the functional elements (e.g., the acoustic element 35) and the wearing part 100, they may improve the functional elements and the wearing part to obtain a solution different from that of FIG. 5. In some embodiments, the acoustic element 35 may be coupled to other parts of wearing part 100. For example, the acoustic element 35 may be connected to the mounting part 21. In some embodiments, the acoustic element 35 may be connected to the wearing part 100 through other connection modes. For example, the acoustic element 35 and the concave section 20 (e.g., the transition part 23) may be disposed with a mutually compatible plug-in structure, and the acoustic element 35 may be plugged on the transition part 23 to connect the transition part 23. For another example, the wearing part 100 may include a fastening device, and the acoustic element 35 may be connected to the concave section 20 (e.g., the transition part 23) through the fastening device.

In some embodiments, the acoustic element 35 may include a vibration film and a magnetic circuit assembly. In some embodiments, the vibration film may be a rectangular film. In some embodiments, when the acoustic element 35 is mated with the slot 230, the vibration film may be located in the slot 230. The vibration film may be disposed toward a bottom wall of the slot 230. The magnetic circuit assembly may provide a magnetic field. The magnetic field may be configured to convert a signal containing acoustic information into a mechanical vibration signal. The vibration film is connected to the magnetic circuit assembly, and the mechanical vibration signal generated by the magnetic circuit assembly may be transmitted to the vibration film to make the vibration film vibrate mechanically. A sound may be produced when the vibration film vibrates mechanically. The way of generating sound may be different according to the type of the acoustic element 35. For example, when the acoustic element 35 is an air conduction speaker, the vibration film causes the air to vibrate, and the vibration may be then transmitted to the outside of the wearable device 1000 through a sound transmission structure (e.g., a sound hole 31) and received by the user, so that the user can hear the sound. For another example, when the acoustic element 35 is a bone conduction speaker, the vibration film may be connected to the sound transmission structure (e.g., a vibration surface 33), thereby causing the sound transmission structure to vibrate. The sound transmission structure may transmit the mechanical vibrations to the user, so that the user can hear the sound. In the embodiment shown in FIG. 5, the sound transmission structure may be disposed on a side wall of the transition part 23 facing the ear, so that the user may better receive the sound. For more details about the sound transmission structure, please refer to the descriptions of FIGS. 14-17, which are not repeated here.

In some embodiments, the wearable device 1000 may further include a functional hole 40. The functional hole 40 may be disposed on the visible part 200 and/or the wearing part 100. The functional elements (e.g., sensors) disposed on the visible part 200 and/or the wearing part 100 may detect data through the functional hole 40. In some embodiments, when the wearable device 1000 is an intelligent device, for example, music glasses, cycling glasses, an AR helmet, an VR helmet, etc., the sensors provided on the wearable device 1000 may be configured to detect and collect data related to the user.

Figure 14:
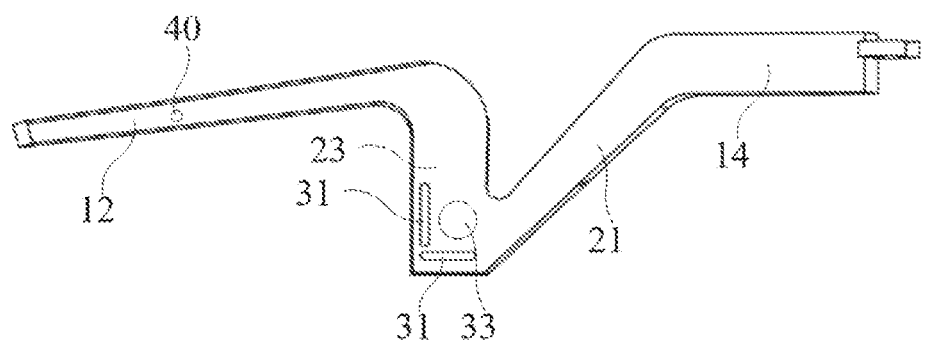
FIG. 14 is a schematic diagram illustrating positions of a sound hole, a vibration surface, and a functional hole in the wearing part according to FIG. 13.

FIG. 14 is a schematic diagram illustrating positions of a sound hole, a vibration surface, and a functional hole in the wearing part according to FIG. 13. Referring to FIG. 14, an inner side of the wearing part 100 may further be provided with a functional hole 40, and a functional element such as a sensor inside the wearing part 100 (e.g., disposed in a cavity of the wearing part 100) may perform relevant operations through the functional hole 40. For example, the operations may include detecting and collecting data related to a user.

In some embodiments, the functional hole 40 may be a detection hole of the sensor, through which relevant detection may be performed. For example, the detection hole may be a detection hole of an infrared sensor or a distance sensor, thereby implementing a detection on whether the wearing part 100 is worn by the user. In some embodiments, after the sensor detects that the wearable device 1000 is worn by the user, the electrical elements in the wearable device 100 may be automatically activated. For example, a communication assembly may be activated to communicate with a terminal device (e.g., a mobile phone), etc.

In some embodiments, the functional hole 40 may further be a detection hole of an optical sensor, which may detect whether the wearing part 100 is worn, and monitor the user's biological signs, for example, detect a heart rate or a blood oxygen content of the user. In some application scenarios, the sensor may further alert the user when the detected biological signs are out of balance or with a potential harm.

In some embodiments, the functional hole 40 may further be a sound pickup hole for receiving the user's voice signal, so that the user may control the wearable device 1000 through a voice. For example, the user may make a call, play music, or ask about road condition and weather through the functional hole 40.

In some embodiments, a functional hole 40 may perform one or more functions. For example, the functional hole 40 may perform a single function (e.g., receiving the user's voice, monitoring the user's biological signs, etc.) as described in the foregoing embodiments. For another example, the functional hole 40 may be configured not only as a sound pickup hole, but also as a detection hole of the optical sensor.

In some embodiments, the functional hole 40 may be disposed on the first connection section 12, the concave section 20, and/or the second connection section 14. In some embodiments, a count of functional holes 40 may be one, and the one functional hole 40 may be disposed on one of the first connection section 12, the concave section 20, or the second connection section 14. In some embodiments, the wearing part 100 may be provided with a plurality of functional holes 40 to perform different functions respectively. In some embodiments, the plurality of functional holes 40 may be disposed in different parts of the wearing part 100. For example, the first connection section 12 may be provided with at least one sound pickup hole, and the concave section 20 may be provided with at least one detection hole. For another example, both the first connection section 12 and the concave section 20 may be provided with at least one sound pickup hole, and the second connection section 14 may be provided with at least one detection hole.

In some embodiments, the acoustic output end 30 may include the sound transmission structure. The sound transmission structure may be understood as a part communicating the speaker assembly. The sound signal generated by the speaker assembly may be transmitted through the sound conduction element (e.g., a sound conduction tube) to the sound transmission structure, then through the sound transmission structure, the sound signal may be then transmitted to the outside of the wearable device 1000 and received by the user. The sound transmission structure may include the sound hole 31 and/or the vibration surface 33, through which the speaker assembly disposed in the wearing part 100 transmits the sound to the user. The sound hole 31 may be understood as a hole communicating the speaker assembly, and the sound signal generated by the speaker assembly may be transmitted to the sound hole 31 through a sound conduction element (e.g., a sound conduction tube, an acoustic cavity), and then transmitted through the sound hole 31 to the outside of the wearable device 1000 and received by the user. The vibration surface 33 may be understood as a part that is in contact with the user and transmits the mechanical vibration.

In some embodiments, the sound transmission structure disposed on the acoustic output end 30 (i.e., the sound hole 31 or the vibration surface 33) may be determined according to the type of the speaker assembly.

In some embodiments, when the speaker assembly includes an air conduction speaker, the sound transmission structure may be the sound hole 31. In some embodiments, the concave section 20 may be provided with the sound hole 31, and the sound hole 31 may be close to the user's ear along with the concave section 20, so as to transmit sound to the user.

In some embodiments, the sound outlet hole 31 may be disposed at a position where the concave section 20 contacts the user's head. In some embodiments, the sound hole 31 may be provided on the inner side of the concave section 20 close to the user's head, so as to transmit sound to the user. In some embodiments, the count of the sound holes 31 may be 1, 2, 3 or more. For example, as shown in FIG. 14, two sound outlet holes 31 are provided at the inner edge of the concave section 20 so as to be as close to the user's external ear channel as possible when worn by the user, thereby improving the user's hearing effect.

Figure 15:
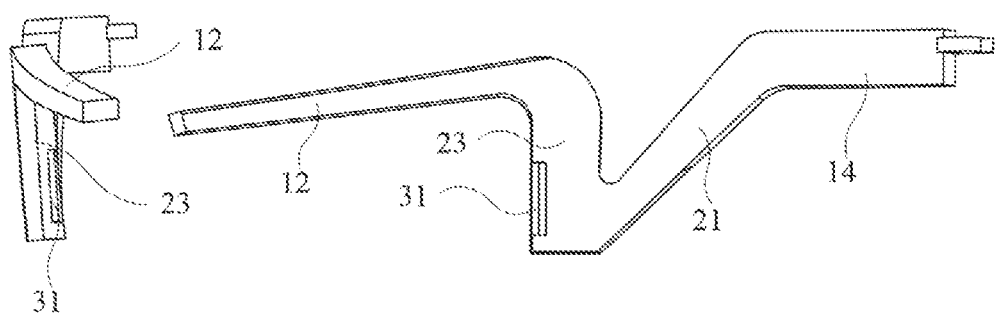
FIG. 15 is a schematic diagram illustrating a position of a sound hole of the wearing part according to FIG. 13.

In some embodiments, the sound outlet hole 31 may be disposed close to the position where the concave section 20 contacts the user's head. FIG. 15 is a schematic diagram illustrating a position of a sound hole of the wearing part according to FIG. 13. Continuing to refer to the wearing part 100 worn by the user, as shown in FIG. 15, in some embodiments, the edge of the concave section 20 facing the tragus may be provided with the sound hole 31, and the sound hole 31 may not be wholly covered by a scalp. As a result, the sound output hole 31 may be partially exposed to the air and faces the user's external ear channel even the wearing part 100 is worn, which is conducive to improving an effect of sound output to the user's external ear channel.

Figure 16:
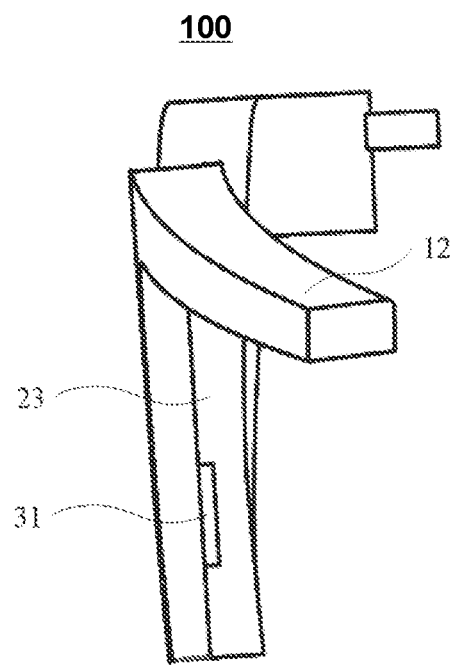
FIG. 16 is a schematic diagram illustrating a position of a sound hole of the wearing part according to FIG. 13.

FIG. 16 is a schematic diagram illustrating a position of a sound hole of the wearing part according to FIG. 13. As shown in FIG. 16, in some embodiments, the side of the concave section 20 facing the tragus may be provided with a sound hole 31, the sound hole 31 at this position may not be covered by a scalp at all, and the sound hole 31 may be completely exposed to the air and face the user's external ear channel when the wearing part 100 is worn, which further improves the effect of sound output to the external ear channel.

Figure 17:
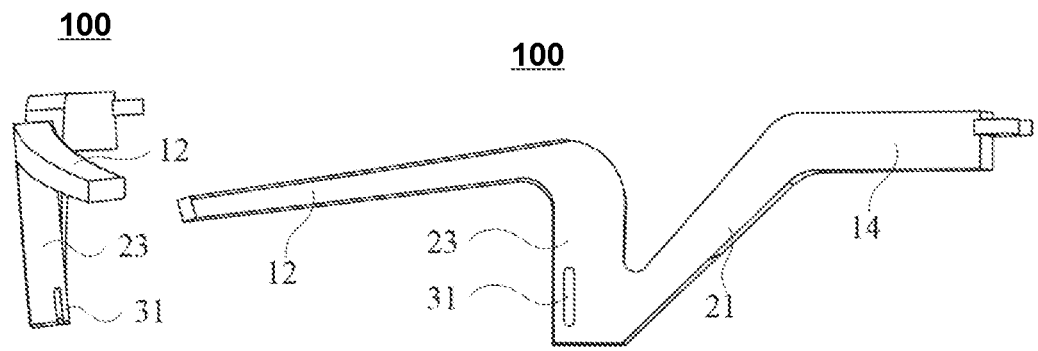
FIG. 17 is a schematic diagram illustrating a position of a sound hole of the wearing part according to FIG. 13.

FIG. 17 is a schematic diagram illustrating a position of a sound hole of the wearing part according to FIG. 13. As shown in FIG. 17, in some embodiments, the inner side of the concave section 20 and the side facing the tragus are both provided with sound holes 31, and the sound holes 31 on both sides may transmit sound to the external ear channel of the user in two directions to further improve the sound effect.

Referring to FIG. 14, in some embodiments, when the speaker assembly includes the bone conduction speaker, the sound transmission structure may be the vibration surface 33. In some embodiments, the vibration surface 33 may be disposed on the inner side of the concave section 20 close to the scalp.

In some embodiments, when the speaker assembly includes both the bone conduction speaker and the air conduction speaker, the sound transmission structure may include the vibration surface 33 and the sound hole 31. For example, the vibration surface 33 may be disposed on the inner side of the concave section 20 close to the scalp, and may directly contact the user when the user wears the glasses, so as to receive the mechanical vibration signal transmitted by the user when the user makes a sound. The sound hole 31 may be provided on the side of the concave section 20 facing the tragus.

The parts of the wearable device 1000 may further have other embodiments, which are not listed in the present disclosure, and the specific configuration and shape thereof are not limited either. The present disclosure discloses the wearable device 1000, the visible part 200 and the wearing part 100 thereof. By disposing at least one connection section 10 and at least one concave section 20 on the wearing part 100, the concave section 20 may be physically connected to the connection section 10, and a downward depression is formed on the concave section 20, so that the concave section 20 is in the folded state, and the flexibility of the concave section 20 may be increased, so that the wearing part 100 is suitable for the adaptive deformation according to the user's head shape due to the existence of the concave section 20, which makes it easy for the user to wear. Moreover, the concave section 20 may be further provided with at least one acoustic output end 30, so that the acoustic output end 30 may be close from the user's ear along with the concave section 20, which is convenient for the sound transmission to the user. As a result, the user does not need to insert the acoustic output end 30 into the external ear channel for the sound transmission, which improves the wearing comfort and reduces a wearing difficulty of the wearing part 100.

In some embodiments, the wearable device 1000 may be glasses, including cycling glasses, sunglasses, myopia glasses, AR/VR glasses, etc. In particular, the wearable device 1000 may be a kind of cycling glasses. The cycling glasses may be suitable for the users to wear when cycling, driving or exercising. In some embodiments, the wearing part 100 is generally a rod-shaped structure (e.g., a temple), a strip-shaped structure, or a ribbon-shaped structure (e.g., a webbing). The wearing part 100 lacks a shelter for covering the ears, and the user may be disturbed by a wind noise when using it. In particular, when the user wears the glasses (e.g., the cycling glasses) in the above application scenarios, they may be in conditions like a high-speed moving, a headwind moving, and a crosswind moving, and the wind noise interference is intense. The wind noise affects the user's ability to hear an external environmental sound, and a long-term and high-volume wind noise may cause the user's hearing loss. In addition, in some embodiments, when the wearable device 1000 (e.g., the cycling glasses) has an audio function, the wind noise interference may further affect the user's reception of the sound signal sent by the wearable device 1000, resulting in the user being unable to hear clearly, or completely unable to hear, which further reduces the user experience.

Based on the above reasons, the present disclosure also involves more improvements to the structure of the wearing part 100, so that the wearing part 100 has a function of wind noise reduction. In some embodiments, the wearing part 100 may include a wind noise reduction assembly configured to isolate the ear from the outside world to a certain extent when the user wears the wearable device 1000, thereby reducing the wind noise interference received by the user. The wind noise reduction assembly is described in detail as follows with reference to the embodiments shown in FIGS. 18-23.

Figure 18:
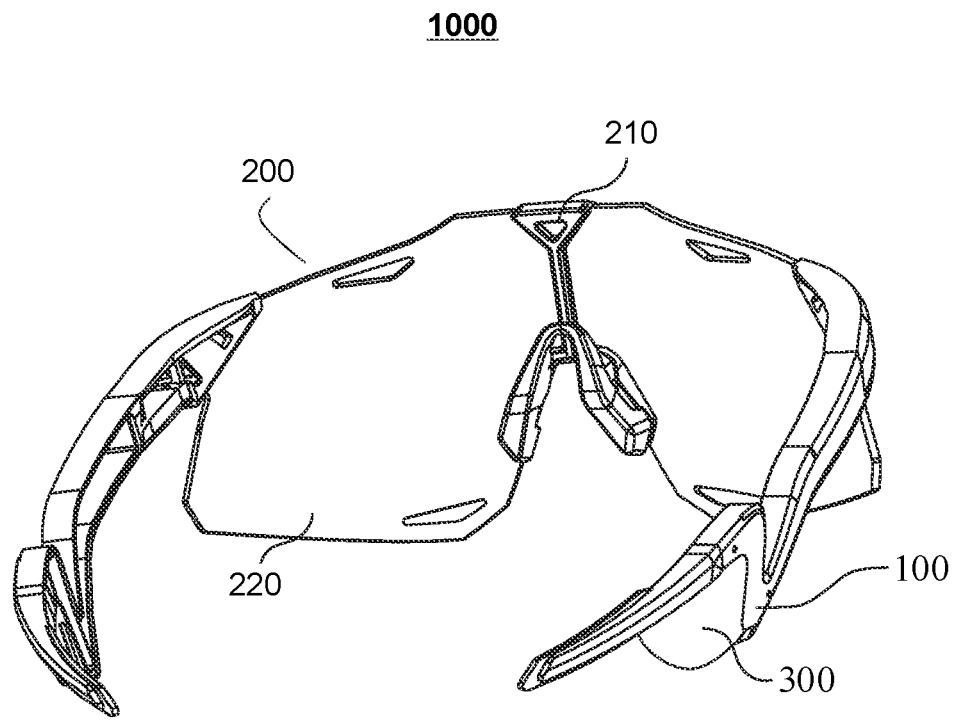
FIG. 18 is a schematic structural diagram illustrating a wearable device including a separator according to some embodiments of the present disclosure.

In some embodiments, the wearable device 1000 may include the visible part 200, the wearing part 100, and the wind noise reduction assembly disposed on the wearing part 100. The wind noise reduction assembly may include a separator disposed at a position close to the ear of the wearing part 100 to shield the user's ear and reduce the wind noise interference at the user's ear. FIG. 18 is a schematic structural diagram illustrating a wearable device including a separator according to some embodiments of the present disclosure. As shown in FIG. 18, the wearable device may include the visible part 200, two wearing parts 100 disposed at both ends of the visible part 200, and a separator 300 disposed on the wearing part 100. In particular, the wearable device 1000 may be a kind of glasses. The wearing part 100 may be a temple. The visible part 200 may include a frame 210 and a lens 220. The lens 220 may be disposed on the frame 210 to form rimmed glasses. The two temples are rotatably connected to both sides of the frame 210, and the separator 300 is physically connected to the temple for wrapping the ear. In some embodiments, the visible part 200 may only include two lenses 220 and a connection part between the two lenses 220, and the temples are connected to one sides of the lenses 220, thereby forming rimless glasses. Alternatively, the glasses may further include the frame 210 without the lens 220 mounted, and the temples are connected to the frames 210 to form a pair of glasses for decoration.

Figure 19:
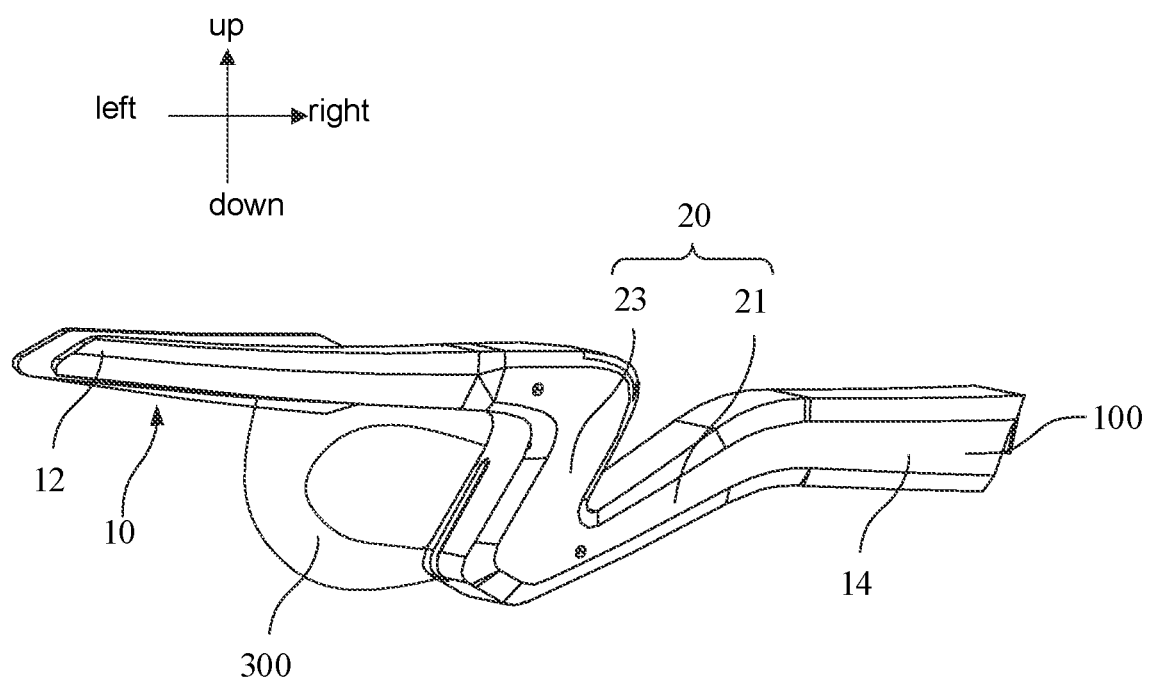
FIG. 19 is a schematic diagram illustrating a connection between a separator and a wearing part according to some embodiments of the present disclosure.
Figure 20:
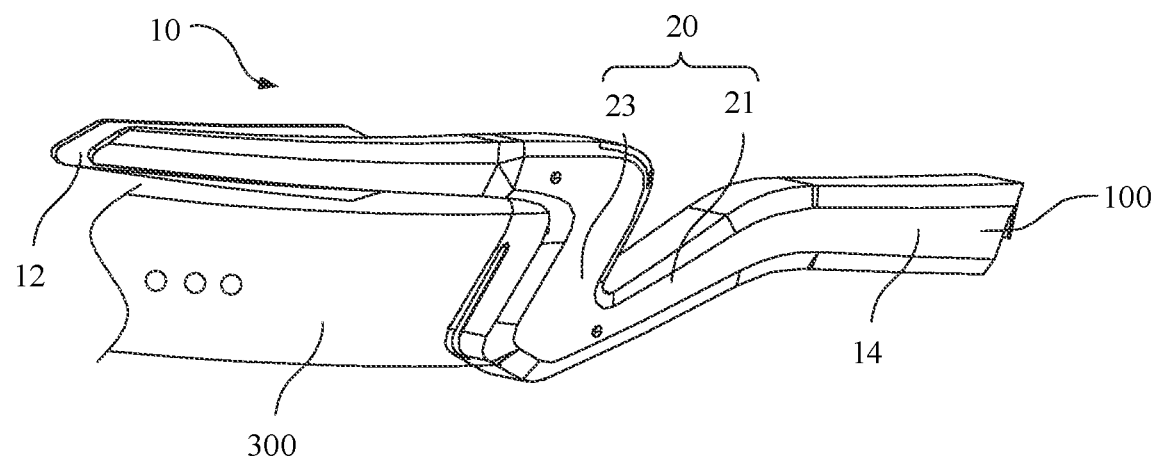
FIG. 20 is a schematic diagram illustrating a connection between a separation connector and a wearing part according to some embodiments of the present disclosure.
Figure 21:
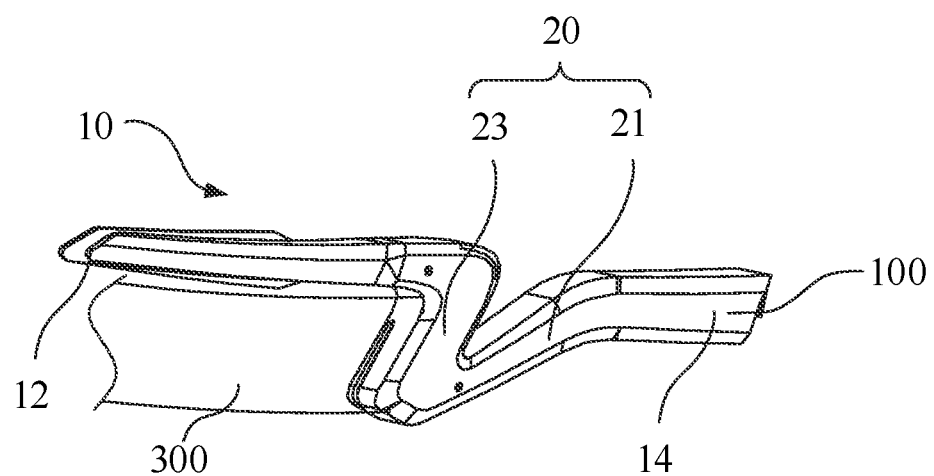
FIG. 21 is a schematic diagram illustrating a connection between a separator and a wearing part according to some embodiments of the present disclosure.

In some embodiments, the separator 300 may be combined with the concave section 20 and/or the connection section 10 in one or more of the foregoing embodiments. FIG. 19 is a schematic diagram illustrating the structure of a connection between the separator and the wearing part according to some embodiments of the present disclosure; FIG. 20 is a schematic diagram illustrating the connection between the separator and the wearing part according to some embodiments of the present disclosure; FIG. 21 is a schematic diagram illustrating the connection between the separator and the wearing part according to some embodiments of the present disclosure. As shown in FIGS. 19 to 21, the wearing part 100 may include at least one connection section 10 and at least one concave section 20, the concave section 20 is physically connected to the connection section 10, and the concave section 20 makes the upper edge of the wearing part 100 has the depression 22 downwards. The separator 300 may be physically connected to the concave section 20 to wrap around the ear and reduce the wind noise interference. In some embodiments, there may be at least one acoustic output end 30 (not shown in FIGS. 19-21) within the concave section 20 and/or the separator 300.

When the wearing part 100 is erected on the user's auricle, the concave section 20 is located on the side of the auricle facing the user's eyes, so that when the user wears the wearing part 100, the concave section 20 extends toward the tragus. When the acoustic output end 30 is disposed on the concave section 20, the acoustic output end 30 is then close to the tragus, so as to be closer to the user's external ear channel, and the acoustic output end 30 is closer to the user's ear, making it easier for the sound to be transmitted to the user, and also reduces the interference of the ambient sound on the sound output from the acoustic output end 30. When the acoustic output end 30 is disposed on the separator 300 (e.g., the sound hole 31 and/or the vibration surface 33 is located or wrapped on the separator 300, so as to reduce the wind noise interference.), the concave section 20 may facilitate the fixed connection of the separator 300 and wrap the ear, prevent the ear from being in a direct contact with the wind, reduce the probability of turbulent flow, and achieve the effect of reducing the wind noise. For more details about the concave section 20, the acoustic output end 30 and the connection section 10, please refer to the descriptions in FIGS. 2 to 17, which are not repeated here.

In some embodiments, the separator 300 may be connected to the concave section 20 and/or the connection section 10. For example, the separator 300 may only be connected to the concave section 20. For another example, the separator 300 may only be connected to the connection section 10. For another example, the separator 300 may be connected to the concave section 20 and the connection section 10 at the same time.

FIG. 18 illustrates an exemplary embodiment of the connection of the separator and the wearing part. As shown in FIG. 18, the separator 300 is substantially circular in shape. The separator 300 is connected to a side of the transition part 23 of the concave section 20 away from the mounting part 21.

FIG. 19 illustrates another exemplary embodiment of the connection of the separator and the wearing part. The wearing part 100 shown in FIG. 19 may be the same as the wearing part 100 shown in FIG. 18. The difference is that the separator 300 shown in FIG. 19 is an annular structure. Both ends of the annular separator 300 are connected to a side of the transition part 23 away from the mounting part 21. One end is close to the first connection section 12 and connected to the first connection section 12. The other end is away from the first connection section 12. The separator 300 shown in FIG. 19 is connected to the transition part 23 and the first connection section 12 at the same time, which improves a connection strength between the separator 300 and the wearing part 100 to a certain extent.

In some embodiments, the wearable device 1000 may include two wearing parts 100, which are respectively configured to be erected on the left and right ears of the user. The wearing part 100 erected on the user's right ear may be called a right ear wearing part, and the wearing part 100 erected on the user's left ear may be called a left ear wearing part. The end of the left ear wearing part and the right ear wearing part away from the visible part 200 may be connected by at least one separator 300. The left ear wearing part or the right ear wearing part here refers to the part of the wearable device 1000 for the user to wear. In some embodiments, the left and right ear wearing parts may be different parts of the same wearing part 100. For example, when the wearing part 100 is an annular headband as shown in FIG. 4, the left ear wearing part and the right ear wearing part refer to parts of the wearing part 100 that are in a stable contact with the user's left and right ears respectively. In some embodiments, the left ear wearing and the right ear wearing may further be different wearing parts 100. For example, when the wearing part 100 is the temple shown in FIG. 2, and the two wearing parts are the temples erected on the user's left and right ears respectively, the temple in contact with the left ear may be called the left ear wearing part, and the temple in contact with the right ear may be called as the right ear wearing part.

As shown in FIG. 20, one end of the separator 300 may be connected to the side wall of the transition part 23 away from the mounting part 21. Exemplary connection modes may include bonding, clipping, nailing, etc. In some embodiments, the separator 300 may be a bar structure or a sheet structure, for example, a separator sheet, a separator bar, etc. In some embodiments, an end of the separator 300 away from the transition part 23 may be provided with a magnetic material (e.g., a magnet), and the magnetic material may be configured to connect to other separators 300. For example, to increase a protection range for the ears, the count of separation elements 300 disposed on the wearing element 100 may be increased. For another example, by disposing a magnetic material on the separator 300, the separator 300 on the wearing part 100 on both sides of the left and right ears may be connected. Both the left ear wearing part and the right ear wearing part may be disposed with a separator 300, and the end of each separator 300 away from the transition part 23 connected thereto may be disposed with a magnetic material. One end of the separator 300 provided on the left ear wearing part with a magnetic material may be connected to the end of the separator 300 provided on the right ear wearing part with the magnetic material, and the two separators 300 surround the back of the user's head, so that the part 300 may not only wrap the ear, and avoid the direct contact of the ear with the wind, but also fix the wearing part 100 to prevent the wearing part 100 from falling off from the ear, which is convenient to wear. In some embodiments, the end of the separator 300 away from the transition part 23 may further be provided with structures like a Velcro, a buckle, etc., so as to be connected to other separators 300.

As shown in FIG. 21, the separator 300 may be an elastic bar structure, for example, a webbing. In some embodiments, the wearing part 100 may include the left ear wearing part and the right ear wearing part in stable contacts with the user's left and right ears. The ends of the left ear wearing part and the right ear wearing part away from the visible part 200 may be connected by a separator 300 (e.g., a webbing). For example, in the embodiment shown in FIG. 21, one end of the separator 300 is connected and fixed to the transition part 23 of the right ear wearing part, and the other end is connected and fixed to the transition part 23 of the left ear wearing part (not shown in the figure). In this way, the separator 300 may not only wrap the ear, avoid direct contact between the ear and the wind, but also play a role in fixing the wearing part 100 to prevent the wearing part 100 from falling off from the ear. In addition, due to an elasticity of the isolating part 300, the wearable device 1000 with the wearing part 100 may adapt to head shapes of different sizes.

In some embodiments, the separator 300 may be an elastic part, for example, the separator 300 may be made of an elastic material so as to have certain elasticity. Exemplary elastic materials may include a silicone, a rubber, a spandex, a polyester, a polyester fiber, etc. In some embodiments, the separator 300 may be made of a water-absorbent material to absorb sweat from the ear and keep the ear dry and comfortable. Exemplary absorbent materials may include a sponge, a cotton cloth, etc. In some embodiments, the insulating part 300 may be made of a thermal material to avoid a chapped ear skin in cold weather. Exemplary thermal materials may include a rock wool, a glass wool, a suede cloth, etc.

In some embodiments, the separator 300 may include a fixed part and a flexible part. The fixed part may be connected to the wearing part 100 to ensure a structural strength of the separator 300. The flexible part may be disposed toward the auricle, and since the flexible part has a certain flexibility, it may be configured to buffer the force between the fixed part and the ear to protect the ear. In some embodiments, the flexible part may be made of materials such as a silica gel and the rubber. In some embodiments, the flexible part may be a part of the insulating part 300, while the fixed part may be an independent part separately disposed on the separator 300 for connecting the wearing part 100. For example, the separator 300 may be made of elastic materials including the silica gel, the rubber, etc., so the separator 300 has a certain flexibility. The separator 300 is connected to the wearing part 100 by disposing a fixed part with a high hardness. In some embodiments, the separator 300 may be a composite structure made of multiple materials. For example, the separator 300 may be a composite structure composed of an elastic structure (e.g., made of the silicone) and a rigid structure (e.g., made of a stainless steel). The elastic structure is located on a side close to the user's ear, and the user's ear is protected by the elastic structure. The rigid structure is located on the side away from the user's ear, and the separator is connected to the wearing part 100 through the rigid structure.

Figure 22:
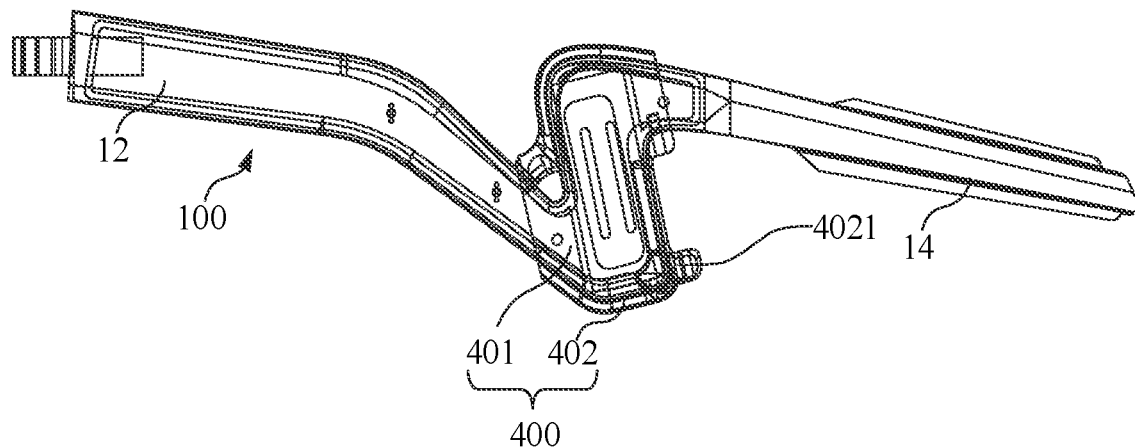
FIG. 22 is a schematic diagram illustrating a connection between a separation connector and a wearing part according to some embodiments of the present disclosure.

FIG. 22 is a schematic diagram illustrating the connection between a separation connector and the wearing part according to some embodiments of the present disclosure. As shown in FIG. 22, the wearable device 1000 may include a separation connector 400 connected to the wearing part 100, and the separator 300 is connected and fixed to the separation connector 400 to achieve the physical connection with the wearing part 100. In some embodiments, when the user wears the wearable device 1000, the first connection section 12 is erected on the tragus of the user. Therefore, to make the separator 300 better wrap the ears, the separation connector 400 may be connected to the concave section 20, and the separator 300 may be disposed on the side of the transition part 23 away from the mounting part 21.

In some embodiments, the separation connector 400 may include a connection plate 401 and a clamping plate 402 extending from a part of an edge of the connection plate 401. The shape of the connection plate 401 is corresponding to the shape of the side surface of the transition part 23. The clamping plate 402 may be clamped on the edge of the transition part 23 to realize a detachable connection between the separation connector 400 and the transition part 23. In some embodiments, a clamping part 4021 may be provided on the clamping plate 402, and the separator 300 may be connected and fixed to the separation connector 400 through the clamping part 4021 to achieve the physical connection with the wearing part 100.

In other embodiments, the separation connector 400 may be fixedly connected to the wearing part 100 through a fixing part (not shown in the figure) in modes like screw, welding, or integral molding, etc., which are not listed here.

Figure 23:
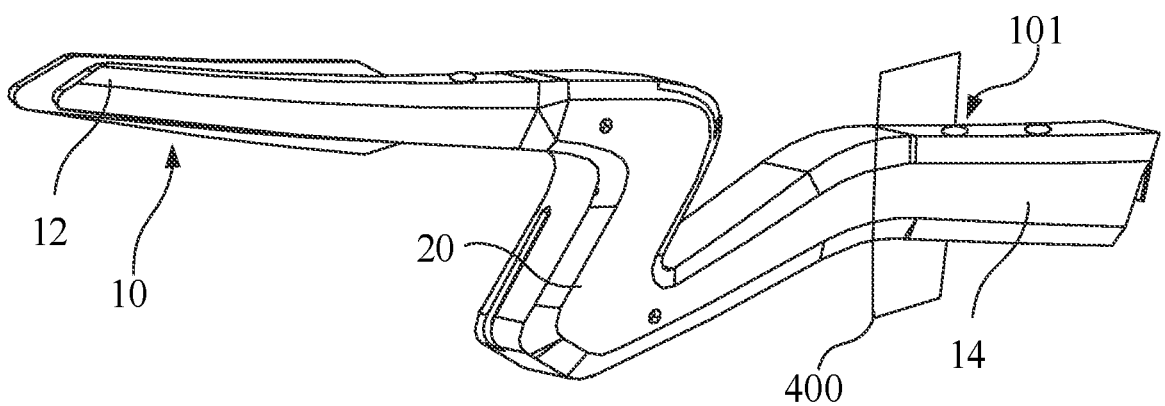
FIG. 23 is a schematic diagram illustrating a connection between a separation separator and a wearing part according to some embodiments of the present disclosure.

FIG. 23 is a schematic diagram illustrating the connection between the separation connector and the wearing part according to some embodiments of the present disclosure. As shown in FIG. 23, in some embodiments, the separation connector 400 may further be connected to the connection section 10, for example, the connector may be connected to the first connection section 12 and/or the second connection section 14, as long as the separator 300 may at least partially wrap the ears. In the embodiment shown in FIG. 23, the separation connector 400 is connected to the second connection section 14.

In some embodiments, the separation connector 400 may be a clamping ring with a semi-closed structure. At least one pair of clamping holes 101 are oppositely disposed on the surfaces of the first connection section 12 and/or the second connection section 14 that are against each other, and the two ends of the connection part 400 are respectively clamped at the locking holes 101, so as to realize the physical connection between the connection part 400 and the wearing part 100. Through the above design, the separation connector 400 may not only be detachably connected to the wearing part 100, but also realize an adjustment of the position of the connector 400, so as to adapt to head shapes of different sizes.

In addition to connecting the separator 300 and the wearing part 100 through the separation connector 400, in some embodiments, the wearing part 100 and the separator 300 may be connected through structures such as a buckle assembly and a hook assembly. For example, the wearing part 100 may be disposed with a separation fitting part, which may be a structure like a through hole, a buckle, a hook, etc., and the separator 300 may be matched with the separation fitting part to realize the connection with the wearing part 100. In some embodiments, the separation fitting part may be combined with the fixing part in one or more of the foregoing embodiments. For example, the separation fitting part may be disposed on the fixing part to improve the connection strength.

The components of the wearable device 1000 may further have other embodiments, which are not listed in the present disclosure, and the specific configuration and shape thereof are not limited. Different from the condition in the prior art, the present disclosure discloses a wearable device 1000, in particular, the wearable device 1000 may be a kind of glasses. The separator 300 provided on the wearing part 100 may prevent the ear from being in a direct contact with the wind, and may further fix the wearing part 100 to prevent the wearing part 100 from falling off from the ear. In addition, by disposing the buckle on the wearing part 100, a flexible connection between the wearing part 100 and the separation connection part 400 may be realized, and the position of the separation connection part 400 relative to the wearing part 100 may be adjusted according to actual needs, so that the wearable device 1000 may adapt to head shapes of different sizes.

It should be noted that the above description about the separator 300 is only for illustration and description, and does not limit the scope of the present disclosure. For those skilled in the art, various modifications and changes may be made to the separator 300 under the guidance of the present disclosure. However, such modifications and changes are still within the scope of the present disclosure. For example, the separator 300 and the separation connector 400 may be combined into one assembly. For another example, the first connection section 12 may be integrally formed with the separator 300 for erecting on the user's head and shielding the user's ears. For another example, the first connection section 12 may be omitted, and the separator 300 may be disposed on the transition part 23 of the concave section 20.

In some embodiments, the wearable device 1000 is usually provided with a plurality of functional elements so that the wearable device 1000 has different functions. For example, the wearable device 1000 may be a kind of audio glasses, and the audio glasses may be provided with the plurality of functional elements, including the power supply, the acoustic element (e.g., the speaker assembly), the control assembly (e.g., the chip (also known as the movement), an MCU), the communication assembly, etc. The acoustic element, the power supply, etc. may be classified as peripheral assemblies. The power supply may be configured to provide power to other functional units. The acoustic element may play and/or receive an audio signal. The control assembly (e.g., the chip, the MCU) may be categorized as core elements.

In some embodiments, the acoustic element may include a speaker assembly, and the sound signal generated by the speaker assembly may be output through the acoustic output end 30 (e.g., the sound hole 31, the vibration surface 33) in the foregoing embodiments so that the user can hear the sound. In some embodiments, the acoustic element may include a microphone assembly, which may be configured to receive the external sound signal (e.g., the voice signal, the noise signal) and convert them into electrical signals, so as to realize functions such as calls, voice, and human-computer interactions. In some embodiments, the acoustic element may include a microphone assembly and a speaker assembly, so that the wearable device 1000 has functions of audio playing and receiving at the same time.

The control circuit assembly may process data from other functional elements in the wearable device 1000 and control the other functional elements. For example, the control circuit assembly may process data related to the communication assembly and transmit the audio data to the speaker assembly. In some embodiments, the control circuit assembly may control a running condition of other functional elements (e.g., the communication assembly, the power supply, the processor, etc.) in the wearable device 1000. For example, when the power of the power supply is lower than a threshold, the control circuit assembly may control the power supply to enter a power saving mode, and the power supply in this mode operates with lower a power.

The communication assembly may be configured for the exchange of information or data. In some embodiments, the communication assembly may be configured for communication between the functional elements of the wearable device 1000 (e.g., the control circuit assemblies, a processor, the power supply, the acoustic elements, etc.). For example, the power supply may send information related to the remaining power to the communication assembly, which may send the information to the processor. In some embodiments, the communication assembly may be configured for the wearable device 1000 to communicate with a mobile phone, a tablet computer or other wearable devices.

In some embodiments, one or more functional elements may be disposed on the wearing part 100. For example, the functional element may further include the sensor in the foregoing embodiments, and the sensor may be disposed in the functional hole 40 of the wearing part 100.

In some embodiments, when the wearable device 1000 is a binaural headband device, the count of wearing parts 100 may be two, which corresponds to the user's left and right ears respectively. For example, when the wearable device 1000 is the glasses shown in FIG. 18, the wearing part 100 may be two temples erected on the user's left and right auricles. For another example, when the wearable device 1000 is the AR or VR glasses shown in FIG. 4, the wearing part 100 may be an annular headband, and the two ends of the annular headband are respectively connected to the two ends of the visible part 200. In some embodiments, the wearing part 100 may include a left ear wearing part and a right ear wearing part corresponding to the user's left ear and right ear, respectively.

Figure 24:
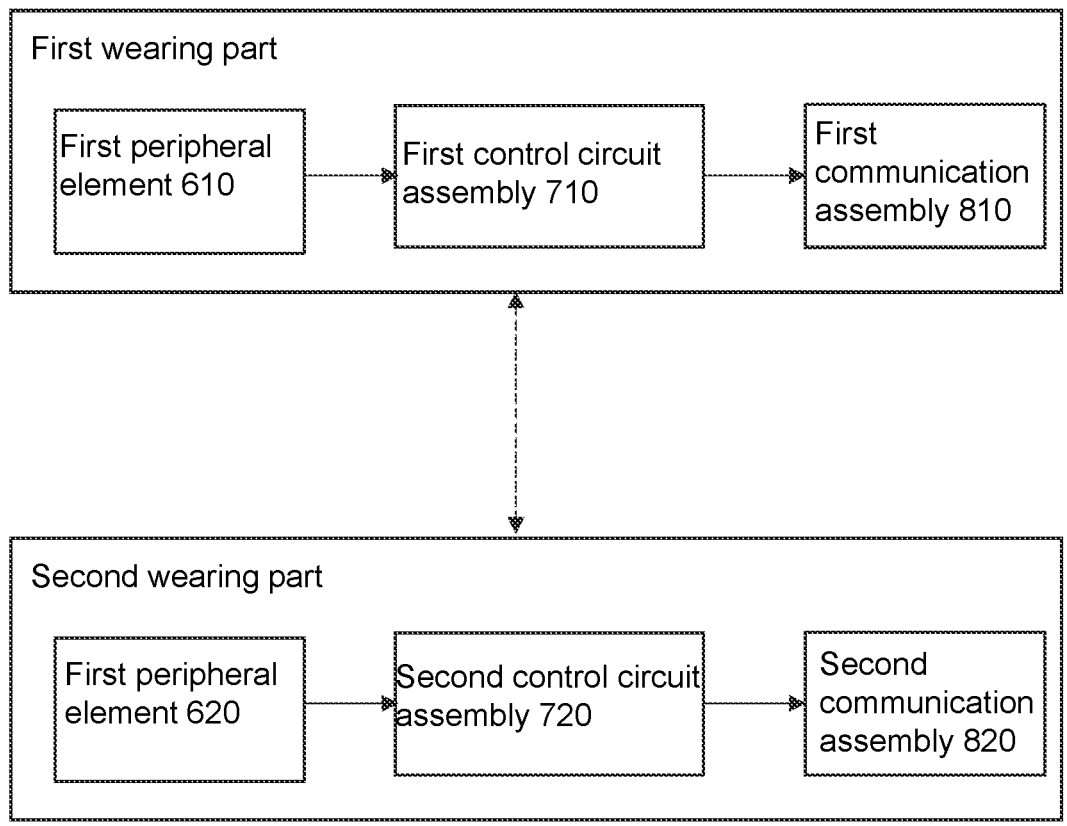
FIG. 24 is a schematic diagram illustrating a signal transmission between two wearing parts according to some embodiments of the present disclosure.

In some embodiments, the wearable device 1000 includes a visible part 200 and two wearing parts 100 (which may be referred to as a first wearing part and a second wearing part) connected to two ends of the visible part 200. FIG. 24 is a schematic diagram illustrating a signal transmission between two wearing parts according to some embodiments of the present disclosure. In some embodiments, the first wearing part and the second wearing part respectively includes a communication assembly (e.g., a first communication assembly 810 and a second communication assembly 820), and the communication assembly may be configured to transmit a signal between the two wearing parts 100. The signal between two wearing parts 100 may refer to the signal generated by a functional element (e.g., a first peripheral element 610 and a second peripheral element 620) on the two wearing parts 100. The functional part includes, but is not limited to, an acoustic element (e.g., a speaker assembly), an electrical assembly such as a power supply. Exemplarily, the speaker assembly may include a first speaker assembly and a second speaker assembly. The power supply may include a first power supply and a second power supply. The first speaker assembly and the first power supply may be disposed on the first wearing part, and the second speaker assembly and the second power supply may be disposed on the second wearing part. The signal generated by the element on the first wearing part may be transmitted to the element on the second wearing part. For example, the sound signal generated by the first speaker assembly may be transmitted through the communication assembly (through the first communication assembly 810 to the second communication assembly 820) to the second speaker assembly. In some embodiments, the wearing part may further include: a control circuit assembly (e.g., a first control circuit assembly 710 and a second control circuit assembly 720), and the control circuit assembly may communicate with elements on the two wearing parts through the communication assembly. For example, the first speaker assembly may be a main speaker, the second speaker assembly may be the sub-speaker, the control circuit assembly may control the main speaker to be turned on or off, and when the main speaker is turned on or off, a corresponding operation signal may be sent to the sub-speaker through the communication assembly, which turns on or off the sub-speaker at the same time.

In some embodiments, a count of the control circuit assemblies may not be limited. For example, the count of the control circuit assembly may be one, which is disposed on the first wearing part or the second wearing part. For example, when disposed on the first wearing part, a wiring and/or wireless communication may be performed between the control circuit assembly and the element on the first wearing part (e.g., the first speaker assembly, the first power supply, etc.) through the communication assembly. The wireless communication may be performed between the control circuit assembly and the elements (e.g., the second microphone assembly, the second speaker assembly, the second battery, etc.) on the second wearing part through the communication assembly.

In some embodiments, the communication assembly may be a wiring communication assembly. For example, the communication assembly may include a wire group (not shown in the figure), and a wire channel for the wire group to pass through is provided in the wearing part 100 and/or the visible part 200. The wire group may be respectively connected to the first element, the second element and the control circuit assembly through the wire channel, so as to control the elements on the left and right wearing parts through the control circuit assembly.

In some embodiments, the communication assembly may be a wireless communication assembly, and the wireless communication assembly may establish communication connections between the elements and between the elements and the control circuit assembly through wireless communication. After the wireless connection is established between the control circuit assembly and the elements through the wireless communication assembly, the assembly may be controlled by the control circuit assembly. For example, the first speaker assembly may be controlled to generate the sound signal, and the second speaker assembly may be controlled to stop generating the sound signal. In some embodiments, a wireless communication mode of the wireless communication assembly may include any one of the wireless communication modes including a Bluetooth, an infrared, an ultra-wide band (UWB), or a near field magnetic induction (NFMI), etc.

It should be noted that the above descriptions about functional elements are only for illustration and description, and do not limit the scope of the present disclosure. For those skilled in the art, various modifications and changes may be made to the functional elements under the guidance of the present disclosure. However, such modifications and changes are still within the scope of the present disclosure. For example, the acoustic element and the communication assembly may be combined into one unit, so that the unit has both the function of the acoustic element (e.g., the function of playing sound signals) and the function of exchanging information or data. For another example, the acoustic element may further include a microphone assembly, and the microphone assembly may communicate with the speaker assembly through the communication assembly. In some embodiments, the microphone assembly may convert the sound signal received into an electrical signal, and transmit the electrical signal to the speaker assembly through the communication assembly, and the speaker assembly may convert the electrical signal into the sound signal and transmit it to the user. In some embodiments, the speaker assembly may be integrated on the chip. In some embodiments, the movement may include the processor and the communication assembly, etc.

In some embodiments, different users may have different head shapes (i.e., the shape of head) or head sizes, so different users may have different wearing experiences when wearing the same wearable device 1000. The head size may include a left and right width of the head (that is, the width of a forehead or a distance between the temples on both sides) and the front and rear length of the head (that is, the distance from the back of the head to the forehead). Exemplarily, a user with a greater head size may feel a stronger squeeze when wearing the wearable device 1000. When a user with a smaller head size wears the wearable device 1000, a fit between the wearable device 1000 and the user's head is poor, and the wearable device 1000 may fall. In addition, in some embodiments, the shape and size of the user's head may further cause the distance between the acoustic output end 30 on the wearing part and the ear to change, thereby affecting the sound transmission of the acoustic output end 30. Exemplarily, when the front-to-back distance of the user's head is short, the acoustic output end 30 may be located in front of the ear and far away from the ear. When the front-to-back distance of the user's head is long, the acoustic output end 30 may be located at the front and back of the ear and far away from the ear.

Based on the above reasons, some embodiments of the present disclosure further provide a size-adjustable wearable device 1000, which can adjust the size of the wearable device 1000 and/or the distance between the acoustic output end 30 and the user's ear. As a result, not only the user's wearing experience may be effectively improved, but also the distance between the acoustic output end 30 and the user's ear may be shortened, moreover, the sound transmission effect of the acoustic output end 30 may be improved.

Figure 25:
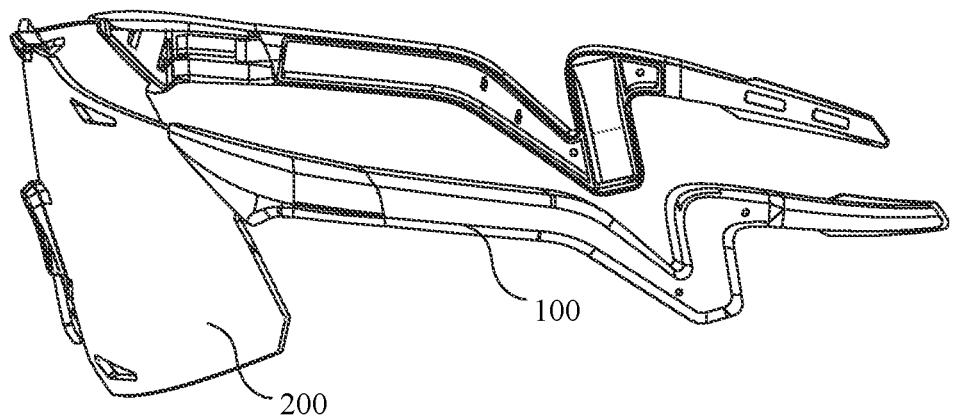
FIG. 25 is a schematic diagram illustrating a wearable device according to some embodiments of the present disclosure.
Figure 26:
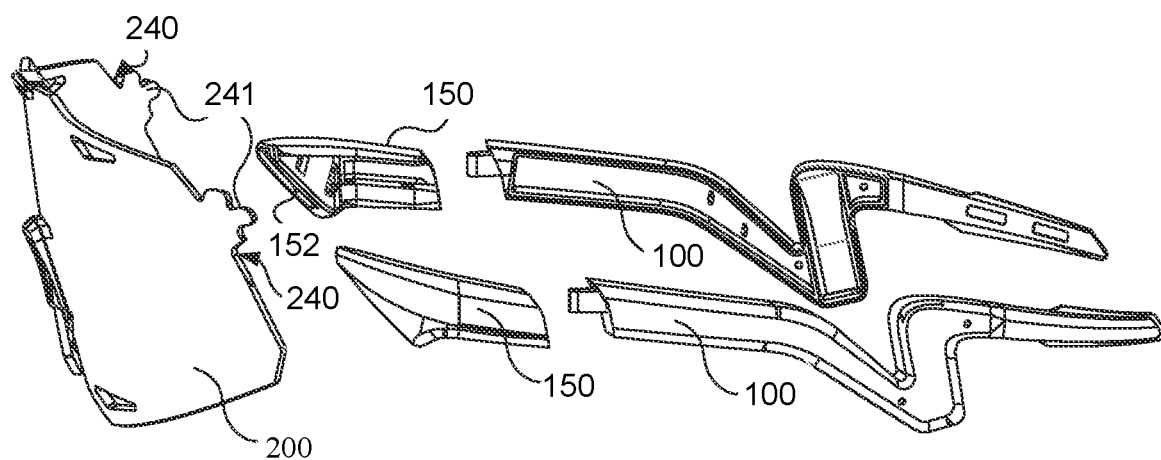
FIG. 26 is a schematic diagram illustrating a disassembled structure of the wearable device according to the embodiment of FIG. 25.
Figure 27:
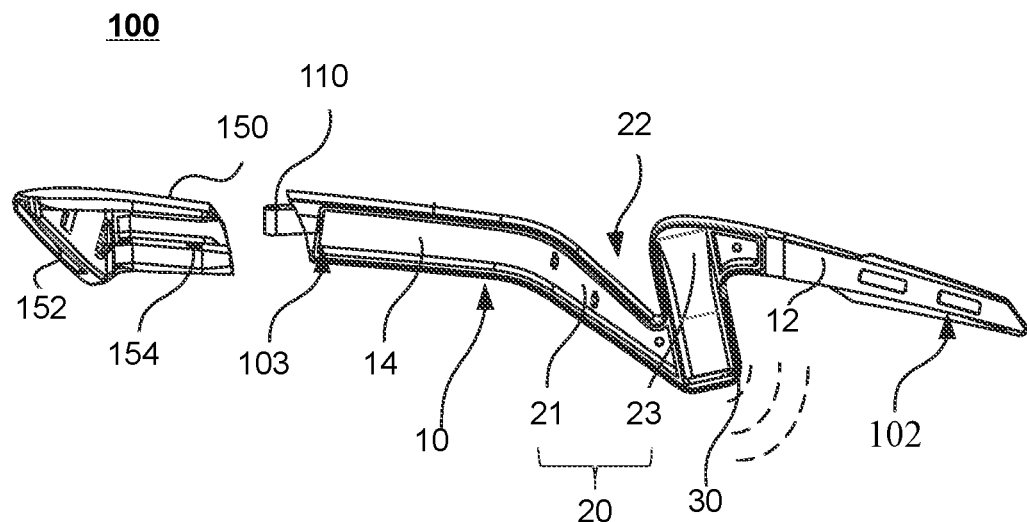
FIG. 27 is a schematic diagram illustrating a disassembled structure of the wearing part according to the embodiment of FIG. 25.

FIG. 25 is a schematic diagram illustrating the structure of the wearable device according to some embodiments of the present disclosure; FIG. 26 is a schematic diagram illustrating a disassembled structure of the wearable device according to the embodiment of FIG. 25; and FIG. 27 is a schematic diagram illustrating the disassembled structure of the wearing part according to the embodiment of FIG. 25. Combining FIGS. 25 to 27, in some embodiments, the wearable device 1000 may include the visible part 200 and the wearing part 100 connected to the visible part 200. In this embodiment, the wearable device 1000 is glasses, the visible part 200 may include a lens assembly, and the wearing part 100 may include temples. The glasses may be rimless glasses (that is, the glasses with lenses but no frame), rimmed glasses (that is, the glasses with lenses and a frame), or decorative glasses (that is, the glasses with a frame but no lenses).

In some embodiments, the wearing part 100 may include two temples, each of which is detachably connected to the visible part 200. On the one hand, the two temples may be erected on a user's auricle to provide a stable support for the glasses; on the other hand, the two temples may generate a clamping force applied to the user's head, so that the glasses may be worn on the user's head stably.

In some embodiments, the wearing part 100 may further include an adjustment part 150. Two ends of the adjustment part 150 may be respectively connected to the temple and the lens assembly, so as to realize the connection of the temple and the lens assembly. In this embodiment, the adjustment part 150 and the lens assembly are detachably connected, so that the adjustment part 150 of different disclosures may be replaced, and then the length of the temple may be adjusted by replacing the adjustment part 150 of different lengths, so as to adapt to different users, and solve a technical problem of making the user uncomfortable due to a too long or too short temple.

In some embodiments, the visible part 200 may include a positioning end 240 disposed on the lens assembly, and two positioning ends 240 may be provided and respectively disposed on both sides of the lens assembly to correspond to the two temples. One end of the adjustment part 150 is detachably connected to the positioning end 240 of the lens assembly. Hereinafter, a cooperation between only one positioning end 240 and one temple is taken as an example for illustration.

The positioning end 240 of the lens assembly is provided with a buckle part 241, and the end of the adjustment part 150 connected to the lens assembly is provided with a clamping part 152. The buckle part 241 and the clamping part 152 cooperate to realize the connection between the temple and the lens assembly. The buckle part 241 may be a block, and the clamping part 152 may be a slot, and the block is inserted into the slot to realize the connection between the temple and the lens assembly.

In some embodiments, when the lens assembly is connected by two lenses and a connection part between the two lenses to form the rimless glasses, the engaging part 152 may be a slot, and the buckle part 241 may be the block extends along the edge of the lens. The clamping block may be inserted into the clamping slot to complete an assembly of the temple and the lens assembly. When the rimless glasses are disassembled, the clamping part 152 and the buckle part 241 may be separated directly.

In some embodiments, when the lens assembly includes the frame, the clamping part 152 may be a slot, and the buckle part 241 may be a block provided on the edge of the frame, and the block may be inserted into the slot to complete the assembly of the temple and the lens assembly. In some alternative embodiments, the clamping part 152 may be a clamping block, and the buckle part 241 may be a slot provided on the edge of the frame, and the clamping block may be inserted into the slot to complete the assembly of the temple and the lens assembly.

In some other embodiments, the edge of the lens assembly (e.g., the frame) may be made of a magnetic material, and a magnetic part, such as a magnet may be provided inside the adjustment part 150 to realize the assembly of the temple and the lens assembly through magnetic attraction.

In some embodiments, the adjustment part 150 may be configured as a replaceable adjustment part 150 of different specifications, that is, a pair of glasses is configured with a plurality of adjustment parts 150 of different specifications, and each adjustment part 150 may be able to be detachably connected to the lens assembly through the above embodiment. Then the length of the temple may be adjusted through the adjustment part 150 of different specifications, so as to adjust the distance between the acoustic output end 30 on the wearing part 100 and the ear, or improve the wearing comfort of the user. For example, by selecting an appropriate adjustment part, a horizontal distance between the acoustic output end 30 on the wearing part 100 and the user's tragus may be at an appropriate distance (e.g., no more than 2 cm, 2.5 cm, 3 cm, 3.5 cm, etc.), so that the volume heard by the user may be improved. For another example, in accessories of a pair of glasses, the adjustment part 150 may include a temple adjustment part with a length L1, a temple adjustment part with a length L2, and a temple adjustment part with a length L3, wherein L1<L2<L3. In some exemplary application scenarios, when the adjustment parts 150 with the length L2 is assembled in the glasses, if the user feels that the temples are too long when wearing them, they may be replaced by the adjustment parts 150 with the length L1. If the user feels that the temples are too short when wearing them, they may be replaced with the adjusting parts 150 with the length of L3.

In the glasses provided in the embodiment of the present disclosure, through disposing the adjustment part 150 on the temple to achieve the detachable connection through the adjustment part 150 and the lens assembly, the length of the temple may be adjusted by replacing the adjustment part of different specifications to adapt to different users, and a user comfort may be improved.

In some embodiments, the wearing part 100 may include the detachably connected temple and the adjustment part 150. The temple includes a connection end 103 and an erection end 102 which are oppositely disposed. The connection end 103 is detachably connected to the adjustment part 150, that is, the adjustment part 150 is detachably connected to the connection end 103 of the temple. The erection end 102 erects the temples on the auricle.

In this embodiment, the adjustment part 150 is replaceably connected to the temple, so as to adjust the length of the temple by replacing the adjustment part 150 with different specifications. As mentioned above, the adjustment part 150 may be configured as the replaceable adjustment parts 150 of different specifications, that is, a pair of glasses is configured with a plurality of adjustment parts 150 of different specifications, and each adjustment part 150 may be detachably connected to the temple. Then the length of the temple may be adjusted through the adjustment parts 150 of different specifications.

As shown in FIG. 27, in some embodiments, the connection end 103 of the temple is provided with a first buckle 110, the end of the adjustment part 150 connected to the temple is provided with a second buckle 154, and the first buckle 110 and the second buckle 154 cooperate to realize the detachable connection between the adjustment part 150 and the temple. The first buckle 110 may be a protrusion, and the second buckle 154 may be a slot, and the protrusion is inserted into the slot to realize the connection between the adjustment part 150 and the temple. In some other embodiments, the first buckle 110 may be a slot, and the second buckle 154 may be a protrusion. In some alternative embodiments, the first buckle 110 may be a hook structure, and the second buckle 154 may further be a slot structure, and the hook is disposed in the slot to realize the connection between the adjustment part 150 and the temple.

In some embodiments, the adjustment part 150 may be connected to the temple by a magnetic attraction. For example, the connection end 103 of the temple may be provided with a magnetic part, the adjustment part 150 may be made of a magnetic material, and the connection between the adjustment part 150 and the temple is achieved by the magnetic attraction. For another example, the connection end 103 may be provided with the magnetic part, and the end of the adjustment part 150 connected to the temple may be provided with the magnetic part, and the connection is realized through the principle of attraction of opposites. For another example, a permanent magnet may be provided in the adjustment part 150, and an energized coil may be provided at the connection end 103 of the temple. By energizing the energized coil to generate a magnetic force and then attract or repel the permanent magnet, the assembly or disassembly of the adjustment part 150 and the temple is realized.

In some embodiments, the adjustment part 150 may be combined with the wearing part 100 in one or more of the foregoing embodiments. In some embodiments, the wearing part 100 (e.g., the temple) may include the connection section 10 and the concave section 20. The concave section 20 makes the upper edge of the temple have the downward depression 22 in the temple. The concave section 20 has an acoustic output end 30 therein. The connection section 10 may include the first connection section 12 and the second connection section 14, and the concave section 20 is connected between the first connection section 12 and the second connection section 14. The first connection section 12 is erected on the auricle of the user, and the second connection section 14 is connected to the adjustment part 150. The concave section 20 may include the mounting part 21 and the transition part 23 connected at an angle. The acoustic output end 30 is disposed on the mounting part 21 or the transition part 23. The transition part 23 is connected between the mounting part 21 and the first connection section 12, and the transition part 23 is bent and connected to the first connection section 12 and extends downward so as to extend toward the tragus when worn, so as to shorten the distance between the acoustic output end 30 and the external ear channel. The second connection section 14 is connected to one end of the mounting part 21, and the end of the second connection section 14 away from the mounting part 21 is configured to connect the adjustment part 150.

In some embodiments, the adjuster 150 may include a pile head. The pile head may connect the temple of the glasses with the frame or the lens, so as to realize a rotation of the temple relative to the frame or the lens. In some embodiments, one end of the pile head may be fixedly connected to the frame or lens, and the other end of the pile head may be rotatably connected to the temple. For example, the other end of the pile head may be connected to the frame or the lens by bonding, inlaying, welding, riveting, screwing, buckling, etc. The other end of the pile head and the temple may be connected by a hinge mechanism, so that the temple may rotate relative to the pile head, so that the user may adjust the angle between the temple and the frame or the lens as required. In addition, one end of the pile head may further be rotatably connected to the frame or the lens, while the other end of the pile head may be fixedly connected to the temple, and such deformations are within the protection scope of the present disclosure.

In some embodiments, when the glasses are rimless glasses (that is, the glasses have no frames, and the temples are directly connected to the lenses), since the connection between the pile head and the lenses is usually detachable, it is possible to replace the pile head and/or the lens to meet the needs of different users.

In some embodiments, a width of the glasses may be adjusted by replacing lenses of different sizes. The width of glasses may refer to the distance between the connections of the two temples and the lenses or the frames. For example, the width of the glasses may include a sum of the widths of the two lenses and a bridge distance between the two lenses. Therefore, by replacing lenses of different sizes, the glasses may have different widths, thereby meeting the needs of different users. For example, when the width of the user's head is large, an insufficient lens width may lead to excessive extrusion force from the temples when the user wears the glasses. Choosing a wider lens may increase the width of the glasses and reduce the impact of the temples on the user, thereby reducing the extrusion force. For another example, when the width of the user's head is small, an excessive width of the lens may cause the user's head to not fit firmly with the glasses, so that the glasses are easy to fall off. Choosing a lens with a smaller width may shorten the width of the glasses and improve the contact between the user's head and the glasses, thereby improving the fitness of the user's head and the glasses.

In some embodiments, the overall size of the glasses (e.g., the length and width of the glasses) may be adjusted by replacing the pile heads of different sizes. The size of the pile head may refer to the length and width of the pile head. The length of the pile head may refer to the size of the pile head along a length direction of the temple. The width of the pile head may refer to the size of the pile head along a width direction of the lens. The length of the glasses may include a sum of the size of the pile head along the length direction of the temples and the length of the temples. The length of the pile head may affect the distance from the temple to the lens, and further affect the distance from the acoustic output end 30 to the user's ear. Exemplarily, when the user wears the glasses, the distance from the acoustic output end 30 on the temple to the lens is related to the length of the pile head. For example, the longer the pile head is, the farther the distance from the acoustic output end 30 to the lens is. For another example, the shorter the pile head is, the closer the distance between the acoustic output end 30 and the lens is. In some cases, if the pile head is too short, the distance between the acoustic output end 30 and the lens may be relatively close. Although the acoustic output end 30 is located in front of the user's ear, the distance between the two is relatively short. If the pile head is too long, the distance between the acoustic output end 30 and the lens may be relatively long, so that the acoustic output end 30 is located on the back of the user's ear or even at a far distance behind the user's ear. The above conditions may worsen the effect of the sound, which affects the user experience. The width of the pile head may affect the width of the glasses. Exemplarily, the greater the width of the pile head is, the greater the distance between the corresponding two temples is, and the greater the width of the glasses is. The smaller the width of the pile head is, the shorter the distance between the corresponding two temples is, and the smaller the width of the glasses. In some embodiments, the width of the glasses may be adjusted by selecting suitable lenses or suitable pile heads according to the head shape and size of the wearer (that is, the user), so that the user may wear the glasses comfortably. For example, when the width of the user's head is large, selecting wider lenses and/or wider pile heads may increase the width of the glasses and reduce the extrusion force of the temples on the user's head. In some embodiments, the distance between the acoustic output end 30 and the user's ear may be shortened by selecting a suitable pile head according to the user's head shape and head size, so that when different users wear glasses, the acoustic output end 30 on the temple may deliver sound well to the user. For example, when the front-to-back length of the user's head is small, the length of the glasses may be too long, which may cause the acoustic output end 30 to be located behind the user's ear and far away from the ear when the user wears the glasses. At this time, a shorter pile head may be selected to shorten the length of the glasses, thereby reducing the extrusion force of the temples on the user's head.

In some embodiments, the glasses may be half-rim glasses (i.e., the edges of the lenses are at least partially surrounded by the frame) or full-rim glasses (i.e., the edges of the lenses are completely surrounded by the frame). As the connection between the pile head and the frame is usually a fixed connection, it is difficult to disassemble the pile head and the frame. Based on the above reasons, the structure of the temples may be improved, and then the size of the glasses may be adjusted by adjusting the temples. In some embodiments, the temple may include a first section and a second section connected to the first section. One end of the first section may be connected to the pile head, and the other end of the first section may be connected to the second end. The first section and the second section may perform operations such as relative rotation, expansion and contraction, and disassembly, etc. In this embodiment, the first section of the temple and parts connected to the first section, such as the pile head, the lens, and the temple, may be regarded as a whole. The size of the glasses may be adjusted through operations such as relative rotation, stretching and dismounting of the first section and the second section. In some cases, when the width of the glasses is not suitable or the distance between the acoustic output end 30 and the ear is relatively long, the first section of the temple, the pile head and the frame connected to the first section may be replaced, so as to meet the needs of different users. In some embodiments, the first section of the temple may be equivalent to the first leg 141 in the above embodiments, which may be used to connect with the visible part (e.g., the frame). The second section of the temple may be equivalent to the second leg 143 in the above embodiment, which may be used for connecting the mounting part 21. For more contents on how the first section and the second section of the temple can realize the relative rotation, the relative stretching and the disassembly, please refer to the descriptions in FIG. 13, which are not repeated here. The half-rim glasses and full-rim glasses listed in this embodiment are only examples, and are intended to limit the types of glasses. Exemplarily, when the glasses are rimless glasses, the temples may further include the first section and the second section, and the first section, the pile head and the lens may still be replaced as a whole.

Figure 28:
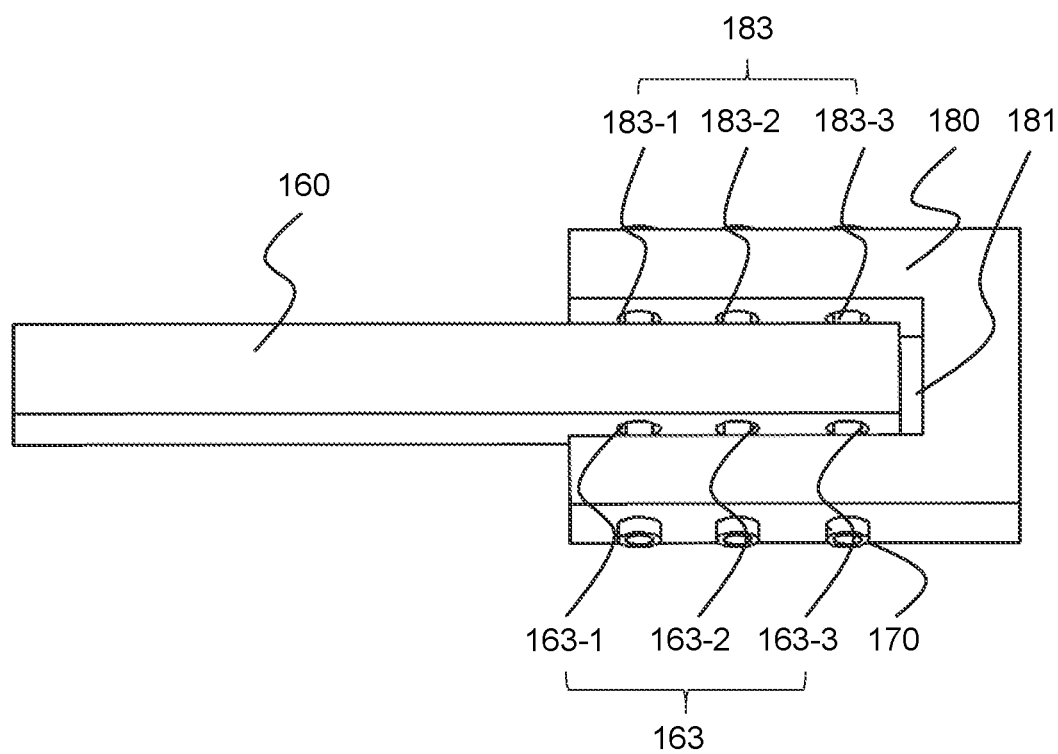
FIG. 28 is a schematic diagram illustrating a connection structure between a U-shaped assembly and a connection rod according to some embodiments of the present disclosure.

FIG. 28 is a schematic diagram illustrating a connection structure between a U-shaped part and a connection rod according to some embodiments of the present disclosure. In some embodiments, a temple and a pile head may be connected by a U-shaped part 180 and a connecting rod 160 as shown in FIG. 28. The U-shaped part 180 may have a U-shaped notch 181. Three groups of first positioning through holes 183 (e.g., 183-1, 183-2, 183-3) may be symmetrically disposed on the two side walls of the U-shaped notch 181, and the three groups of first positioning through holes 183 may be distributed along a length direction of the side wall of the port 181. A first end of the connecting rod 160 is disposed with three groups of second positioning through holes 163 (e.g., 163-1, 163-2, 163-3), and the three groups of second positioning through holes may be distributed along the length direction of the connecting rod 160. A second end of the connecting rod 160 may be connected to other parts of the temple (e.g., the first section of the temple). The first end of the connecting rod 160 may extend into the U-shaped notch 181 of the U-shaped part 180, and through a cooperation of a positioning part 170 (e.g., a positioning rod) and the first positioning through hole 183 and the second positioning through hole 163, the connecting rod 160 is fixed to the U-shaped part 180, so that the temples are fixedly connected to the pile head. In some embodiments, the connecting rod 160 may be part of the temple. For example, the connecting rod 160 may be connected to the first section of the temple. In some embodiments, the U-shaped part 180 may be part of the pile head, and the pile head may also include parts not shown in FIG. 28 for connection to the lens or the frame (e.g., a hinge mechanism).

In this embodiment, the length of the glasses may refer to a sum of the length of the U-shaped part 180 and the length of the part of the temple that does not extend into the U-shaped notch 181. The length of the temple may include the sum of the lengths of the connecting rod 160 and other parts of the temple (e.g., the first section and the second section of the temple). Therefore, as the lengths of the connecting rod 160 extending into the U-shaped notch 181 are different, the length of the glasses will also change. In FIG. 28, the connection between the connecting rod 160 and the U-shaped part 180 may be divided into three conditions, for example: (1) When the length of the connecting rod 160 extending into the U-shaped notch 181 is the longest, the three second positioning through holes (163-1, 163-2, 163-3) on the connecting rod 160 are respectively aligned with the first positioning through holes (183-1, 183-2, 183-3) and are respectively fixed through the three positioning parts 170. At this time, the length of the glasses is the shortest. (2) When the length of the connecting rod 160 extending into the U-shaped notch 181 is the shortest, the second positioning through hole 163-3 on the connecting rod 160 is aligned with the first positioning through hole 183-1 and is fixed through the first positioning part 170. At this time, the length of the glasses is the longest. (3) When the connecting rod 160 extends into the U-shaped notch 181 so that the second positioning through holes 163-1 and 163-2 on the connecting rod 160 are aligned with the first positioning through holes 183-1 and 183-2 respectively and are fixed through the two positioning parts 170, the length of the glasses is between the shortest and the longest. It should be noted that other fixing structures may further be disposed on the U-shaped part 180 and the connecting rod 160, so as to prevent the relative rotation between the connecting rod 160 and the U-shaped part 180 when there is only one positioning part 170 for fixing. For example, a magnet may be disposed on the side wall of the second positioning through hole 163 on the connecting rod 160, and a magnet may be disposed on the side wall of the U-shaped notch 181. When the connecting rod 160 stretches into the U-shaped notch 181, the two magnets may attract each other, thereby preventing the connecting rod 160 and the U-shaped part 180 from rotating relative to each other. The structure and connection mode of the connecting rod 160 and the U-shaped part 180 are only examples, and are not intended to limit their specific structures. Those skilled in the art may transform it to obtain connecting rods 160 and U-shaped parts 180 with different structures. These embodiments are all within the protection scope of the present disclosure. In some embodiments, the connecting rod 160 may be a part of the pile head and the U-shaped part 180 may be a part of the temple. In some embodiments, the count of the first positioning through hole 183 and the second positioning hole 163 may not be limited to three groups, for example, the count of the first positioning through hole 183 and the second positioning hole 163 may be two groups, four groups, five groups, or more.

In some embodiments, the length of the glasses may be adjusted by adjusting the length of the connecting rod 160 extending into the U-shaped notch 181, thereby adjusting the distance between the acoustic output end 30 and the ear. For example, when the acoustic output end 30 is located behind the user's ear and is far away from the ear, it indicates that the length of the glasses is too long. At this time, the length of the connecting rod 160 extended into the U-shaped notch 181 may be increased to shorten the length of the glasses. For another example, when the acoustic output end 30 is located in front of the user's ear and is far away from the ear, it indicates that the length of the glasses is too short. At this time, the length of the connecting rod 160 extended into the U-shaped notch 181 may be reduced to increase the length of the glasses.

In some embodiments, the shape of the wearable device 1000 may be fixed, that is, the shape of the wearable device 1000 cannot be adjusted. For example, the relative position between the wearing part 100 and the visible part 200 cannot be changed, which makes the form of the wearable device 1000 unchanged. In the embodiment shown in FIG. 4, the visible part 200 may be integrally formed with the wearing part 100, so that the connection relation and the relative position between the visible part 200 and the wearing part 100 are fixed, so the shape of the wearable device 1000 is also fixed.

Figure 29:
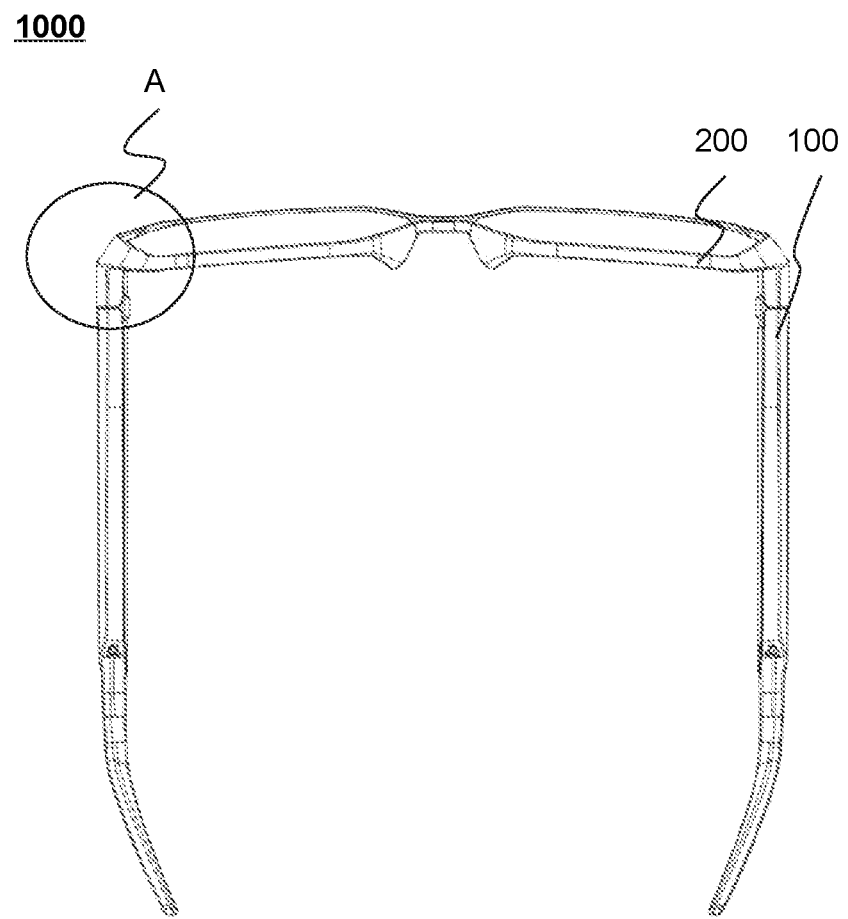
FIG. 29 is a schematic diagram illustrating a mounting position of a relative position detection device according to some embodiments of the present disclosure.

FIG. 29 is a schematic diagram illustrating a mounting position of a relative position detection device according to some embodiments of the present disclosure. In some embodiments, the shape of the wearable device 1000 is adjustable, that is, the shape of the wearing part 100 may be changed. For example, when the wearable device 1000 is glasses, the glasses may exist in the form shown in FIG. 29, and in this form, an angle formed between a temple and a frame of the glasses is approximately equal to 90°. The glasses in this form may be directly worn by the user. In addition, the glasses may further exist in other forms. For example, the temple of the glasses rotates toward an inner side (that is, toward a direction of the other temple) along a connection point between the temple and the frame, so that the angle between the temple and the frame is reduced. In this state, the glasses cannot be worn directly, but as the size of the glasses is smaller compared to other forms, it is suitable for carrying and storage.

In some embodiments, the wearing part 100 may move relative to the visible part 200 so that the user can adjust the shape of the wearable device 1000. When using the wearable device 1000 provided in the present disclosure, the user may adjust the form of the wearable device 1000 according to a use scenario and purpose, so as to effectively improve a user experience.

In some embodiments, the wearable device 1000 may include a connection assembly for connecting the wearing part 100 and the visible part 200, and the wearing part 100 and the visible part 200 may be movably connected through the connection assembly. In some embodiments, the connection assembly may include the adjustment part 150 in the previous example, for example, the connection assembly may be a pile head. The wearing part 100 may rotate relative to the visible part 200 through the pile head.

In some embodiments, the user may adjust the shape of the wearable device according to actual needs. For example, when the user does not need to use the wearable device 1000, the wearable device 1000 may be stored. For another example, when the user needs to use the wearable device 1000, the wearable device 1000 needs to be adjusted to a usable state. One or more functional elements on the wearable device 1000 are powered by a power supply. In some embodiments, to improve a battery life of the wearable device 1000, one or more functional elements may be turned off or adjusted to a sleep state when not in use. For example, when the wearable device 1000 is not in use, a speaker assembly may be turned off or stop playing music. For another example, when the wearable device 1000 is not in use, the power may be turned off or adjusted to the sleep state.

In some embodiments, the user may control the operation of one or more functional elements through manual control. For example, the control circuit assembly may include a button, a touch pad and other structures disposed on the wearing part 100 and/or the visible part 200. A feedback signal may be generated when the user touches or presses the button or the touch pad, and the control circuit assembly may control the acoustic element (e.g., the speaker assembly) according to the feedback signal. In some embodiments, the button and the touch pad may generate different feedback signals according to the way the user touches and presses. For example, the user presses a button once, which may generate a feedback signal corresponding to causing the speaker assembly to stop playing music. For another example, the user presses the button twice, a feedback signal corresponding to switching the speaker assembly to the next part of the music may be generated. For another example, the user draws a circle on the touch pad, and a feedback signal corresponding to stopping the operation of the speaker assembly may be generated. The feedback signal type corresponding to the user's operation may be disposed according to actual needs. In some application scenarios, when the user does not use the wearable device 100, one or more functional elements may be turned off, suspended or adjusted to other low power consumption states to save power consumption and increase standby time. In other application scenarios, when the user needs to store or carry the wearable device 1000, one or more functional elements may be adjusted first, and then the shape of the wearable device 1000 may be adjusted. For example, first turn off the speaker assembly, turn off the power supply, and then adjust the relative position between the wearing part 100 and the visible part 200 so that they are relatively folded for carrying or storage.

However, in some embodiments, controlling the operation of the speaker assembly based on the user's manual control may cause the user to forget to pause or turn off the functional elements when the wearable device 1000 is not in use. For example, the user only adjusts the relative position between the wearing part 100 and the visible part 200 to make them fold relative to each other, but does not turn off the speaker assembly and the power supply. The speaker assembly will continue to consume power as it is still working, which may cause the power supply to continuously deliver power to the speaker assembly, and increase the power consumption of the wearable device 1000.

Therefore, to overcome the above problems, the wearable device 1000 provided in the present disclosure further includes a detection assembly. The detection assembly may communicate/connect with one or more functional elements in one or more of the foregoing embodiments. In some embodiments, the detection assembly may be configured to detect the form of the wearable device 1000, a processor may determine a use state of the wearable device 1000 according to the form of the wearable device 1000, and the control circuit assembly may control one or more other functional elements based on the use state of the wearable device 1000. In some embodiments, the detection assembly may be configured to detect a positional relationship between the wearing part 100 and the visible part 200, and based on the positional relationship, the form of the wearable device 1000 may be determined. The detection assembly will be described in detail below with reference to FIG. 29.

FIG. 29 is a schematic diagram illustrating a mounting position of a relative position detection device according to some embodiments of the present disclosure. As shown in FIG. 29, in some embodiments, the detection assembly may include a relative position detection device (not shown in the figure), which is configured to detect the position of the wearing part 100 relative to the visible part 200. The relative position detection device may be disposed at the connection between the wearing part 100 and the visible part 200, that is, position A shown in FIG. 29.

In some embodiments, when the wearing part 100 is in a first position relative to the visible part 200, the wearable device 1000 may be regarded as a folded state. When the wearing part 100 is in a second position relative to the visible part 200, the wearable device 1000 may be regarded as an unfolded state. When the wearing part 100 is in a transitional position relative to the visible part 200, the wearable device 1000 may be regarded as a transitional state.

The folded state may refer to the form of the wearable device 1000 when the angle between the wearing part 100 and the visible part 200 is smaller than a first angle threshold. In some embodiments, the first angle threshold may be in the range of 10°-45°. In some embodiments, the first angle threshold may be in the range of 10°-30°. In some embodiments, the first angle threshold may be in the range of 10°-15°.

The unfolded state may be understood as the form of the wearable device 1000 when the angle between the wearing part 100 and the visible part 200 is greater than a second angle threshold, and in this form, the wearable device 1000 may be worn by the user. In some embodiments, the second angle threshold may be in the range of 75°-120°. In some embodiments, the second angle threshold may be in the range of 75°-100°. In some embodiments, the second angle threshold may be in the range of 75°-90°.

The transition state may be understood as the form of the wearable device 1000 when the angle between the wearing part 100 and the visible part 200 is greater than the first angle threshold and smaller than the second angle threshold. In some embodiments, when the wearable device 1000 is not in the folded state and not in the unfolded state, it may be referred to as a transition state. When the wearable device 1000 is in a folded state or a transitional state, it may be considered that the user is not currently using the wearable device 1000.

In some embodiments, the user may adjust the position of the wearing part 100 relative to the visible part 200 according to its needs, thereby changing the form of the wearing part 100. For example, when the user needs to wear the wearable device 1000, the wearing part 100 may be adjusted to the second position, so that the wearing part 100 is in the unfolded state. For another example, when the user does not need to use the wearable device 1000 (e.g., when the wearable device 1000 is stored in a storage box), the wearing part 100 may be adjusted to the first position, so that the wearing part 100 is in the folded state.

In some embodiments, the relative position detection device may include a spring probe and a conductive metal part disposed at the connection between the wearing part 100 and the visible part 200. Exemplarily, the spring probe and the conductive metal part may be respectively disposed at the connection of the wearing part 100 and the visible part 200. When the wearing part 100 moves relative to the visible part 200, the relative position of the spring probe and the conductive metal part changes, and then a conducting state of the spring probe and the conductive metal part changes. In some embodiments, the spring type probe may be disposed on the edge of the wearing part 100 close to the connection of the wearing part 100 and the visible part 200, and the conductive metal part may be disposed on the wearing part 200 near the edge of the connection of the wearing part 100 and the wearing part 200. When the relative position of the spring probe and the conductive metal part is relatively close, the spring probe and the conductive metal part may be electrically connected, so that the spring probe is in the conducting state. When the relative position of the spring probe and the conductive metal part is relatively far, the spring probe and the conductive metal part cannot be electrically connected, so that the spring probe is in a non-conducting state. In this embodiment, the state of the wearable device 1000 may be determined by detecting the conducting state of the spring probe and the conductive metal part.

In some embodiments, when it is detected that the spring probe is in a non-conductive state, that is, the spring probe is disconnected from the conductive metal part, it may be determined that the wearing part 100 is in the first position or the transition position relative to the visible part 200; when it is detected that the spring probe is in a conducting state, that is, the spring probe is electrically connected to the conductive metal part, it may be determined that the wearing part 100 is in the second position relative to the visible part 200.

In some embodiments, the relative position detection device may include a switch structure. When the position of the wearing part 100 relative to the visible part 200 changes, the state of the switch structure may be affected, and the state of the wearing part 100 may be determined by detecting the conducting state of the switch structure, thereby determining the state of the wearable device 1000. In some embodiments, when it is detected that the switch structure is in a closed state, that is, the conducting state, it may be determined that the wearable device 1000 is in the unfolded state; when it is detected that the switch structure is in an open state, that is, in a non-conducting state, it may be determined that the wearable device 1000 is in the folded state or the transition state. Exemplarily, taking a microswitch as an example, the microswitch is disposed at position A in FIG. 29. The microswitch may include a transmission element (not shown in the figure) and an action reed (not shown in the figure) connected to the transmission element. When the wearable device 1000 is in the unfolded state, the wearing part 100 is at the second position. At this time, the wearing part 100 or the visible part 200 may press the transmission element, and the transmission element may act on the action reed, causing a contact point of the action reed to be connected, so that the micro switch is in the conducting state; when the wearable device 1000 is in the transition state or the folded state, the wearing part 100 is at the transition position or the first position, and the force acting on the action reed is not enough to cause the contacts of the action reed to be connected, so that the microswitch is in the non-conducting state. In some embodiments, the types of switch structures may include, but are not limited to, microswitches, photoelectric switches, and proximity switches.

In some embodiments, the relative position detection device may include a magnet, a magnetizer and a magnetic field detector. The magnet may be coupled with the magnetizer. The magnetic field detector may be configured to detect a magnetic field strength between the magnet and the magnetizer. In some embodiments, the position of the wearing part 100 relative to the visible part 200 may be determined according to the detected magnetic field strength, and then the state of the wearable device 1000 may be determined. Exemplarily, the magnet and the magnetizer may be respectively disposed on the wearing part 100 and the visible part 200. When the relative position of the visible part 200 and the wearing part 100 changes, the relative position between the magnet and the magnetizer may change, so that the magnetic field strength between the magnet and the magnetizer changes, and the magnetic field detector may detect the change of the magnetic field strength, and based on the change of the magnetic field strength, the position of the wearing part 100 relative to the visible part 200 may be determined, thereby determining the state of the wearable device 1000. In some embodiments, when the magnetic field strength between the magnet and the magnetic conductor exceeds a preset magnetic field strength threshold, it may be determined that the wearing part 100 is at the second position relative to the visible part 200; when the magnetic field strength between the magnet and the magnetic conductor does not exceed the preset magnetic field strength threshold, it may be determined that the wearing part 100 is at the first position or the transitional position relative to the visible part 200. In some embodiments, the magnetic conductor may include iron, nickel, cobalt, etc.

In some embodiments, the wearable device 1000 may further include a time detection device, and the time detection device may be configured to detect a duration that the wearing part 100 is at the second position relative to the visible part 200. In some application scenarios, the position of the wearing part 100 relative to the visible part 200 may be changed due to the user's misoperation or other unexpected circumstances, for example, the user accidentally adjusts the position of the wearing part 100. In this case, the control circuit assembly may also determine that the wearable device 1000 is in use, and then control the corresponding parts to start working (e.g., control the speaker assembly to play music). Therefore, in some embodiments, it may be determined that the wearable device 1000 is in the unfolded state only when it is detected that the wearing part 100 is at the second position and exceeds a certain period of time. This embodiment may be combined with various types of relative position detection devices in one or more of the foregoing embodiments. In some embodiments, when it is detected that the duration of the electrical connection between the spring probe and the conductive metal part exceeds a preset time threshold, it may be determined that the wearable device 1000 is in the non-use state. When it is detected that the duration of the electrical connection between the spring probe and the conductive metal part does not exceed the preset time threshold, it may be determined that the wearable device 1000 is in use. In some embodiments, the preset time threshold may be 0.5 seconds to 8 seconds. In some embodiments, the preset time threshold may be 2 seconds to 6 seconds. In some embodiments, the preset time threshold may be 3 seconds to 5 seconds.

In some embodiments, after the use state of the wearable device 1000 is determined, corresponding operations may be performed based on the use state of the wearable device 1000. For example, when it is detected that the wearable device 1000 is not in use, the control circuit assembly can turn off the power supply to save power and improve the battery life of the wearable device 1000. For another example, when it is detected that the wearable device 1000 is in use, the control circuit assembly may control the power supply to supply power to the speaker assembly, and control the speaker assembly to output the sound signal.

It should be noted that the above description about the detection assembly is only for illustration and description, and does not limit the scope of the present disclosure. For those skilled in the art, various modifications and changes may be made to the detection assembly under the guidance of the present disclosure. However, such modifications and changes are still within the scope of the present disclosure. For example, the relative position detection device and the time detection device may be combined into one device, so that it may have the functions of the time detection and the position detection. For another example, the time detection device may be omitted.

In some application scenarios, the user may replace and repair partial assemblies of the wearable device 1000. This process involves disassembly and assembly of the assemblies of the wearable device 1000 (e.g., the wearing part 100, the visible part 200). The connection structure between the assemblies of the wearable device 1000 may affect a difficulty of the disassembly and assembly. For example, when the wearable device 1000 is the glasses, the frame and the temples are usually connected through a connection structure (e.g., the pile heads) that is difficult to disassemble. Both the disassembly and the assembly are time-consuming and laborious, and it is difficult for the users to replace and repair by themselves. In particular, when the glasses are intelligent glasses (e.g., the audio glasses, the VR glasses, the AR glasses), the various functional elements may be disposed on the temples and frames. It may cost a lot to replace the smart glasses as a whole. Meanwhile, its connection structure makes partial replacement (e.g., the replacement of temples) difficult, which reduces the user experience to a certain extent.

Based on the above reasons, the present disclosure provides a wearable device 1000 including a quick-release assembly, the visible part 200 and the wearing part 100 are connected through the quick-release assembly, and the quick-release assembly may simplify operations of assembly and disassembly between the visible part 200 and the wearing part 100, reduce the difficulty of replacing and repairing the partial parts of the wearable device 1000, thereby improving the user experience. The quick-release assembly will be described in detail below with reference to FIGS. 30-37.

Figure 30:
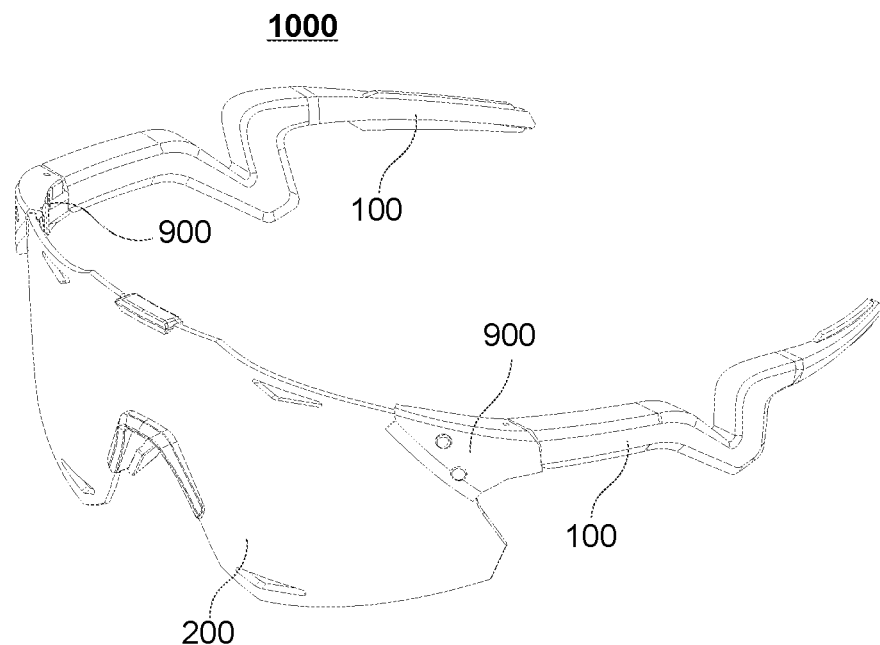
FIG. 30 is a schematic diagram illustrating a wearable device according to some embodiments of the present disclosure.
Figure 31:
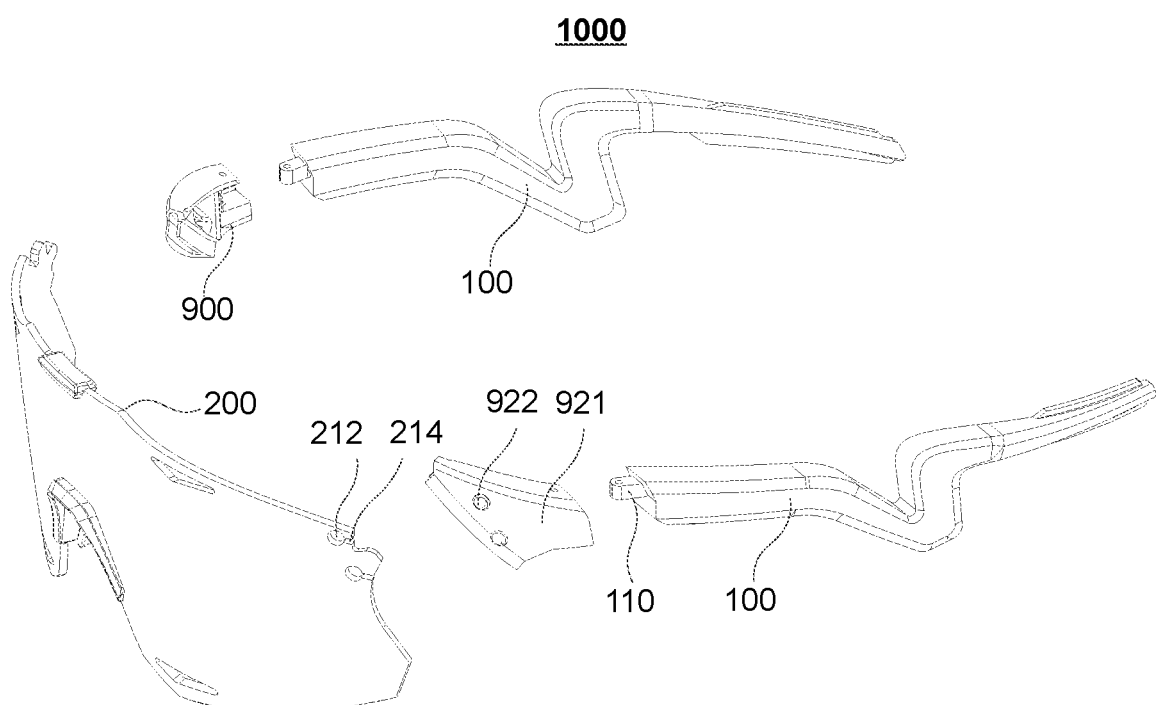
FIG. 31 is a schematic diagram illustrating an explosion structure of the wearable device according to FIG. 30.
Figure 32:
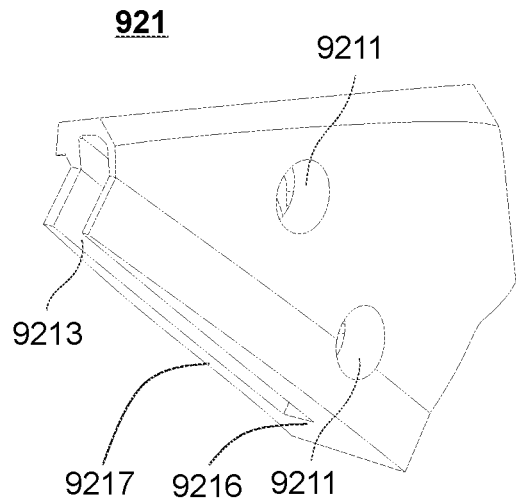
FIG. 32 is a schematic diagram illustrating an axial structure of a mounting base in the wearable device according to FIG. 31.
Figure 33:
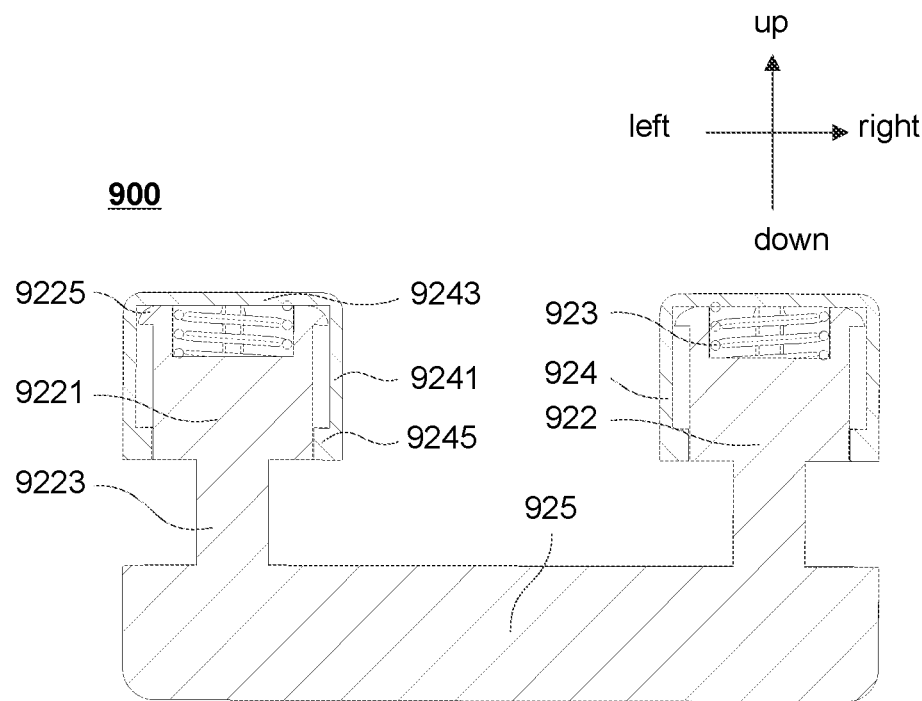
FIG. 33 is a schematic diagram illustrating sectional structural views of a first locking part, a first elastic part, a first positioning cover, and a keyboard in a quick-release assembly according to FIG. 31.

FIG. 30 is a schematic diagram illustrating the structure of the wearable device according to some embodiments of the present disclosure; FIG. 31 is a schematic diagram illustrating an explosion structure of the wearable device according to FIG. 30; FIG. 32 is a schematic diagram illustrating an axial structure of the mounting base in the wearable device according to FIG. 31; and FIG. 33 is a schematic diagram illustrating sectional structural views of a first locking part, a first elastic part, a first positioning cover and a keyboard in a quick-release assembly according to FIG. 31; As shown in FIGS. 30-33, in some embodiments, the wearable device 1000 may include the visible part 200, a quick-release assembly 900 and a wearing part 100. The visible part 200 and the wearing part 100 are respectively connected to two ends of the quick-release assembly 900. Compared with the connection through the connection structure, the operations required to disassemble the visible part 200 or the wearing part 100 from the quick-release assembly 900 or to assemble the visible part 200 or the wearing part 100 are simpler, more convenient and less difficult, which effectively improves the user experience.

In some embodiments, the wearing part 100 is a temple, and the wearable device 1000 includes a visible part 200, two groups of quick-release assemblies 900 and two groups of wearing parts 100. The two groups of quick-release assemblies 900 are disposed on the two ends of the visible part 200, the two groups of wearing parts 100 are respectively connected to a corresponding groups of quick-release assemblies 900 to form a glasses-like structure as shown in FIG. 30.

In some embodiments, the quick-release assembly 900, the visible part 200 and the wearing part 100 may all be independent assemblies. The quick-release assembly 900, the visible part 200 and the wearing part 100 may be assembled or disassembled with each other. For example, both the visible part 200 and the wearing part 100 may be quickly disassembled with the quick-release assembly 900. In some embodiments, the quick-release assembly 900 may be fixedly connected to one of the visible part 200 or the wearing part 100 and detachably connected to the other. For example, the wearing part 100 and the quick-release assembly 900 may be disposed in a conventional connection structure or an integrated structure, so that it cannot be quickly disassembled.

As shown in FIG. 30 to FIG. 33, in some embodiments, the quick-release assembly 900 may include a mounting base 921 and a first lock 922. One end of the mounting base 921 is provided with an insertion cavity 9213, and an opening direction of the insertion cavity 9213 faces a side wall 9216 of the mounting base. The mounting base 921 is also provided with a through hole 9211, and the through hole 9211 penetrates through a side wall 9217 of the insertion cavity 9213 along a thickness direction of the insertion cavity 9213. The first lock 922 may be disposed on the mounting base 921 and pass through the insertion cavity 9213 through the through hole 9211. The first lock 922 includes a first locking part 9221 and a first unlocking part 9223 disposed coaxially. An axial projection of the first unlocking part 9223 is within a projection range of the first locking part 9221 along the axial direction, that is, the sectional area of the first unlocking part 9223 perpendicular to the axial direction is smaller than that of the first locking part 9221 perpendicular to the axial direction. The first locking part 9221 is configured to limit and fix the visible part 200. The first unlocking part 9223 is configured to release the limitation and fixing on the visible part 200.

The first locking part 9221 and the first unlocking part 9223 are disposed coaxially, which means that the first locking part 9221 and the first unlocking part 9223 are connected end-to-end and extend along the same direction. For example, in the embodiment shown in FIG. 33, a lower end of the first locking part 9221 is connected to an upper end of the first unlocking part 9223 and central axes of the first locking part 9221 and the first unlocking part 9223 coincide. In some embodiments, the central axes of the first locking part 9221 and the first unlocking part 9223 may be parallel, but not coincident.

In this embodiment, the first locking part 9221 and the first unlocking part 9223 are shaft sections with different shaft diameters, and the shaft diameter of the first locking part 9221 is greater than that of the first unlocking part 9223. Since the first locking part 9221 and the first unlocking part 9223 are disposed coaxially, the sectional area of the first unlocking part 9223 perpendicular to the axial direction is smaller than the sectional area of the first locking part 9221 perpendicular to the axial direction.

In some embodiments, the first locking part 9221 and the first unlocking part 9223 may be rods or cylinders, and their sections perpendicular to the axial direction may be in regular or irregular shapes such as rectangles, triangles or polygons.

In some embodiments, the wearing part 100 may be fixedly connected to the mounting base 921 and detachably connected to the visible part 200 through the mounting base 921. In some embodiments, the visible part 200 may be provided with a docking part. The docking part may extend from the opening of the insertion cavity 9213 into the insertion cavity 9213 to match with the insertion cavity 9213. By adjusting the first locking part 9221 until it cannot disengage from the docking part because of the first lock, the visible part 200 and the mounting seat 921 may be relatively fixed.

In some embodiments, the first lock 922 may be disposed on the mounting base 921 and penetrate into the insertion cavity 9213. When the first locking part 9221 is located in the insertion cavity 9213, the visible part 200 may be limited and fixed. When the first unlocking part 9223 is located in the insertion cavity 9213, the limitation on the visible part 200 may be released and the visible part 200 may be disassembled from the mounting base 921.

As shown in FIG. 31, in some embodiments, the visible part 200 is provided with a locking hole 212 and a channel 214 communicating with the locking hole 212. A diameter of the locking hole 212 is greater than a width of the channel 214. The width of the channel 214 is between the shaft diameter of the first locking part 9221 and the shaft diameter of the first unlocking part 9223 so that the first unlocking part 9223 can enter the locking hole 212 through the channel 214, while the first locking part 9221 cannot pass the channel 214. Therefore, when the first locking part 9221 is located in the locking hole 212, the visible part 200 may be kept relatively fixed to the insertion cavity 9213. The pass here may mean that the first unlocking part 9223 may be embedded in the channel 214 and move in the channel 214.

In some embodiments, the locking hole 212 may be disposed on an edge of the visible part 200 so that the locking hole 212 may have an opening. A width of the opening is smaller than the diameter of the locking hole 212. The width of the opening is between the shaft diameter of the first locking part 9221 and the shaft diameter of the first unlocking part 9223, so that the first unlocking part 9223 can enter the locking hole 212 through the opening, while the first locking part 9221 cannot pass through the opening.

When the first locking part 9221 is located in the locking hole 212, the visible part 200 may be kept relatively fixed to the insertion cavity 9213.

During an assembly process of the visible part 200 and the quick-release assembly 900, the first lock 922 is inserted through the through hole 9211 and adjusted so that the first unlocking part 9223 is located in the insertion cavity 9213, and then the docking part of the visible part 200 (i.e., the part provided with the locking hole 212 and the channel 214) may extend into the insertion cavity 9213. The insertion cavity 9213 may prevent the visible part 200 from swinging relative to the mounting base 921 so as to align the channel 214 with the first unlocking part 9223. After the channel 214 is aligned with the first unlocking part 9223, the first lock 922 is adjusted so that the first unlocking part 9223 enters the locking hole 212 through the channel 214. Then adjust the first lock 922 relative to the mounting base 921 again (e.g., push the first lock 922 to move along the axis direction of the first lock 922), so that the first locking part 9221 is located in the insertion cavity 9213. As the first locking part 9221 cannot pass through the channel 214, the first locking part 9221 may mate the locking hole 212 to limit and fix the visible part 200, and then the visible part 200 may be fixed on the mounting base 921.

During the disassembly process of the visible part 200 and the quick-release assembly 900, the first lock 922 may be adjusted so that the first unlocking part 9223 replaces the position of the first locking part 9221 and is located in the locking hole 212, which may twitch the visible part 200 relative to the insertion cavity 9213, making the first unlocking part 9223 relatively passes through the channel 214 and disengages from the locking hole 212, thereby detaching the visible part 200 from the mounting base 921.

By disposing an insertion cavity 9213 at one end of the mounting base 921, the first lock 922 is disposed on the mounting base 921 and passed through the insertion cavity 9213. At the same time, the first lock 922 is configured to be adjustable relative to its axial direction, and then by adjusting one of the first locking part 9221 and the first unlocking part 9223 to be located in the insertion cavity 9213, the first locking part 9221 or the first unlocking part 9223 is fitted with the locking hole 212 on the visible part 200. Then the first locking part 9221 is limited by the channel 214 so as to lock the visible part 200 inserted in the insertion cavity 9213 or release a locking state of the visible part 200 by the first unlocking part 9223, thereby improving the disassembly efficiency between the visible part 200 and the mounting base 921.

In some embodiments, the position of the first lock 922 may be adjusted by means including pressing, rotating, pushing and pulling, so that the first unlocking part 9223 and the first locking part 9221 may be located in the insertion cavity 9213 in turn, so that the assembly and disassembly between the visible part 200 and the mounting base 921 may be implemented.

As shown in FIG. 33, in some embodiments, the quick-release assembly 900 may further include a first elastic part 923. The first elastic part 923 may be disposed on the mounting base 921 and elastically abuts against the first locking part 9221, and the first elastic part 923 may be configured to provide a first elastic force so that the first locking part 9221 is located in the insertion cavity 9213 when there is no external force. In some application scenarios, when the user wants to detach the visible part 200 from the mounting seat 921 or mount the visible part 200, firstly it is necessary to adjust the first lock 922 so that the first unlocking part 9223 is located in the insertion cavity 9213. During this process, the first lock 922 compresses the first elastic part 923 so that the first elastic part 923 generates the first elastic force. When the user finishes disassembling or aligning the locking hole 212 with the through hole 9211, the external force may be stopped. The first elastic force provided by the first elastic part 923 may push the first locking part 9221 to move into the insertion cavity 9213 or make the first locking part 9221 move into the locking hole 212 to fix the visible part 200.

In some embodiments, the first elastic part 923 may include a compression spring, an elastic column, or a spring washer, etc. The first elastic part 923 is deformable when extruded by the external force, and returns to its original shape when the external force is removed. The first elastic part 923 is provided to maintain the first locking part 9221 in the insertion cavity 9213 without an external force interference, and may rebound after the external force is removed so that the first locking part 9221 is located in the insertion cavity 9213, which improves a reliability of fixing the visible part 200, and the user's operation convenience is improved, which is user-friendly.

As shown in FIG. 33, in some embodiments, the first elastic part 923 may be disposed in the mounting base 921 and elastically abut against the end of the first locking part 9221 away from the first unlocking part 9223. If the user needs to release the fixation of the first lock 922 to the visible part 200, the user may press the first locking part 922, and at this time, the first lock 922 may move upwards and compress the first elastic part 923. When the first unlocking part 9223 replaces the first locking part 9221 and is located in the insertion cavity 9213, the fixation of the first lock 922 to the visible part 200 is released. When the user releases the press on the first locking part 922, the first elastic part 923 may push the first lock 922 to restoration (i.e., move downward) until the first locking part 9221 moves into the insertion cavity 9213 again.

In some embodiments, the through hole 9211 in the foregoing embodiments may be replaced by a blind hole. For example, in the embodiment shown in FIG. 32, the open end of the blind hole may be located on one side wall 9217 of the insertion cavity 9213, and the bottom end of the blind hole may be located on the other side wall 9217 of the insertion cavity 9213. The first elastic part 923 may be disposed in the blind hole of the mounting base 921 and elastically abut against an end of the first locking part 9221 away from the first unlocking part 9223. When the user presses the first locking part 922, the first lock 922 moves toward the bottom of the blind hole and compresses the first elastic part 923 until the first unlocking part 9223 replaces the first locking part 9221 and is located in the insertion cavity 9213. When the user releases the press on the first locking part 922, the elastic force of the first elastic part 923 may push the first lock 922 to move away from the bottom of the blind hole until the first locking part 9221 moves into the insertion cavity 9213 again.

As shown in FIG. 33, in some embodiments, the first locking part 9221 is also limitedly connected to the side wall of the blind hole. The first lock 922 may slide back and forth along the inner wall of the blind hole, and then the first locking part 9221 and the first unlocking part 9223 may be adjusted to be located in the insertion cavity 9213 in turn to fit with the locking hole 212. For example, the first lock 922 may limitedly cooperate with a limiting ring provided on the side wall of the blind hole. It should be noted that the one or more embodiments of the present disclosure are for illustration purposes only, and are not intended to limit the mating mode between the first lock 922 and the mounting base 921. In some embodiments, after replacing the blind hole in the previous embodiment with the through hole 9211, the through hole 9211 may further be limitedly connected to the first locking part 922. For example, at least two limiting structures (e.g., limiting rings) are disposed on the side wall of the through hole 9211, and the two limiting structures are distributed at different positions on the side wall along the axial direction of the through hole. The first lock 922 may be disposed between two limiting structures and slides back and forth between the two limiting structures.

As shown in FIG. 33, in some embodiments, the quick-release assembly 900 may further include a first positioning cover 924, which is disposed on the mounting base 921, and the first elastic part 923 may be elastically compressed and disposed between the first positioning cover 924 and the first locking part 9221.

In some embodiments, the mounting base 921 is provided with a through hole 9211, and the first positioning cover 924 may be disposed in the through hole 9211 and connected to, for example, by modes including an interference fit, a screw connection or a bonding with the through hole 9211. The first lock 922 may be connected to the first positioning cover 924 in a sliding limit. In some embodiments, the through hole may further be replaced by the blind hole, and the first positioning cover 924 may further be disposed in the blind hole.

As shown in FIG. 32 and FIG. 33, in some embodiments, the first positioning cover 924 may include a cylinder body 9241, a bottom wall 9243 disposed at one end of the cylinder body 9241, and a retaining ring 9245 disposed at the other end of the cylinder body 9241. An undercut 9225 is provided on the end of the first locking part 9221 away from the first unlocking part 9223. The first elastic part 923 is disposed between the bottom wall 9243 and the first locking part 9221. The first locking part 9221 and the cylinder body 9241 may be slidably disposed, and through the cooperation of the retaining ring 9245 and the undercut 9225, the first lock 922 may be limited from disengaging from the first positioning cover 924.

In some embodiments, the end of the first locking part 9221 may have an entire undercut 9225 in the form of a ring. In some embodiments, there may be a plurality of undercuts 9225, such as three, four, or five undercuts 9225, etc., and the plurality of undercuts 9225 may be disposed around the end of the first locking part 9221. The undercut 9225 may be provided with a guide surface, so that the undercut 9225 may be inserted into the cylinder body 9241 through the undercut 9245 and form a stop fit with the undercut 9245.

In some embodiments, the first positioning cover 924 may be a flat cover. The retaining ring 9245 may be disposed on the sidewall of the through hole 9211 on the mounting base 921. The first lock 922 passes through the stop ring 9245 from one end of the through hole 9211, the undercut 9225 of the first lock 922 may fit the stop ring 9245, and then the first positioning cover 924 covers the through hole 9211. The first elastic part 923 is located in the through hole 9211, and the first elastic part 923 is elastically compressed between the flat cover and the first locking part 9221.

In some embodiments, a first locking part 922, a first elastic part 923 and a first positioning cover 924 may be combined into an assembly, and when the count of the assembly is one, one end of the first locking part constituting the assembly may be taken as a button, and there is no need to disposed a button board 925 separately.

As shown in FIG. 33, in some embodiments, the quick-release assembly 900 may include two aggregations composed of the first locking part 922, the first elastic part 923 and the first positioning cover 924. The quick-release assembly 900 may further include the button board 925. The two aggregations may be connected through the button board 925. Exemplarily, the end of the first unlocking part 9223 of each aggregation away from the first locking part 9221 is connected to the button board 925, and the lock of the first lock 922 on the visible part 200 of each aggregation may be contacted at the same time, thereby improving the unlocking efficiency.

In some embodiments, the count of aggregates may not be limited to one or two, but may further be three, four or more.

In some embodiments, the position of the first lock 922 may be adjusted through rotation. For example, the first lock 922 is provided with threads, and the mounting base 921 is provided with a threaded hole, and the first lock 922 is threadedly connected to the threaded hole. By adjusting a threading depth of the first lock 922 and the threaded hole, the position of the first locking part 9221 or the first unlocking part 9223 in the insertion cavity 9231 may be adjusted.

In some embodiments, the wearing part 100 may rotate or not rotate relative to the mounting base 921. In some embodiments, the wearing part 100 may be fixedly connected by means of welding or bonding, or the wearing part 100 and the mounting base 921 may be in an integrated structure by means of integral injection molding or integral casting, so that the mounting base 921 may be considered as a part of the wearing part 100.

In some embodiments, the wearing part 100 is detachably connected to the mounting base 921, which facilitates the replacement of the wearing part 100 or the mounting base 921 of different lengths, so as to be suitable for the user's needs.

Figure 34:
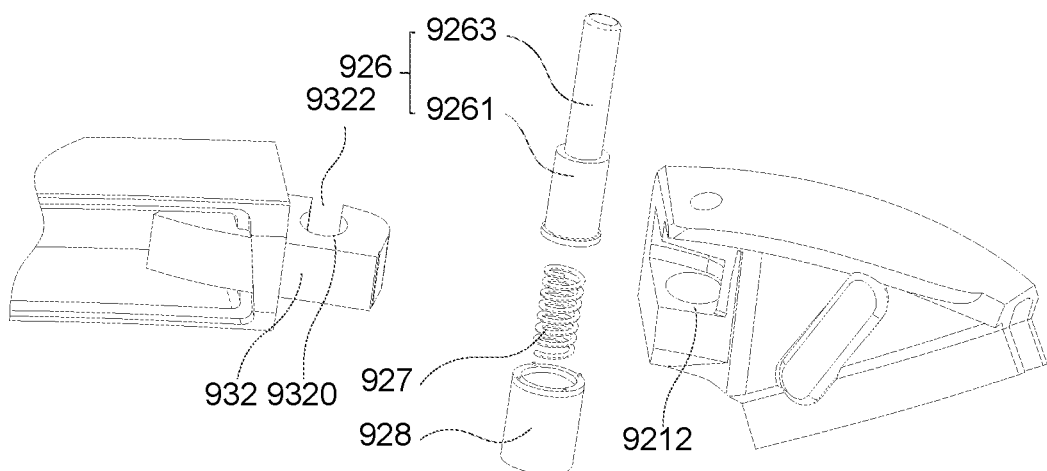
FIG. 34 is a schematic diagram illustrating a connection between a mounting base and a wearing part in the wearable device according to a first embodiment shown in FIG. 31.

FIG. 34 is a schematic diagram illustrating the connection between the mounting base and the wearing part in the wearable device according to a first embodiment in FIG. 31. As shown in FIG. 34, in some embodiments, the other end of the mounting base 921 is provided with an insertion slot 9212. One end of the wearing part 100 is provided with an insertion part 932. The insertion part 932 is detachably connected to the insertion slot 9212. In some embodiments, the wearing part 100 may rotate relative to the mounting base 921, so that the wearing part 100 may rotate toward the visible part 200 (e.g., in the embodiment shown in FIG. 30, each wearing part 100 may rotate toward the direction of other wearing part 100 relative to the visible part 200), so as to be folded on one side of the visible part 200, so as to facilitate a collection and storage of the wearable device 1000.

As shown in FIG. 34, in the first embodiment provided in the present disclosure, the quick-release assembly 900 may further include a second lock 926, a second elastic part 927 and a second positioning cover 928. The structure of the second lock 926 may be the same or similar to the structure of the first locking part 922, the second elastic part 927 may be the same or similar to the first elastic part 923, and the structure of the second positioning cover 928 may be the same as or similar to the structure of the first positioning cover 924.

In some embodiments, the second lock 926 may include a second locking part 9261 and a second unlocking part 9263 disposed coaxially. The second positioning cover 928 is disposed on the mounting base 921. The second lock 926 and the second positioning cover 928 are slidably disposed, the second lock 926 passes through the insertion slot 9212, and the second elastic part 927 is elastically compressed and disposed between the second positioning cover 928 and the second lock 926. The insertion part 932 is provided with a rotation hole 9320 and a channel 9322 communicating the rotation hole 9320, the insertion part 932 is disposed in the insertion slot 9212, the second locking part 9261 is located in the rotation hole 9320, and the second locking part 9261 and the rotation hole 9320 are rotately cooperate with each other. When the user needs to detach the wearing part 100, he or she may press one end of the second lock 926, so that the second unlocking part 9263 moves along its axis direction to replace the position of the second lock 9261 and is located in the rotation hole 9320, and through the channel 9322 to separate from the rotation hole 9320. In addition, the second elastic part 927 is compressed to generate a second elastic force during the movement of the second lock 926. Conversely, when the user needs to install the wearing part 100, firstly, one end of the second lock 926 may be pressed, so that the second unlocking part 9263 moves along its axis to replace the position of the second locking part 9261 and is located in the rotation hole 9320. Then control the second unlocking part 9263 to enter the rotation hole 9320 through the channel 9322. Finally, stop pressing the second lock 926, and the second elastic force generated by the second elastic part 927 may make the second locking part return to the rotation hole 9320 to fix the rotation hole 9320. Through the cooperation between the second lock 926, the second elastic part 927 and the second positioning cover 928, the wearing part 100 may be quickly and conveniently assembled and disassembled from the mounting base 921.

Figure 35:
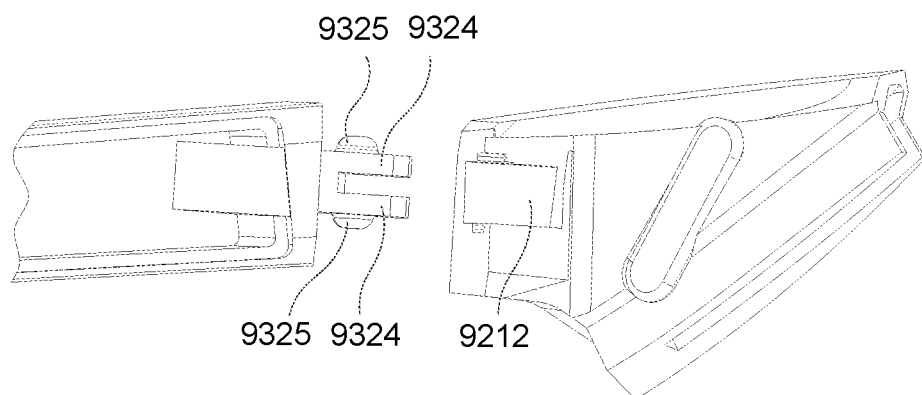
FIG. 35 is a schematic diagram illustrating a connection between a mounting base and a wearing part in the wearable device according to a second embodiment shown in FIG. 31.
Figure 36:
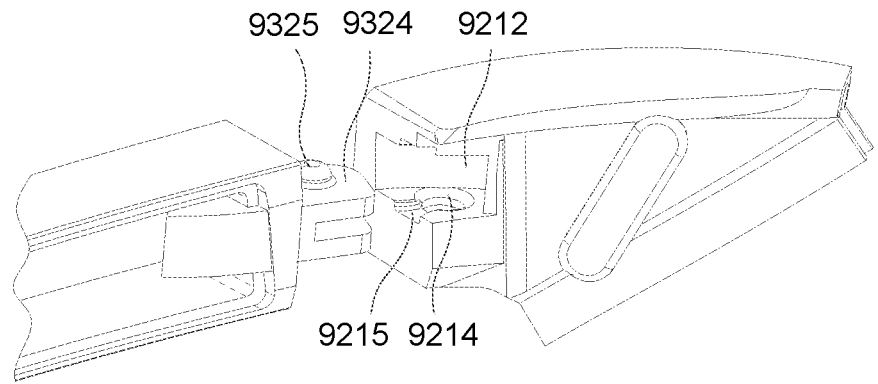
FIG. 36 is a schematic diagram illustrating a structure of another perspective of a connection between the mounting base and the wearing part according to FIG. 35.

FIG. 35 is a schematic diagram illustrating the connection between the mounting base and the wearing part in the wearable device according to a second embodiment in FIG. 31, and FIG. 36 is a schematic diagram illustrating a structure of another perspective of the connection between the mounting base and the wearing part according to FIG. 35. As shown in FIG. 35 and FIG. 36, in the second embodiment provided in the present disclosure, the insertion part 932 includes two extension sub-parts 9324 disposed at intervals. The two extension sub-parts 9324 are provided with buckle bumps 9325 on opposite sides. The side wall of the insertion slot 9212 is also provided with two buckle slots 9214 matched with the two buckle bumps 9325. When the insertion part 932 extends into the insertion slot 9212, the buckle protrusion 9325 may be stuck in the corresponding buckle slot 9214, and then the wearing part 100 is fixedly connected to the mounting base 921.

In some embodiments, the two extension sub-parts 9324 may be disposed at intervals, and there is a space cavity between them, so when the two buckle bumps 9325 are assembled with the two buckle slots 9214, the two buckle bumps 9325 press against the side wall of the insertion slot 9212, making the two extension sub-parts 9324 close to each other, so that the buckle bump 9325 enters the insertion slot 9212 and engages with the corresponding buckle slot 9214. And after the buckle bump 9325 is stuck in the corresponding buckle slot 9214, the two extension sub-parts 9324 may return to their original shape, so that the connection between the buckle bump 9325 and the buckle slot 9214 is secure. In addition, when the user rotates the wearing part 100, the buckle bump 9325 may be driven to rotate in the buckle slot 9214, so that an angle of the wearing part 100 relative to the mounting base 921 may be adjusted.

In some embodiments, the side wall of the insertion slot 9212 may further be provided with a guide slot 9215 leading to the buckle slot 9214, and the guide slot 9215 may guide the buckle bump 9325 to enter the buckle slot 9214 quickly and accurately, thereby improving the assembly and disassembly efficiency. In some embodiments, the distance between slot bottoms of the two guide slots 9215 may be smaller than the distance between the opposite ends of the two buckle bumps 9325, so as to reduce the degree of extrusion of the guide slots 9215 on the two extension sub-parts 9324, making it easier for the buckle bump 9325 to be mounted in the buckle slot 9214. The distance between the slot bottoms of the two buckle slots 9214 may be greater than the distance between the ends of the two buckle bumps 9325 departs from each other, so as to release the extrusion of the buckle slots 9214 to the buckle bumps 9325, so as to facilitate the two extension sub-parts 9324 to restored to their original shape, thereby improving a firmness of the connection between the insertion part 932 and the insertion slot 9212.

As shown in FIG. 35 and FIG. 36, in some embodiments, the buckle bump 9325 may be in a hemispherical shape, so as to facilitate the rotation between the wearing part 100 and the mounting base 921. In some embodiments, the locking bump 9325 may further be in the shape of a cylinder, a prism, etc., which is not limited in the present disclosure.

Figure 37:
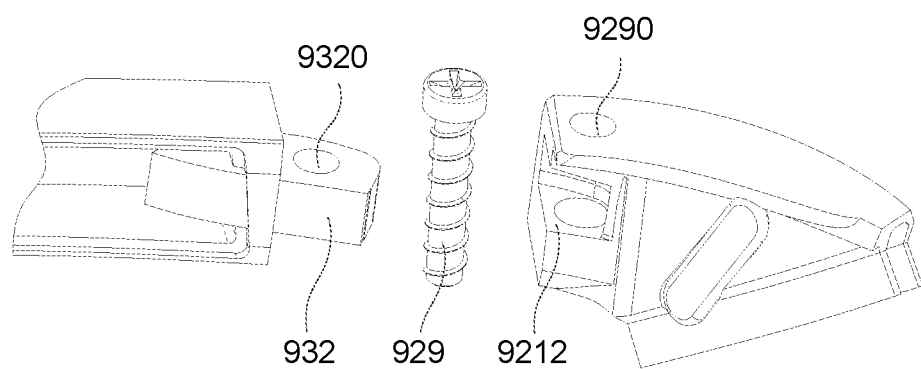
FIG. 37 is a schematic diagram illustrating a connection between a mounting base and a wearing part in the wearable device according to a third embodiment in FIG. 31.

FIG. 37 is a schematic diagram illustrating the connection between the mounting base and the wearing part in the wearable device according to a third embodiment in FIG. 31. As shown in FIG. 37, in the third embodiment provided in the present disclosure, the insertion part 932 may be provided with the rotation hole 9320. The quick-release assembly 900 also includes a fastener 929. The mounting base 921 is provided with a mounting hole 9290 for assembling with the fastener 929. The fastener 929 may be fixed in the mounting hole 9290 and pass through the rotation hole 9320 to be rotatably matched with the rotation hole 9320. In some embodiments, the fastener 929 may be a screw, a pile head or a pin, etc., which is not specifically limited in the present disclosure.

Different from the technique in the prior art, the present disclosure discloses a wearable device 1000. By providing the insertion cavity 9213 at one end of the mounting base 921, the first lock 922 is disposed on the mounting base 921 and passes through the insertion cavity 9213, and the position of the first lock 922 may be adjusted. Then one of the first locking part 9221 and the first unlocking part 9223 may be adjusted to be located in the insertion cavity 9213, thereby adjusting the first locking part 9221 or the first unlocking part 9223 to fit with the locking hole 212 on the visible part 200, so as to lock the visible part 200 inserted in the insertion cavity 9213 or release the locking state of the visible part 200, thereby improving the disassembly efficiency between the visible part 200 and the mounting base 921.

It should be noted that the above description about the quick-release assembly 900 is only for illustration and description, and does not limit the scope of the present disclosure. For those skilled in the art, various modifications and changes may be made to the mounting base 921 under the guidance of the present disclosure. However, such modifications and changes are still within the scope of the present disclosure. For example, the mounting base 921 and the wearing part 100 may be combined into one assembly, so that it has both the function of the wearing part 100 and the function of being able to quickly disassemble and assemble with the visible part 200. For another example, the mounting base 921 may be fixedly connected to the visible part 200, and the wearing part 100 may be quickly disassembled and assembled with the mounting base 921 through the first locking part 922, the first positioning cover 924, the first elastic part 923 and other assemblies. Such modifications are within the protection scope of the present disclosure.

Having described the basic concepts above, it is clear that the above detailed disclosures are intended only as examples for technicians skilled in the art and do not constitute the qualification of this description. Although not expressly stated here, those skilled in the art may make various modifications, improvements and corrections to the present disclosure. Such modifications, improvements and corrections are suggested in the present disclosure, so such modifications, improvements and corrections still belong to the spirit and scope of the embodiments of the present disclosure.

Meanwhile, the present disclosure uses specific words to describe the embodiments of the present disclosure. For example, "one embodiment", "an embodiment" and/or "some embodiments" refer to a certain feature, structure or characteristic related to at least one embodiment of the present disclosure. Therefore, it should be emphasized and noted that two or more references to "an embodiment" or "one embodiment" or "an alternative embodiment" in different places in the present disclosure do not necessarily refer to the same embodiment. In addition, certain features, structures or characteristics in one or more embodiments of the present disclosure may be properly combined.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities of ingredients, properties, and so forth, used to describe and claim certain embodiments are to be understood as being modified in some instances by the term "about," "approximate," or "substantially," etc. Unless otherwise stated, the "about", "approximately" or "substantially" indicates that the stated figure allows for a variation of ±20%. Accordingly, in some embodiments, the numerical data used in the present disclosure and claims are approximations that can vary depending upon the desired characteristics of individual embodiments. In some embodiments, numerical data should take into account the specified significant digits and adopt the general digit reservation method. Although the numerical ranges and data used in certain embodiments of the present disclosure to confirm the breadth of the ranges are approximations, in specific embodiments, such numerical values are disposed as precisely as practicable.

Finally, it should be understood that the embodiments described in the present disclosure are only used to illustrate the principles of the embodiments of the present disclosure. Other modifications are also possible within the scope of the present disclosure. Therefore, by way of example and not limitation, alternative configurations of the embodiments of the present disclosure may be considered consistent with the teachings of the present disclosure. Accordingly, the embodiments of the present disclosure are not limited to the embodiments explicitly introduced and described in the present disclosure.

What is claimed is:

1. A wearable device, including: a wearing part, the wearing part including:

a connection section and a concave section, the concave section being connected to the connection section; wherein the concave section is configured that the wearing part includes a downward depression on an upper edge of the wearing part; and the concave section is provided with an acoustic output end inside, wherein the acoustic output end includes a sound hole, the sound hole being disposed at at least one of the following:

an inner side of the concave section facing a user's head, an edge of the concave section facing the user's tragus, or a side of the concave section facing the user's tragus.

2. The wearable device of claim 1, wherein the concave section is configured to be close to a user's ear when the user wears the wearing part, and the concave section is configured that the acoustic output end locates in front of or near the user's ear.

3. The wearable device of claim 1, wherein the concave section includes a mounting part and a transition part connected to the mounting part, an angle is formed between the mounting part and the transition part, the acoustic output end is disposed on the mounting part or the transition part, and at least one of the mounting part and the transition part is in a bent connection with the connection section and the extends downwards.

4. The wearable device of claim 3, wherein the angle formed between the transition part and the mounting part is within a range of 30°-90°.

5. The wearable device of claim 3, wherein the connection section includes a first connection section, the transition part is connected between the mounting part and the first connection section, and the transition part is in a bent connection with the first connection section and extends downwards.

6. The wearable device of claim 5, further including a separator connected to the concave section and the first connection section, when the user wears the wearable device, the separator wraps at least a part of the user's ear.

7. The wearable device of claim 1, wherein the acoustic output end includes a vibration surface on the inner side of the concave section facing the user's head.

8. The wearable device of claim 1, wherein the wearing part includes a left ear wearing part and a right ear wearing part, and the left ear wearing part and the right ear wearing part are respectively in a stable contact with the user's left and right ears;

both the left ear wearing part and the right ear wearing part include a communication assembly, and the communication assemblies are configured to transmit a signal between the left ear wearing part and the right ear wearing part.

9. The wearable device of claim 8, wherein the communication assemblies includes a wireless communication assembly.

10. The wearable device of claim 1, further including a visible part physically connected to the wearing part, and the wearing part is able to rotate relative to the visible part along a connection point with the visible part.

11. The wearable device of claim 10, wherein the wearable device further includes a relative position detection device, the relative position detection device being configured to detect a position of the wearing part relative to the visible part; wherein when the wearing part is in a first position relative to the visible part, the wearable device is in a folded state;

when the wearing part is in a second position relative to the visible part, the wearable device is in an unfolded state; or when the wearable part is in a transitional position relative to the visible part, the wearable device is in a transitional state.

12. The wearable device of claim 1, further including a visible part and a quick release assembly, wherein the quick release assembly includes a mounting base and a first lock, one end of the mounting base is provided with an insertion cavity, the mounting base is connected to one of the wearing part and the visible part, the first lock is disposed on the mounting base passing through the insertion cavity, the first lock includes a first locking part and a first unlocking part set coaxially, and an axial projection of the first unlocking part is located within an axial projection range of the first locking part along the axial direction;

the other of the wearing part and the visible part includes a locking hole, the locking hole being inserted into the insertion cavity;

when the first locking part is located in the locking hole, the other of the wearing part and the visible part is relatively fixed to the insertion cavity; and when the first unlocking part, instead of the first locking part, is located in the locking hole, the first unlocking part is disengaged from the locking hole.

13. The wearable device of claim 12, wherein the quick release assembly further includes a first elastic part, the first elastic part being disposed on the mounting base and elastically abuts against the first locking part, the first elastic part is configured to provide an elastic force to make the first locking part move into the insertion cavity.

14. The wearable device of claim 12, wherein the other end of the mounting base includes an insertion slot, and one end of one of the wearing part and the visible part includes an insertion part, and the insertion part is detachably connected to the insertion slot.

15. The wearable device of claim 1, further including an adjustment part;

the wearing part includes a connection end and an erection end opposite to the connection end, the erection end is in the stable contact with the user's ear, and the adjustment part is alternatively connected to the connecting end, so that by replacing the adjustment parts with different lengths, a length of the wearing part is adjusted.

16. The wearable device of claim 15, wherein a first buckle is disposed on the connection end of the wearing part, the end of the adjustment part connecting the wearing part includes a second buckle that is compatible with the first buckle; the adjustment part and the wearing part are connected through a matching between the first buckle and the second buckle.

17. The wearable device of claim 15, further including a visible part, the visible part includes a positioning end; one end of the adjustment part is detachably connected to the wearing part, and the other end is connected to the positioning end of the visible part.

18. The wearable device of claim 1, wherein an air conduction speaker is disposed at the connection section, and the air conduction speaker is connected to the sound hole through a sound guide tube.

19. The wearable device of claim 1, wherein an air conduction speaker is disposed inside the wearing part, a shell of the air conduction speaker is a shell of the wearing part, and the shell of the air conduction speaker is provided with the sound hole.

* * * * *